(12) United States Patent
Yamamoto et al.

(10) Patent No.: US 10,503,424 B2
(45) Date of Patent: Dec. 10, 2019

(54) STORAGE SYSTEM

(71) Applicant: HITACHI, LTD., Tokyo (JP)

(72) Inventors: Akira Yamamoto, Tokyo (JP); Atsushi Kawamura, Tokyo (JP)

(73) Assignee: HITACHI, LTD., Tokyo (JP)

(*) Notice: Subject to any disclaimer, the term of this patent is extended or adjusted under 35 U.S.C. 154(b) by 85 days.

(21) Appl. No.: 15/755,454

(22) PCT Filed: Sep. 21, 2016

(86) PCT No.: PCT/JP2016/077807
§ 371 (c)(1),
(2) Date: Feb. 26, 2018

(87) PCT Pub. No.: WO2017/068904
PCT Pub. Date: Apr. 27, 2017

(65) Prior Publication Data
US 2018/0253252 A1  Sep. 6, 2018

(30) Foreign Application Priority Data

Oct. 19, 2015 (WO) .................. PCT/JP2015/079395

(51) Int. Cl.
G06F 12/02 (2006.01)
G06F 3/06 (2006.01)
G06F 3/08 (2006.01)

(52) U.S. Cl.
CPC .......... *G06F 3/0641* (2013.01); *G06F 3/0608* (2013.01); *G06F 3/0613* (2013.01);
(Continued)

(58) Field of Classification Search
None
See application file for complete search history.

(56) References Cited

U.S. PATENT DOCUMENTS

2009/0089483 A1  4/2009 Tanaka et al.
2012/0317333 A1  12/2012 Yamamoto et al.
(Continued)

FOREIGN PATENT DOCUMENTS

JP   2014-160311 A   9/2014
JP   2014-179094 A   9/2014

OTHER PUBLICATIONS

International Search Report and Written Opinion for PCT App No. PCT/JP2016/077807 dated Dec. 27, 2016, 14 pgs.

*Primary Examiner* — Brian R Peugh
(74) *Attorney, Agent, or Firm* — Procopio, Cory, Hargreaves & Savitch LLP

(57) ABSTRACT

A storage system is provided that has a plurality of flash packages and a storage controller that controls read/write processing between a host and the flash packages. When data identical to data written in a second address of a second flash package of the plurality of flash packages is written to a first address of a first flash package of the plurality of flash packages, the storage system may store the second address in the first package in association with the first address, and perform deduplication. When the first flash package stores the second address in association with the first address and a read request for the first address is received from the storage controller, the first flash package may return the second address to the storage controller. In response to receiving the second address, the storage controller may acquire target read data from the second flash package.

14 Claims, 37 Drawing Sheets

(52) U.S. Cl.
CPC .......... *G06F 3/0619* (2013.01); *G06F 3/0683* (2013.01); *G06F 3/08* (2013.01); *G06F 3/0679* (2013.01); *G06F 12/0246* (2013.01)

(56) References Cited

U.S. PATENT DOCUMENTS

| | | | |
|---|---|---|---|
| 2013/0318288 A1* | 11/2013 | Khan | G06F 3/0608 |
| | | | 711/103 |
| 2014/0237202 A1 | 8/2014 | Yamamoto et al. | |
| 2014/0281155 A1 | 9/2014 | Cohen | |
| 2015/0317083 A1* | 11/2015 | Phan | G06F 3/0608 |
| | | | 711/103 |
| 2016/0179395 A1* | 6/2016 | Fisher | G06F 3/0608 |
| | | | 711/103 |
| 2016/0179433 A1* | 6/2016 | Camp | G06F 3/0641 |
| | | | 711/103 |

\* cited by examiner

FIG. 6

| Logical Volume ID | 2001 |
| Logical Capacity | 2002 |
| Logical Volume RAID Type | 2003 |
| Real Page Pointer | 2004(2004-0) |
| ⋮ | |
| Real Page Pointer | 2004(2004-(n-1)) |

Logical Volume Information 2000

FIG. 7

| Package Group | 2101 |
| Real Page Address | 2102 |
| Free Page Pointer | 2103 |
| Page Data Storage Amount | 2104 |

Real Page Information 2100

FIG. 8

| Flash Package ID | 2501 |
| --- | --- |
| Flash Package Virtual Capacity | 2502 |
| Block Capacity | 2503 |

Flash Package Information 2500

FIG. 9

| Flash Package Group ID | 2301 |
| --- | --- |
| Package Group RAID Type | 2302 |
| Real Page Number | 2303 |
| Free Real Page Number | 2304 |
| Flash Package Pointer | 2305 |
| ⋮ | |
| Flash Package Pointer | 2305 |

Flash Package Group Information 2300

Hash Value Storage Information 2400

Package Information 3000

Chip Information 3100

Real Block Information 3300

Free Real Block Information Queue 1700

Virtual Block Group Information 3200

Historical Information 3400

Structure of the Hash Index Information 3500

FIG. 21

| Leaf Segment 3501 | | | | | | | | | Entry | Entry |
|---|---|---|---|---|---|---|---|---|---|---|
| Entry | | | | | | | | | | |
| | 1st | | | 2nd | | | 3rd | | | |
| Registered Hash Value | Segment Number | Registered Address | Invalid Flag | Registered Address | Invalid Flag | Registered Address | Invalid Flag | ... | | ... |
| 3502 | 3504 | 3505 | 3506 | 3505 | 3506 | 3505 | 3506 | | | |
| Registered Data Number 3503 | | | | | | | | | | |

3510 (3510-1), 3510 (3510-2), 3510 (3510-3)

Storage System Information 2700

Hash Value Storage Information 2400'

STORAGE SYSTEM

CROSS REFERENCE TO RELATED APPLICATIONS

This application is a U.S. National Stage entry of PCT Application No. PCT/JP2016/077807, filed on Sep. 21, 2016, which claims priority to PCT Application No. PCT/JP2015/079395, filed Oct. 19, 2015, the contents of which are incorporated herein by reference.

TECHNICAL FIELD

The present invention relates to a deduplication technique in a storage system.

BACKGROUND ART

As storage devices that make use of flash memory as a storage medium are overwhelmingly faster than HDDs and the like, they are rapidly gaining in popularity in recent years as bit costs decrease. In addition, conventional storage systems have utilized a plurality of storage devices, such as HDDs, in order to achieve high reliability and high performance. Accordingly, it is common for pluralities of storage devices that use flash memory as a storage medium to be utilized in storage systems, and for storage controllers to control these storage devices that use flash memory as a storage medium. In addition, some storage devices that use flash memory as a storage medium have form factors and interfaces compatible with HDDs. These are referred to as SDDs. In contrast, there are also devices that do not have compatibility with HDDs. The present invention is directed to both types, and is hereinafter referred to as a flash package.

As the bit cost of flash memory is higher than that of magnetic disks or the like, there is a need to reduce the stored data capacity and increase the apparent capacity. In storage systems, a deduplication technique is one technique for reducing data storage capacity. In this technique, the storage controller checks whether multiple sets of data with the same contents are stored in the storage system. In the case that there is a plurality of sets of data with the same content (duplicate data), only one of them is left in the storage system and the remaining data is deleted. In this way, the amount of data stored in a storage device may be reduced.

For example, Patent Document 1 discloses a deduplication technique in a storage device having a plurality of flash memory modules mounted therein. The storage device disclosed in Patent Document 1 is equipped with a plurality of storage devices called flash memory modules. In addition, the storage device disclosed in Patent Document 1 divides data into data units called stripe units, and distributes and stores the divided data in a plurality of flash memory modules. When deduplication processing is performed, the storage controller performs deduplication on data of a size equal to or larger than a stripe unit with a range extending over a plurality of flash memory modules. Then, the flash memory modules perform deduplication for data of a size equal to or smaller than a stripe unit with respect to the data in the flash memory module. In the technique disclosed in Patent Document 1, as duplication elimination is performed with a range extending over a plurality of storage devices, the effect of reducing the data amount is greater in comparison with cases where deduplication processing targeting only the data of the storage device is performed.

In contrast, in recent years, capacity virtualization functions have become widespread in storage systems. A capacity virtualization function is a function for providing a host side with a virtual capacity larger than the physical capacity of the storage devices possessed by the storage system, and in general, is a function possessed by the storage controller in the storage system. This is because when the user actually uses storage, the amount of data actually stored in the user volume with respect to the capacity of the user volume (storage device as seen by the user) defined by the user is based on a characteristic that it does not readily reach the capacity of the user volume.

That is, when the capacity virtualization function is not used, the user needs to reserve a physical storage area equal to the capacity of the volume at the time of volume definition. When the capacity virtualization function is used, at the time of volume definition, the user does not necessarily have to prepare a physical storage area corresponding to the capacity of the volume. When a data write actually occurs in the volume, the storage area is allocated to the volume for the first time. As a result, since the capacity of the storage device to be prepared in advance can be reduced, and the user need not strictly define the volume capacity but rather simply define a value having a large margin, usability can be improved.

Patent Document 2 discloses a technique of providing a capacity virtualization function not only in a storage controller but also in a flash package in a storage system having a plurality of flash packages. Furthermore, in the storage system disclosed in Patent Document 2, it is also disclosed that the flash package may compress the data. In general, since the compression ratio of data varies depending on the content of data, it is difficult to predict the data size after compression. Also, if the data is updated, the compression ratio naturally changes. For this reason, Patent Document 2 discloses a technique for changing the size (virtual capacity) of the volume provided by the flash package to the storage controller due to the change in the compression rate.

CITATION LIST

Patent Literature

[Patent Document 1] U.S. Patent Application Publication No. 2009/0089483
[Patent Document 2] U.S. Patent Application Publication No. 2012/0317333

SUMMARY OF INVENTION

Technical Problem

As the storage data amount of the storage system increases, the load of the deduplication processing increases. In the technique disclosed in Patent Document 1, the deduplication processing targeting data in a range extending over a plurality of storage devices is performed by the storage controller. Accordingly, as the amount of stored data increases, the storage controller can become a performance bottleneck. In contrast, if the deduplication process is performed in the storage device, the data targeted by the deduplication process is limited to the data in the storage device, and the deduplication efficiency is not improved.

A challenge to be solved by the present invention is to provide, in a large-scale storage system including a number of flash packages, a storage system capable of reducing the impact on the performance of the entire storage system while reducing the storage data capacity and storing data of a capacity greater than the apparent capacity.

Solution to Problem

A storage system according to an embodiment of the present invention includes a plurality of flash packages and a storage controller that controls read and write processes between a host and the flash packages. When data identical to the data written in a second address of a second flash package is written in a first address of a first flash package of the plurality of flash packages, the storage system stores the second address in the first flash package in association with the first address and performs deduplication.

In a state where the second address is stored in association with the first address, when a read request is received for the first address from the storage controller, the first flash package may return the second address to the storage controller. Upon receiving the second address, the storage controller may acquire the target read data from the second flash package by issuing a read request to the second flash package.

Advantageous Effects of Invention

According to the present invention, in a large-capacity storage system in which a large number of flash packages are connected, it is possible to execute deduplication of data between flash packages, reduce data storage amounts while suppressing performance deterioration of the storage controller, and store a greater amount of data than the physical capacity.

BRIEF DESCRIPTION OF DRAWINGS

FIG. 6 is a diagram illustrating a format of logical volume information.

FIG. 7 is a diagram illustrating a format of real page information.

FIG. 8 is a diagram illustrating a format of flash package information.

FIG. 9 is a diagram illustrating a format of flash package group information.

FIG. 21 is an explanatory diagram of a leaf segment.

DESCRIPTION OF EMBODIMENT(S)

Figure 1:
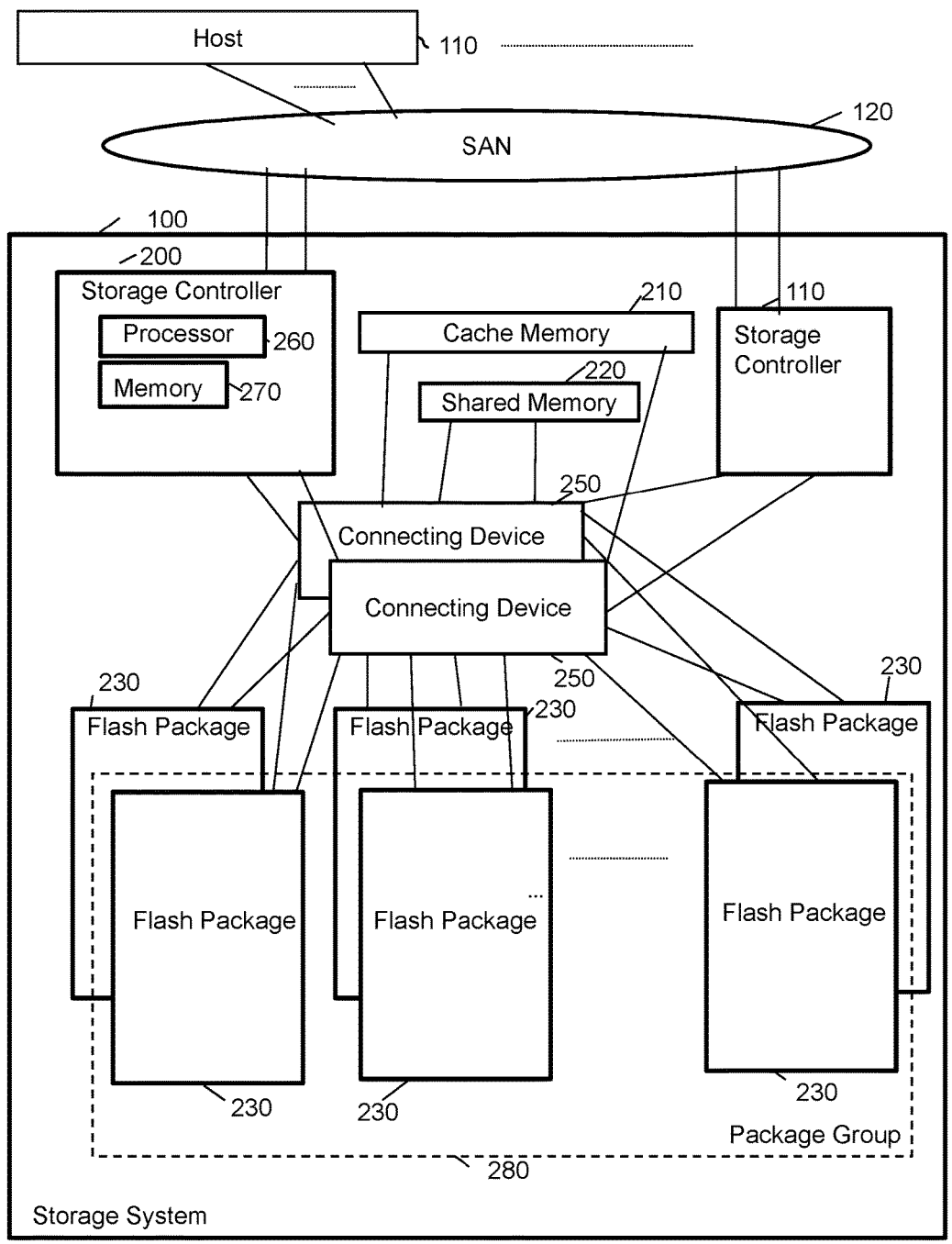
FIG. 1 is a diagram illustrating a configuration of an information system including a storage system according to a first or second embodiment.

Hereinafter, embodiments will be described with reference to the drawings. Before entering into a description of the embodiments, various terms used in the embodiments will be described.

"Volume" refers to the storage space provided by a target device, such as a storage system or a storage device, to an initiator of a host computer or the like. When the initiator issues a data write request to the area on the volume, the data is stored in the physical storage area allocated to that area.

In the storage system according to the embodiment described below, the capacity virtualization function is implemented in each of the storage controllers and the storage devices (flash package). In the present specification, volumes defined by the storage controller using the capacity virtualization function and volumes provided to the host are called "logical volumes". In contrast, the volumes that the flash package provides to the storage controller, and the volumes defined using the capacity virtualization function are called "flash volumes". The capacity virtualization function of the storage controller is referred to as a higher-level capacity virtualization function, and the capacity virtualization function of the flash package is referred to as a lower-level capacity virtualization function.

No physical storage area is allocated to the area on the logical volume (or flash volume) in the initial state (immediately after the volume is defined). At the point in time when the host (or storage controller) issues a data write request to the area on the logical volume (or flash volume), the storage controller (or flash package) dynamically determines the physical storage area to be allocated to that area.

In the embodiments described herein, the smallest unit when allocating a physical storage area to a logical volume is called a "page". In general, a page refers to the minimum unit of read/write processing in a flash memory, but in the embodiments described herein, the unit of reads/writes in the flash memory is called a "segment" rather than a page. A storage area allocated to a logical volume is called a "real page", and an area on a logical volume to which a real page is allocated is called a "virtual page".

In the flash memory, the data erase unit is called a "block". Because a block contains multiple segments, the size of the block is an integer multiple of the segment size. In contrast, the page (real page) in the embodiments described below is a concept not directly related to blocks or segments, and there is not necessarily a correlation between the page size and the size of a block (or segment). However, in the following embodiments, for simplicity of explanation, examples in which the real page has a relationship of at least an integer multiple of the segment will be described.

The flash package defines a "flash volume" using the capacity virtualization function. In the embodiments described below, the unit for allocating the physical storage area to the flash volume is a segment. That is, a segment is equal to the smallest unit of read/write processing in the flash memory. The physical storage area allocated to the flash volume is called a "real segment", and the area on the flash volume to which the real segment is allocated is called a "virtual segment".

"Updating" in the storage area refers to rewriting (overwriting) the contents of the data stored in the storage area with new contents. Before a certain storage area is updated, the data stored in the storage area is called "original data" or "old data". In contrast, data newly written in the storage area is called "updated data" or "post-update data".

In the present embodiment, in the case that there are a plurality of data sets having identical contents in a storage device such as a storage system, "deduplication" refers to a process of leaving only one of those data sets in the storage device, and deleting the other data sets from the storage device. In the storage system according to the embodiments described below, the unit of deduplication is a segment. Herein, the unit of deduplication refers to a minimum size of each data set when comparing the differences of two (or more) data sets. That is, in the embodiments described below, data comparison is performed on a segment basis. When there are a plurality of actual segments in which identical data is written, only one real segment is left.

In the storage system according to the embodiments described below, there are cases where the deduplication processing is performed by the flash package. Also, in the event that the capacity virtualization function is used, as by this flash package, when the identical data contents are written to a plurality of virtual segments on the flash volume (one or more), a common real segment is allocated to each virtual segment in which the identical data contents are written.

In the present embodiment, the "characteristic amount" of data indicates a value obtained by subjecting data to a predetermined calculation. The type of the predetermined calculation is not necessarily limited to a specific one. However, it is necessary to guarantee that the same value will always be derived when a predetermined operation is performed on a plurality of data sets having identical contents. As an example of an operation corresponding to this condition, there is the hash function SHA-256, for example. A value calculated using a hash function is called a hash value. A hash value is an example of a characteristic amount. As the size of a hash value is very small in comparison with the size of the original data (for example, a few hundredths of the size), it can be used when determining differences between a plurality of data sets (for example, deduplication processing), for example.

In the embodiments described below, a hash function such as SHA-256 may be used for calculating the characteristic amount unless otherwise noted. In the embodiment, when the hash value H is obtained by applying the hash function to a data set A, the value H is referred to as the characteristic amount of the data set A or the hash value of the data set A. Conversely, the data set A may be referred to as "data having a hash value H".

In the present embodiment, "collision" means that, when a predetermined operation is performed on each of a plurality of different data sets to generate a characteristic amount, each generated characteristic amount generated is the same. When characteristic amounts are used for comparison between data sets, it is not desirable for collision to occur. The hash values generated by the hash function SHA-256 mentioned above has a feature that the probability of the occurrence of collision is extremely low.

[First Embodiment]

FIG. 1 illustrates a configuration of an information system in this embodiment. The information system may include a storage system 100, a host 110, and a SAN (Storage Area Network) 120 that connects both of these. The host 110 is a computer on which a user application runs, and is configured to perform reads and writes for necessary data with the storage system 100 via the SAN 120. For example, the SAN 120 may be a network conforming to a standard such as Fiber Channel Also, the present invention may be effective even if the host 110 and the storage system 100 are connected directly.

The storage system 100 may include at least one storage controller 200, a cache memory 210, a shared memory 220, a flash package 230, and at least one connecting device 250 that connects these components. In FIG. 1, the storage devices in the storage system 100 are all flash packages 230, but the storage system 100 may include other kinds of storage devices such as HDDs. Further, in the present embodiment, the capacities of the flash packages 230 are all set to be equal. However, as another embodiment, the capacity of each flash package 230 mounted in the storage system 100 may be different.

The storage controller 200 may include a processor 260 and a memory 270 for processing read/write requests issued from the host 110. One of the features of the storage system 100 according to the present embodiment is that the flash package 230 executes the deduplication processing. Generally, in the deduplication process, when data (referred to as data set A) is newly written in a storage device such as the storage system 100, a characteristic amount such as a hash value is calculated. In the case that data having the same characteristic amount as the characteristic amount of the data set A exists (the data is provisionally referred to as data set B), the data set A and the data set B are compared bit by bit. If the result of the comparison indicates that data set A and data set B are the same, the data set A is not stored in the storage device, and the storage capacity is reduced. The characteristic amount is used to narrow down the candidates for which the contents of the data should be compared. In the storage system 100 according to this embodiment, the flash package 230 performs the calculation of the characteristic amount. However, as another embodiment, the calculation of the characteristic amount may be performed by the storage controller 200.

The connecting device 250 is a mechanism for connecting each component in the storage system 100. In addition, in the present embodiment, in order to achieve high reliability, it is assumed that each flash package 230 is connected to a plurality of storage controllers 200 by a plurality of connecting devices 250. However, the present invention is also applicable when one flash package 230 is connected to only one connecting device 250.

The cache memory 210 and the shared memory 220 are usually composed of a volatile memory such as a DRAM, but here it is assumed that they are made nonvolatile by a battery or the like. However, the present invention is applicable even if the cache memory 210 and the shared memory 220 are not nonvolatile.

In the cache memory 210, among the data stored in the flash packages 230, data frequently accessed from the storage controller 200 is stored. Further, the storage controller 200 uses the cache memory 210 as what is known as a write-back cache. That is, the storage controller 200 writes the data received together with the write request from the host 110 to the cache memory 210, and at that time, responds to the host 110 that the write request has been completed. Writing data from the cache memory 210 to the flash package 230 may be performed asynchronously with write requests from the host 110. However, as another embodiment, what is known as a write-through method (a method of responding to the host 110 that the write request is completed when the write data is stored in the flash package 230) may be used.

The shared memory 220 may store control information of the cache memory 210, important management information of the storage system 100, contact information between the storage controllers 200, synchronization information, and the like.

Each flash package 230 according to the present embodiment may form a volume (storage space), and provide this volume area to the storage controller 200. That is, the storage controller 200 may recognize the flash package 230 as one storage device. Also, in the present embodiment, the volume formed by the flash package 230 may be referred to as a "flash volume".

In addition, to achieve high reliability, the storage controller 200 may have a Redundant Array of Inexpensive/Independent Disks/Devices (RAID) function capable of recovering the data of the flash package 230. In the RAID function, a group (what is known as a RAID group) composed of a plurality of (for example, four) flash packages 230 is defined, and in the event that one flash package 230 in the RAID group fails, the storage controller 200 can recover the data contents stored in the failed flash package 230 based on the information stored in the remaining flash packages 230 in the RAID group. In the present embodiment, a RAID group including a plurality of flash packages 230 is referred to as a flash package group 280. Multiple flash package groups 280 may be defined. It should be noted that the present invention is applicable even if the storage controller 200 does not have the RAID function. In addition, the present invention is applicable even if a storage device other than the flash package 230, for example, a storage device such as an HDD (Hard Disk Drive) is included in the storage system 100.

Figure 2:
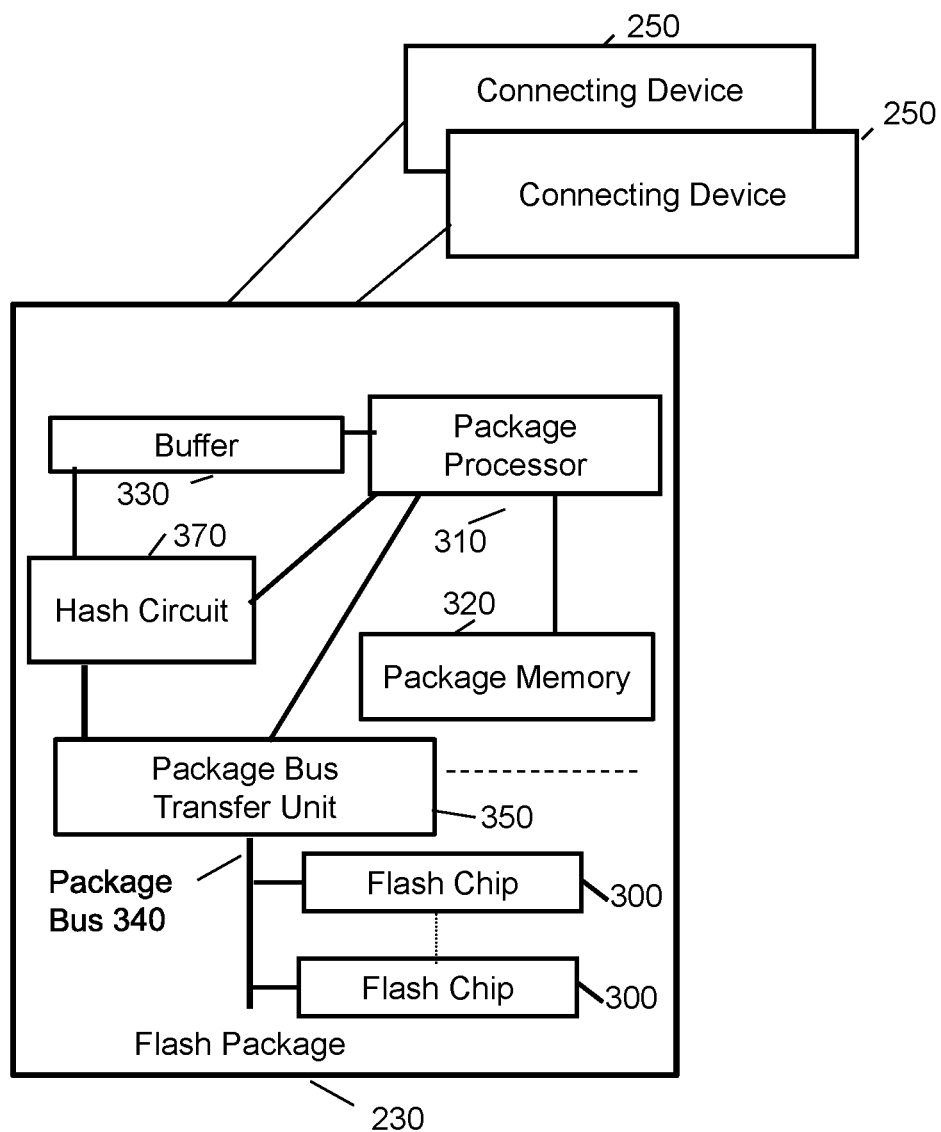
FIG. 2 is a diagram illustrating a configuration of a flash package.

FIG. 2 illustrates the configuration of a flash package 230. The flash package 230 may include a plurality of flash chips 300 that use nonvolatile semiconductor memory as a storage medium, and also include a package processor 310, a package memory 320, a buffer 330, a package bus 340, a package bus transfer device 350, and a hash circuit 370. Note that, in the present embodiment, an example in which the flash package 230 does not have compression/decompression functionality will be described. However, the flash package 230 may have a compression/decompression functionality.

The hash circuit 370 may calculate a hash value (characteristic amount) of data written from the storage controller 200 to the flash package 230. In the present embodiment, a hash algorithm with a very low collision probability, such as SHA-256, is used in calculating the hash value. Accordingly, if the hash values generated from two data sets are equal, it can be determined that the contents of the two sets of data are equal. However, as another embodiment, a hash algorithm other than SHA-256 may be used.

The package processor 310 may receive a read/write request from the storage controller 200 and execute a corresponding process. The buffer 330 may store data to be read/written between the storage controller 200 and the flash chip 300. In the present embodiment, it is assumed that the buffer 330 is volatile memory. Upon receiving a write request and a write data from the storage controller 200, the package processor 310 writes the received write data to the flash chip 300, and subsequently notifies the storage controller 200 that the write process has been completed. However, the present invention is applicable even if the buffer 330 is a nonvolatile memory and the write request received from the storage controller 200 is completed at the point when the write request received from the storage controller 200 is written in the buffer 330.

In the package memory 320, programs executed by the package processor 310, management information of the flash chip 300, and the like are stored. As the management information of the flash package 230 is important information, it is desirable that the management information can be evacuated to a specific flash chip 300 at the time of planned shutdowns. In addition, in order to prepare for sudden failures, it may be preferable to have a battery that can be used to evacuate the management information to a specific flash chip 300 even if a failure or the like occurs.

Storing all information relating to deduplication in the package memory 320 increases the capacity of the package memory 320, which can result in higher costs. Accordingly, in the flash package 230 according to the present embodiment, it is assumed that all the information is stored in the flash chip 300 and only a portion of the information is stored in the package memory 320. However, as another embodiment, all the information may be stored in the package memory 320.

The package bus 340 is a bus that performs data transfer between the buffer 330 and the flash chip 300, and one or of these buses may exist. In order achieve improved performance, the flash package 230 generally has a plurality of package buses 340, but the present invention is applicable even if there only one.

A package bus transfer device 350 may exist for each package bus 340 and execute data transfer between the buffer 330 and the flash chip 300 according to instructions of the package processor 310.

The hash circuit 370 may be connected to the buffer 330 and calculate a hash value of data written from the storage controller 200 according to instructions of the package processor 310.

The flash chip 300 may, for example, be a nonvolatile semiconductor memory chip such as a NAND type flash memory. As is well known, the unit of data reading/writing in flash memory is a segment (although generally referred to as a page, in the present specification, it is referred to as a segment). Further, data erasure may be performed for each block, which is a set of segments (referred to as a real block in the present embodiment). In the flash chip 300, there are a plurality of dies, which are aggregates of real blocks, and a plurality of segments are present in each actual block. In the present, a segment existing in a real block is referred to as a "real segment". In the area on the flash volume, the area to which a real segment is allocated is referred to as a "virtual segment".

The flash package 230 manages each flash chip 300 with an assigned identification number. The identifier of the flash chip 300 is called a chip ID. In addition, identification numbers are also assigned to each die and each real block. The die identification number is called a die number, and the real block identifier is called a block number. The die number is a unique identification number within the flash chip 300 to which the die belongs, and the block number is an identification number unique among the dies to which the real block belongs. Also, the identification number assigned to the real segment in the real block is called a relative segment number. The relative segment number of the first real segment in the real block is 0, and the subsequent real blocks are numbered in the order 1, 2 . . . n.

Subsequently, the information managed by the storage system 100 in this embodiment will be described, but before that, the configuration of the logical volume and the flash volume will be described. In the present embodiment, it is assumed that the storage controller 200 supports a high-level capacity virtualization function. However, the present invention is applicable even if the storage controller 200 does not include a higher-level capacity virtualization function.

Normally in higher-level capacity virtualization functions, the allocation unit of a storage area is called a page. It should be noted that in the present embodiment, the space of the logical volume is divided into units of virtual pages, and the storage area of the flash package group 280 is divided into real pages.

The relationship between the logical volume, the virtual page, the real page, and the flash package group 280 will be described with reference to FIG. 3. The storage controller 200 can define one or more logical volumes and provide them to high level devices such as the host 110. Also, as described above, the storage controller 200 may divide and manage the storage space of each logical volume in predetermined unit areas referred to as a plurality of virtual pages (FIG. 3: VP0, VP1, VP2). It should be noted that the size of a virtual page is stored in the virtual page capacity 2600 (described later) in the shared memory 220. Further, in the storage system 100 according to the present embodiment, although the capacity of all the virtual pages is the same, a configuration in which virtual pages of different sizes exist in the storage system 100 may also be used.

The virtual page is a concept used only for managing the storage space of the logical volume inside the storage controller 200. When accessing the storage area of the logical volume, the host 110 specifies the storage area to be accessed by using an address such as an LBA (Logical Block Address). When the host 110 issues an access request to the logical volume, the storage controller 200 converts the LBA designated by the host 110 into a virtual page number (identification number attached to each virtual page) and a relative address (offset address at the top of the virtual page). This conversion can be realized by dividing the LBA by the virtual page size. Assuming that the size of the virtual page is P (MB), the area of P (MB) from the top position of the logical volume is managed as virtual page #0 (where #0 represents the virtual page number), the next P (MB) is managed as virtual page #1. After that, similarly, the areas of P (MB) are managed as virtual pages #2, #3 . . . #n, respectively.

Immediately after the storage controller 200 defines a logical volume, no physical storage area is allocated to each virtual page. The storage controller 200 may allocate a physical storage area to the virtual page only when it receives a write request for the virtual page from the host 110. The physical storage area allocated to the virtual page is called a real page. FIG. 3 illustrates a state in which a real page RP0 is allocated to the virtual page #0 (VP0).

A real page is an area formed using storage areas of a plurality of flash volumes of the flash package group 280. In FIG. 3, reference numerals 230-1, 230-2, 230-3, and 230-4 each represent flash volumes of the respective flash packages 230. In addition, the RAID type of the flash package group 280 illustrated in FIG. 3 is a 3D+1 P configuration of RAID 4 (a RAID group including three data drives and one parity drive).

The storage controller 200 divides the flash volumes (230-1, 230-2, 230-3, 230-4) of the flash packages 230 belonging to the flash package group 280 into a plurality of fixed-size storage areas called stripe blocks and manages them. For example, in FIG. 3, each region described as 0(D), 1(D), 2(D) . . . n(D), or P0, P1 . . . Pn represents a stripe block. In addition, in the present embodiment, although an example is described in which the size of the stripe block is equal to the size of the virtual segment of the flash volume, as another embodiment, configurations in which the sizes of the stripe block and the virtual segment are different are also possible.

Figure 3:
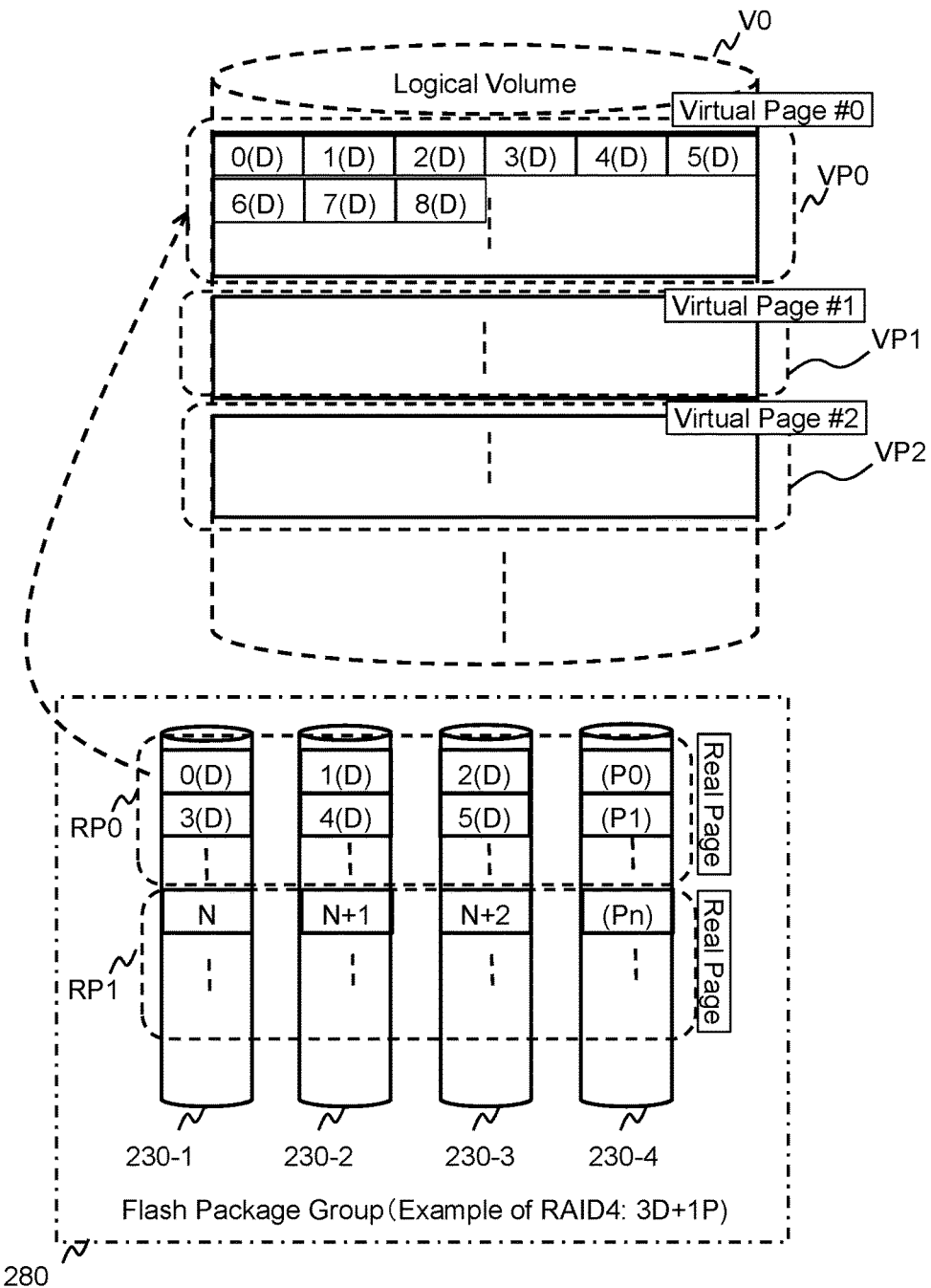
FIG. 3 is a conceptual diagram illustrating a relationship between a logical volume, a virtual page, a real page, and a flash package group.

In FIG. 3, the stripe blocks described as P0, P1 . . . Pn among the stripe blocks are stripe blocks for storing redundant data (parity) generated by the RAID function, and are called "parity stripes". In contrast, the stripe blocks described as 0(D), 1(D), 2(D) . . . n(D) are stripe blocks in which data written from the host 110 (data which is not redundant data) is stored. These stripe blocks are called "data stripes". In the parity stripes, redundant data generated using a plurality of data stripes is stored.

Hereinafter, a set of parity stripes and data stripes used for generating redundant data stored in the parity stripes is referred to as a "stripe line". In the case of the storage system 100 according to the present embodiment, for example, redundant data (parity) generated using data stripes 0(D), 1(D), and 2(D) is stored in the parity stripe P0, and data stripes 0(D), 1(D), 2(D) and parity stripe P0 belong to the same stripe line.

That is, each stripe block belonging to one stripe line exists at the same position (address) on the flash volume (230-1, 230-2, 230-3, 230-4). However, as another embodiment, a configuration in which each stripe block belonging to the same stripe line exists at a different address on the flash volume may be utilized. In the storage system 100 according to the present embodiment, as shown in FIG. 3, real pages (for example RP0, RP1) are composed of one or a plurality of stripe lines.

In addition, when a real page is assigned to a virtual page, only data stripes (0(D), 1(D), etc.) are allocated, and no parity stripe is allocated. Accordingly, the total size of the area where the write data is stored on the real page is equal to the size of the virtual page. That is, (the size of the real page–parity storage area of the real page)=the virtual page size. Although only a configuration example of RAID 4 is depicted in FIG. 3, in a case where the RAID type of the flash package group 280 is RAID 1, for example, the real page size may be twice the virtual page size (virtual page capacity 2600).

The relationship (mapping) between each area in the virtual page and each area in the real page is as depicted in FIG. 3. That is, areas (0(D), 1(D), 2(D)) excluding parity from the top stripe of the real page are allocated to the top area of the virtual page. After that, the areas (3(D), 4(D), 5(D) . . . n(D)) excluding parity from the second and subsequent stripes of the real page are allocated in order to the area of the virtual page.

In this way, since the mapping between each area in the virtual page and each area in the real page is regularly mapped, the storage system 100 can uniquely derive the flash package 230 associated with the access position and the area (data stripe) within the flash package 230 by obtaining the virtual page number and the relative address in the virtual page (the offset address from the top of the virtual page) from the access position (LBA) on the logical volume designated by the access request from the host 110. In addition to the data stripe associated with the access position, the parity stripe belonging to the same stripe line as the data stripe may be uniquely determined. However, the mapping between each area in the virtual page and each area in the real page is not limited to the mapping method described here.

In the capacity virtualization technique, when defining each logical volume, the total storage capacity of each logical volume can be defined to be larger than the capacity of the real storage medium. Accordingly, in general, the number of virtual pages is larger than the number of real pages. Even in the storage device according to the embodiments of the present invention, the number of virtual pages can be made larger than the actual page number.

It should be noted that the real pages allocated to each virtual page in the logical volume are not necessarily limited to the real pages in the same flash package group 280. The real page allocated to the virtual page #0 and the real page allocated to the virtual page #1 may be real pages in different flash package groups 280, respectively. However, in this embodiment, an example will be described in which all the real pages to be allocated to each virtual page of one logical volume are allocated from a flash package group 280 having the same RAID type.

Figure 4:
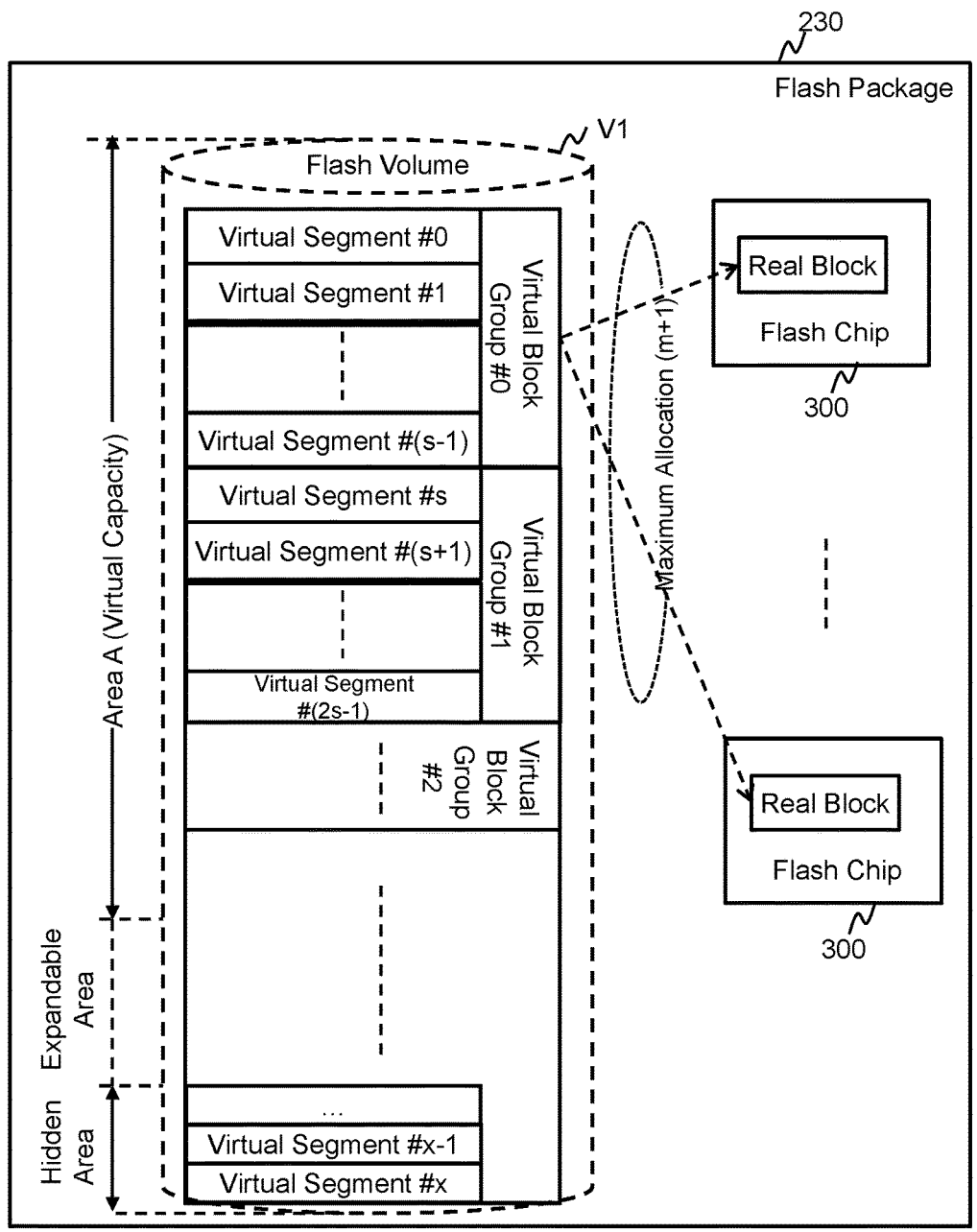
FIG. 4 is a conceptual diagram illustrating a relationship between a flash volume and a real block.

Next, the flash volume will be explained. In the present embodiment, each of the flash packages 230 may have a capacity virtualization function (lower-level capacity virtualization function) and perform deduplication processing. Accordingly, the flash package 230 can provide the storage controller 200 with a flash volume apparently having a capacity larger than the actual physical capacity (the total capacity of the flash chip 300). FIG. 4 illustrates the relationship between a flash volume V1 and the real block.

The flash package 230 may manage the flash volume V1 by dividing the flash volume V1 into regions equal in size to "m" actual blocks. In the present embodiment, this area is referred to as "virtual block group". Also, for convenience, an area within the virtual block group whose size is equal to the size of the real block is referred to as a "virtual block". That is, the virtual block group can be said to be a storage area composed of m virtual blocks.

Each virtual block group may be assigned an identification number, which is called a virtual block group number. In addition, a virtual block group having a virtual block group number of "n" (where n is an integer value of 0 or more) is referred to as "virtual block group #n". This notation method is also used for objects (segments, pages, etc.) other than the virtual block group. When the size of the real block (or virtual block) is B (KB), the area of m×B (KB) from the top of the flash volume V1 is managed as virtual block group #0, and regions of m×B (KB) may be managed as virtual block groups in the order #1, #2 . . . #n.

In the present embodiment, when the flash package 230 receives a write request for a virtual block group to which a real block has not yet been allocated, the real block is allocated for the first time. In addition, the flash package 230 according to the present embodiment may allocate a maximum of (m+1) real blocks to one virtual block group. Hereinafter, the reason why the maximum allocatable number of real blocks is set to m+1 in this embodiment will be described below.

Consider a case where a method of allocating m real blocks to a virtual block group is utilized. In addition, consider that data is written in all areas of the virtual block group, and at that time data can hardly be deduplicated. In this case, m real blocks may be allocated to the virtual block group, but then there will be almost no available capacity in the real block.

At this time, it is assumed that the flash package 230 receives a request (an ordinary write request) from the storage controller 200 for rewriting a portion of the data in the block. Since the flash memory block cannot be rewritten, the flash package 230 must read all the data of the block into the buffer 330, update only the portion where the rewrite request has occurred in the buffer 330, delete the block, and subsequently store the data in the entire block. When the above operations (reading, erasing, and writing of blocks)

are executed ever time the flash package 230 receives a write request, the processing time becomes excessive, and cannot be said to be practical.

In order to solve this problem, in the flash package 230 according to the present embodiment, by allocating one surplus real block to the virtual block group to reserve a free area, additional writing can be performed to the free area. When the free area becomes small and it is no longer included in the rewriting data, an erasure process is performed. In this way, since it is sufficient to execute one erasure process for a plurality of (e.g., "n") write requests, the performance can be improved. In addition, reducing the number of times of erasure processing may also be associated with longer flash memory service life.

As described above, the access (read/write) unit of the flash memory is a "segment". Accordingly, the flash package 230 may divide and manage the space of the flash volume V1 for respective areas equal to the size of a segment. These areas may be referred to as "virtual segments". In FIG. 4, virtual segment #0, virtual segment #1 . . . virtual segment #n represent virtual segments. Virtual segment may also be units of deduplication processing.

When the flash package 230 receives an access request from the storage controller 200 for the flash volume V1, first, the flash package 230 converts the address designated by the access request into an identifier for designating a virtual segment. There are a plurality of types of identifiers (internal virtual segment number, relative virtual segment number, virtual segment address) used by the flash package 230 for designating virtual segments.

The internal virtual segment number is an identifier that can uniquely identify a virtual segment in the flash package 230. The internal virtual segment number of the virtual segment positioned at the top of the flash volume V1 is set to 0. Then, consecutive numbers 1, 2, . . . n are sequentially used for the internal virtual segment numbers of the subsequent virtual segments. In FIG. 4, the numbers (#1, #s, etc.) attached to each virtual segment represent internal virtual segment numbers.

The relative virtual segment number is an identifier that can uniquely identify a virtual segment within the virtual block group. The relative virtual segment number of the first virtual segment in each virtual block group is set to 0. Then, consecutive numbers of 1, 2, . . . n are sequentially used for the relative virtual segment numbers of the subsequent virtual segments.

The virtual segment address is an address generated by concatenating the identifiers of the flash packages (called package ID) with the internal virtual segment number. When a virtual segment address is provided, it is possible to uniquely identify one virtual segment in the storage system 100.

Figure 5:
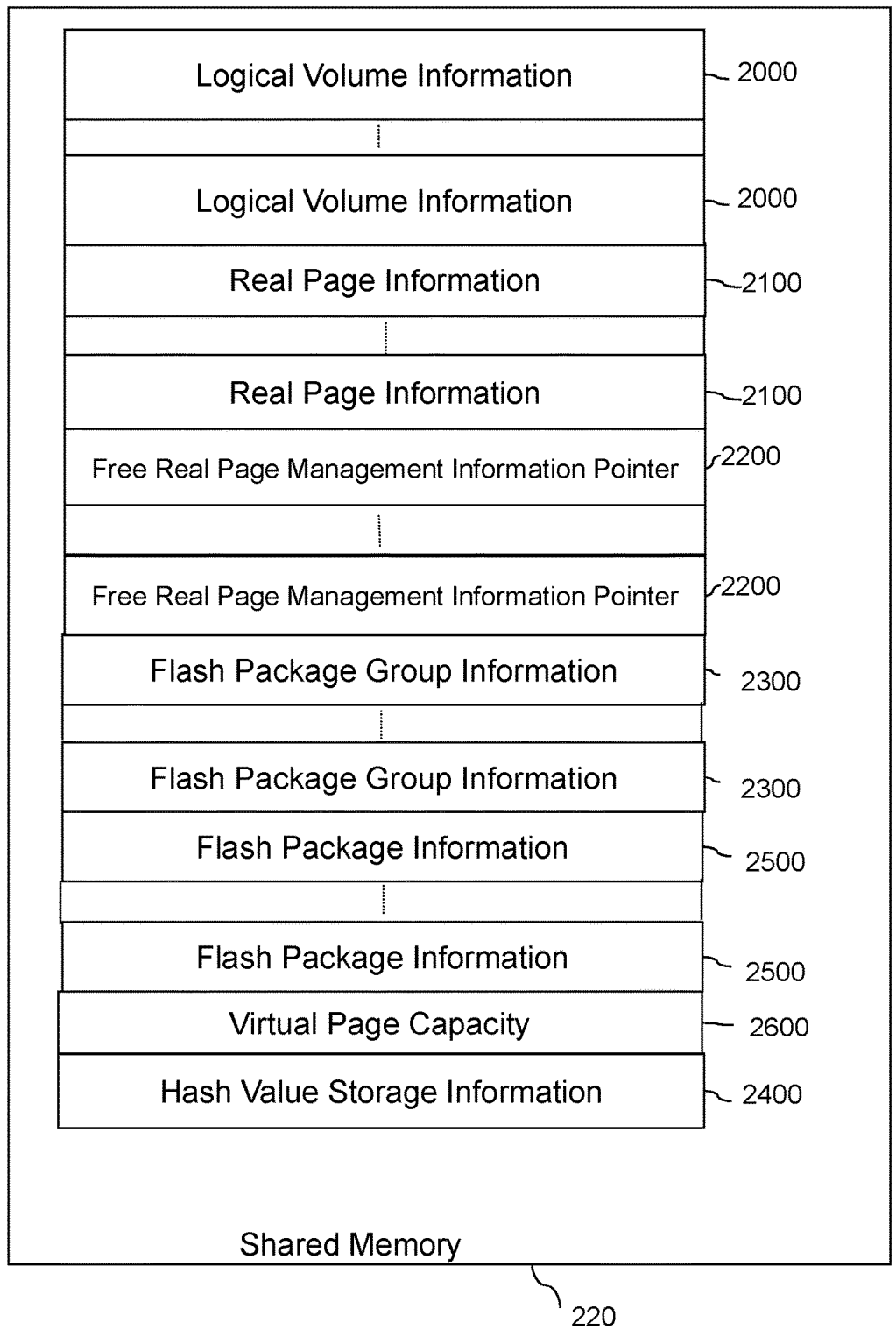
FIG. 5 is a diagram illustrating information stored in a shared memory of a storage system according to a first embodiment.

Next, information managed by the storage system 100 in the present embodiment will be described. FIG. 5 depicts information related to the present embodiment among the information stored in the shared memory 220 of the storage system 100. Hash value storage information 2400 is stored in the shared memory 220 in at least the logical volume information 2000, real page information 2100, free real page management information pointer 2200, flash package group information 2300, flash package information 2500, and virtual page capacity 2600. The information sets other than the hash value storage information 2400 are information necessary for realizing the higher-level capacity virtualization technique.

Each information set will be described below. FIG. 6 illustrates the format of the logical volume information 2000. The logical volume information 2000 is information existing for each logical volume and is information for managing attribute information of the logical volume. Hereinafter, logical volumes whose attribute information is managed by a particular logical volume information 2000 is referred to as a "management target logical volume". The logical volume information 2000 includes a logical volume ID 2001, a logical capacity 2002, a logical volume RAID type 2003, and a real page pointer 2004.

The logical volume ID 2001 indicates the ID of the management target logical volume. Generally, the host 110 specifies the identifier of a logical volume (for example, an identifier such as a logical unit number (LUN)), an address (LBA) in a logical volume, and a length of the data to be read/written, and issues an access request (read request or write request). In the logical volume ID 2001, an identifier of the logical volume specified when the host 110 issues an access request to the logical volume is stored.

The logical capacity 2002 is the capacity of the management target logical volume. The logical volume RAID type 2003 represents the RAID type of the managed logical volume. The information stored in the logical volume RAID type 2003 includes not only the RAID type such as RAID 0 and RAID 1, but when storing redundant data of one capacity for N capacities as in RAID 5, the concrete numerical value of N is also included. However, this is not to say that any arbitrary RAID type can be specified, and it is necessary for it to be a RAID type of at least one flash package group 280. When allocating a real page to the virtual page of the management target logical volume, the storage controller 200 selects the real page from the flash package group 280 whose RAID type of the flash package group 280 is the same as the logical volume RAID type 2003.

The real page pointer 2004 is a pointer to the page management information (real page information 2100 to be described later) of the real page allocated to the virtual page of the management target logical volume. The number of the real page pointers 2004 is the number of virtual pages of the management target logical volume (which is a number obtained by dividing the logical capacity 2002 by the virtual page capacity 2600, or that number+1 if there is a remainder). If the number of virtual pages of the management target logical volume is n, then there are n real page pointers 2004 (there are real page pointers from 2004-0 to 2004-(n−1)).

Among the plurality of real page pointers 2004 (2004-0 to 2004-(n−1)) in the logical volume information 2000, a pointer to the page management information (real page information 2100, to be described later) of the real page allocated to the virtual page #(k−1) is stored in the kth real page pointer 2004-(k−1) from the top. In addition, the trigger to allocate real pages is not when a logical volume is defined, but the trigger of actually receiving a data write request for a virtual page. Accordingly, the real page pointer 2004 corresponding to a virtual page that has not yet been written has an invalid value (NULL).

FIG. 7 depicts the format of the real page information 2100. The real page information 2100 is for managing information about real pages, and one real page information 2100 exists for each real page. The real page information 2100 includes a package group 2101, a real page address 2102, a free page pointer 2103, and a page data storage amount 2104. Note that in the process of describing the following real page information 2100, a real page managed by a particular real page information 2100 is called a "management target real page".

In the package group 2101, the identifier of the flash package group 280 to which the management target real page belongs is stored. Hereinafter, the identifier of the flash package group 280 is referred to as a "package group ID".

In the real page address 2102, information on the position (address) where the management target real page exists is stored. The address stored in the real page address 2102 is a relative address in the flash package group 280 to which the management target real page belongs. The free page pointer 2103 is information used in the case that the management target real page is not assigned to the virtual page. In the present embodiment, a real page that is not assigned to a virtual page is referred to as a "free real page" or "free page". In the case that a management target real page is not allocated to the virtual page, real page information 2100 of another free page is stored in the free page pointer 2103. When the management target real page is allocated to the virtual page, the free page pointer 2103 has a null (NULL) value.

The page data storage amount 2104 is the amount of data stored in the management target real page. However, this information is not attribute information regarding (the storage area of) the flash package 230 allocated to the management target real page, but attribute information regarding the data of the virtual pages to which the management target real page is allocated. Therefore, when another real page is allocated to this virtual page and the data of the current real page is copied to the new real page, it is necessary to transfer over the page data storage amount 2104 as the management information of the new real page.

FIG. 8 illustrates the format of the flash package information 2500. The flash package information 2500 is information for managing the flash package 230, and includes a flash package ID 2501, a flash package virtual capacity 2502, and a block capacity 2503. A flash package information 2500 exists for each flash package 230. Hereinafter, the flash package 230 managed by a particular flash package information 2500 is referred to as a management target flash package.

The flash package ID 2501 is an identifier (referred to as a package ID) of the management target flash package. The flash package virtual capacity 2502 is the size of the area provided to the storage controller 200 in the storage area of the flash volume formed by the management target flash package, and in the present embodiment, this size is referred to as a "virtual capacity."

In the present invention, it is an advantage that the flash package virtual capacity 2502 is adjusted according to the deduplication rate of the flash package 230 or the like. In the present embodiment, the flash package 230 determines this capacity, but it may also be determined by the storage controller 200. In response to receiving notification from the flash package 230 that the virtual capacity has changed, the storage controller 200 may set this value in the flash package virtual capacity 2502.

The block capacity 2503 is the size of a block. Accordingly, the value obtained by dividing the flash package virtual capacity 2502 by the block capacity 2503 is the number of blocks of the flash package 230.

Referring once again to FIG. 4, the relationship between the flash volume and the virtual capacity will be briefly described. The flash package 230 according to the present embodiment provides the storage controller 200 with an area having a size equal to the virtual capacity (flash package virtual capacity 2502) in the flash volume V1. In principle, any arbitrary area of the flash volume V1 may be provided to the storage controller 200, but in the present embodiment, an example is described of providing a continuous area starting from the top of the flash volume V1 (area A; the size of this region is equal to the virtual capacity) as depicted in FIG. 4.

The virtual capacity may be larger than the total storage capacity of all the flash chips 300 of the flash package 230. In FIG. 4, the storage controller 200 can access only the area A (the area equal in size to the virtual capacity) on the flash volume V1. Also, the virtual capacity can fluctuate as described above. As the size of the virtual capacity (that is, the area A) increases, the accessible area increases.

Adjustment of the virtual capacity of the flash package 230 may be performed in the same manner as that described in Patent Document 2, for example. It is assumed that data is written to n virtual segments out of the virtual segments on the flash volume V1. The written data is stored in the actual segments of the flash chip 300 (put differently, it may be said that the actual segments are consumed).

When deduplication is hardly performed, a number of real segments close to n are consumed. In this case, it is desirable that the virtual capacity be about the same as the total of the actual segments in the flash package 230. However, when the deduplication process is performed, only actual segments less than the virtual segment on which data is written are consumed. For example, there are cases where only n/10 actual segments may be consumed. In this case, if the virtual capacity is equal to the total of the real segments in the flash package 230, a large number of real segments go unused, and the storage area cannot be effectively utilized. In this case, if a storage capacity greater than the total of the actual segments (for example, 10 times the total storage capacity of the actual segments) is provided to the storage controller 200 as the virtual capacity, the storage area (actual segments) in the flash package 230 can be effectively utilized.

That is, when the virtual capacity is adjusted (expanded or reduced) according to the ratio (referred to as the deduplication rate) of the amount of virtual segments in which data is written and the amount of consumed real segments, the storage area in the flash package 230 (actual segments) can be effectively utilized. However, since the specific method of adjusting the virtual capacity is not directly related to the present invention, a detailed description thereof will be omitted herein.

In addition, the flash package 230 may reserve an area called a "hidden area" at the end of the flash volume V1. The hidden area may be provided for storing hash index information 3500, as will be described later. The storage controller 200 cannot access the hidden area. However, a program executed by the flash package 230 (at least a program that performs reference updates of the hash index information 3500) can access the hidden area.

FIG. 9 illustrates the format of flash package group information 2300. The flash package group information 2300 may be used to manage information on the flash package group 280. One flash package group information 2300 may exist for each flash package group 280.

The flash package group information 2300 may include a flash package group ID 2301, a package group RAID type 2302, a real page number 2303, a free real page number 2304, and a flash package pointer 2305. Hereinafter, the flash package group 280 managed by a particular flash package group information 2300 is referred to as "management target package group".

The flash package group ID 2301 is an identifier of the management target package group. The package group RAID type 2302 is the RAID type of the management target package group. This RAID type is as described in the explanation of the logical volume RAID type 2003.

The real page number 2303 and the free real page number 2304 indicate the total number of real pages of the management target package group and the number of free real pages, respectively.

The flash package pointer 2305 is the package ID of the flash package 230 belonging to the management target package group. The number of flash package pointers 2305 included in the flash package group information 2300 is equal to the number of flash packages 230 belonging to the management target package group. In addition, this number is determined by the package group RAID type 2302.

Figure 10:
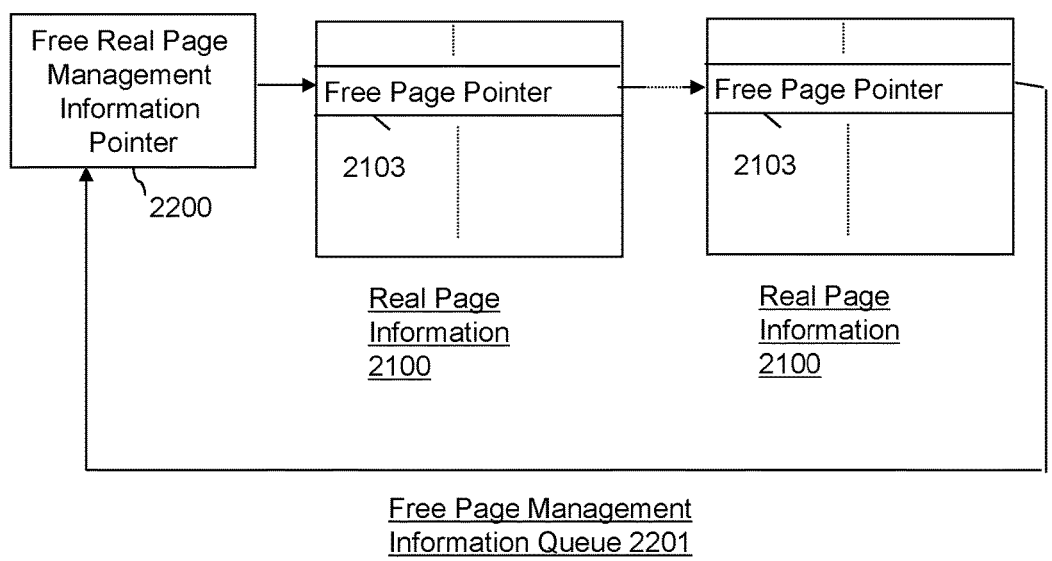
FIG. 10 is a diagram illustrating the structure of a free real page management information queue.

Next, the free real page management information pointer 2200 will be described. The free real page management information pointer 2200 is information provided for each flash package group 280. FIG. 10 depicts a set of free real pages managed by the free real page management information pointer 2200. This structure is called a free real page management information queue 2201. In addition, the real page information 2100 corresponding to the free real pages is referred to as free real page information 2100.

The free real page management information pointer 2200 points to the free real page information 2100 at the top of the free real page management information queue 2201 (that is, the free real page management information pointer 2200 stores the address of the top free real page information 2100). Next, the top free page pointer 2103 in the first real page information 2100 points to the next free real page information 2100. In FIG. 10, although the free page pointer 2103 of the last free real page information 2100 indicates the free real page management information pointer 2200, a null value may also be stored.

In response to receiving a write request for a virtual page to which no real page is allocated, the storage controller 200 selects one of the flash package groups 280 having the same RAID type (package group RAID type 2302) as the logical volume RAID type 2003 of the logical volume to which the virtual page belongs, selects a free real page possessed by the selected flash package group 280, and assigns it to a virtual page. For example, it may be preferable to select a free real page from the free real page management information pointer 2200 of the flash package group 280 that has the largest number of free real pages.

Figure 11:
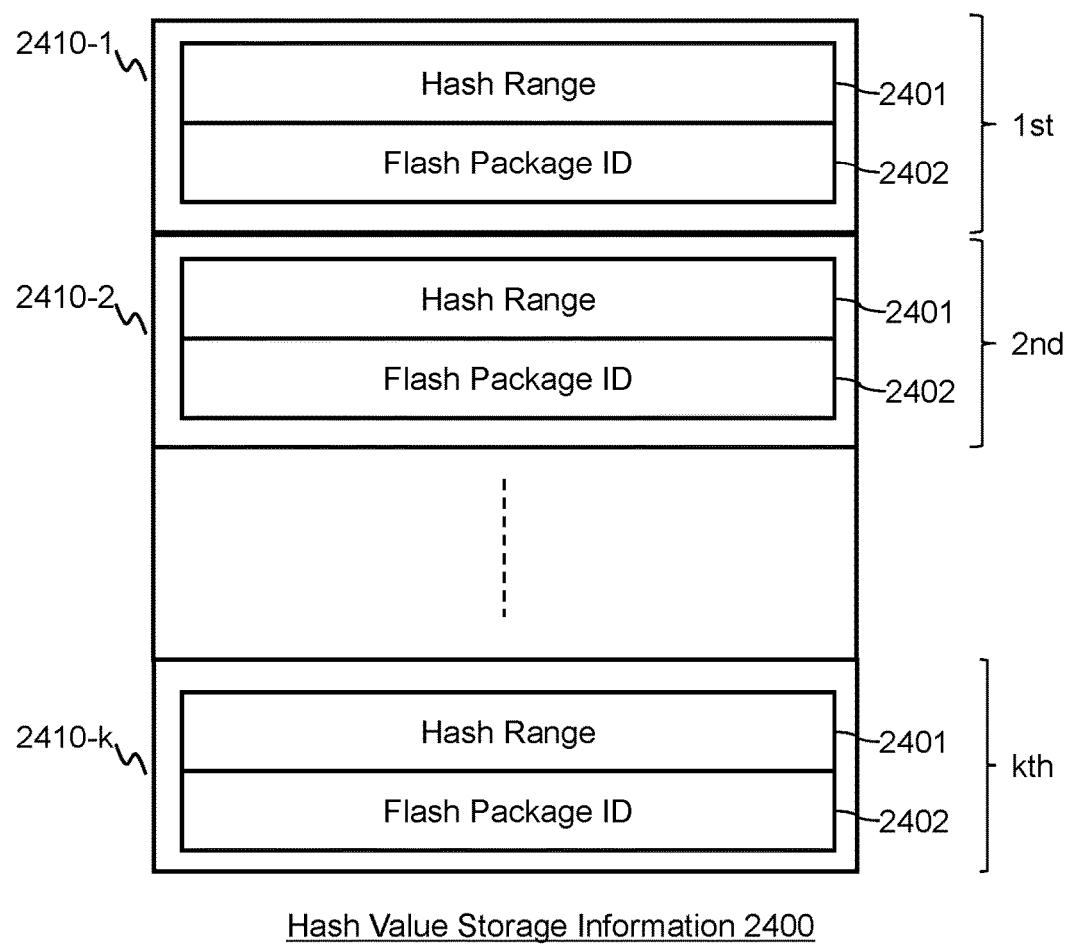
FIG. 11 is a diagram illustrating a format of hash value storage information.

Next, the format of the hash value storage information 2400 will be described with reference to FIG. 11. In the storage system 100 according to the present embodiment, hash values used for determination of deduplication are stored in the flash chip 300. One feature of the storage system 100 according to the present embodiment is that the hash values are distributed and stored in a plurality of flash packages 230. Most of the hash values change each time data is updated. In addition, the hash values have a smaller capacity than the data. Accordingly, if the hash values are consolidated and stored in a specific area, the number of block erasures in that area becomes large in comparison with the data, and there is a high likelihood that the erasure count of the flash memory will reach its limit number early. This is the reason why the storage system 100 distributes and stores the hash values in a plurality of flash packages 230.

Another feature of the storage system 100 according to the present embodiment is that both the hash value and the data are stored in the flash package 230. In this way, the flash package 230 balances the erasure count of both the actual segment that stores the data and the actual segment that stores the hash value by (local) wear leveling. Since the order of updating the hash value and the order of updating the data are roughly the same, the number of updates of the entire real segment of the flash package 230 can be made to be approximately the same order as the number of times the data is updated.

The hash value storage information 2400 is information indicating which flash package 230 stores and manages each hash value. In the storage system 100 according to the present embodiment, a hash space (a range of values that a hash value can take; for example, if the value obtained by a hash function used in the storage system 100 can take a value from 0 to $(2^h-1)$, then the size of the hash space is $2^h$) is divided by a number (assumed to be k) sufficiently larger than the flash package 230, and information regarding the hash value belonging to each division unit is stored in any of the flash packages 230 in the storage system 100 (the reason for dividing by a sufficiently large number is that the size of the information regarding the hash value may be split up depending on each division unit, and the update frequency of the information also becomes unbalanced. For example, if the space of the hash value is 2 to the 32th power, the hash space is divided into a number sufficiently larger than the number of flash packages 230 (the number of flash packages is about one thousand at most); for example, divided into tens of thousands).

The hash value storage information 2400 has a plurality of sets of hash ranges 2401 and flash package IDs 2402. Here, a set of a hash range 2401 and a flash package ID 2402 is referred to as an extent 2410. In FIG. 11, extents 2410-1, 2410-2 . . . , 2410-k are described. The number of extents 2410 is k. When the size of the hash space is $2^h$, the first hash range 2401 is 0 to $2^h \div k-1$, and the second is $2^h \div k$ to $2 \times 2^h \div k-1$. The ith is $(i-1) \times 2^h \div k$ to $i \times 2^h \div k-1$.

In the flash package ID 2402, the package ID of the flash package 230 is stored. For example, this means that when the hash value range stored in the hash range 2401 in a particular extent 2410 is a to b and the flash package ID 2402 in the extent 2410 is p, the hash value of the range a to b is stored in the flash package #p. Also in this case, the hash value in the range of a to b is called the "hash value in charge of flash package #p".

Figure 12:
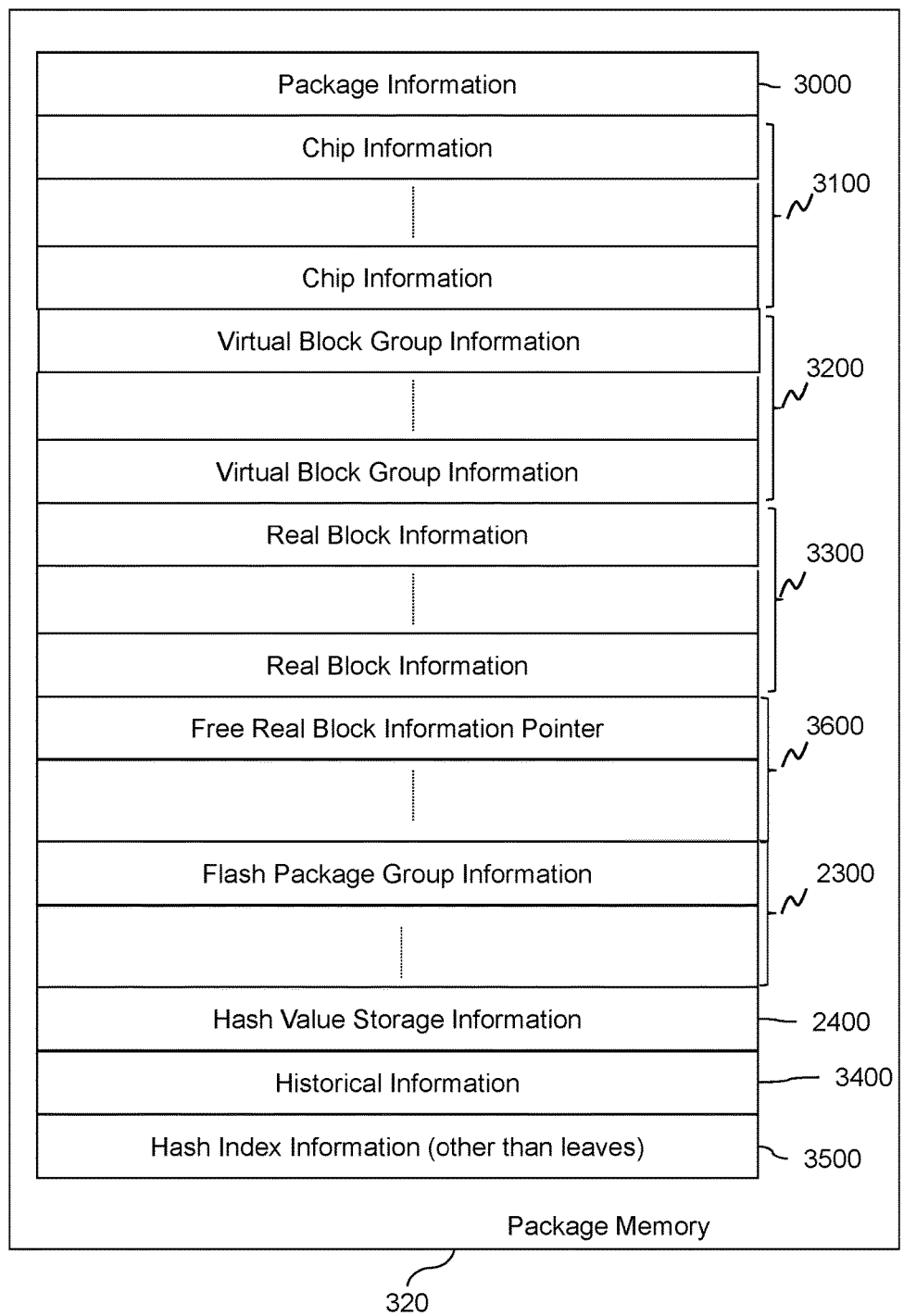
FIG. 12 is a diagram illustrating information stored in a package memory of a flash package according to the first embodiment.

Next, the management information possessed by the flash package 230 will be described. The flash package 230 stores most of the management information in the package memory 320. FIG. 12 depicts the information included in the package memory 320. Information included in the package memory 320 includes package information 3000, chip information 3100, virtual block group information 3200, real block information 3300, free real block information pointer 3600, flash package group information 2300, hash value storage information 2400, historical information 3400, and non-leaf segment hash index information 3500.

As the hash value storage information 2400 and the flash package group information 2300 are substantially the same as the hash value storage information 2400 and the flash package group information 2300 of the storage controller 200, the description of the contents thereof is omitted here. Note that the flash package group information 2300 of all the flash package groups 280 included in the storage system 100 is stored in the package memory 320.

The hash value storage information 2400 and the flash package group information 2300 may be provided to the flash packages 230 from the storage controller 200 at the time of initialization, for example. Each time the storage controller 200 updates the hash value storage information 2400 and the flash package group information 2300, the storage controller 200 provides the updated information to each flash package 230.

The reason why each flash package 230 has the same information as the hash value storage information 2400 of the storage controller 200 in the storage system 100 according to the present embodiment is that, at the time of the deduplication processing, it is necessary for each flash package 230, and not just the storage system 100, to be aware of the information regarding the hash values that each flash package 230 is in charge of.

Also, the reason why the flash package 230 has the same information as the flash package group information 2300 managed by the storage controller 200 is that, when the flash package 230 makes a deduplication determination, it identifies data that should not be deduplicated. For example, when deduplication processing is performed on data belonging to the same stripe line, redundancy is lost, and data may not be regenerated in the event of failure of the flash package 230. Accordingly, the flash package 230 according to the present embodiment does not perform the deduplication processing for data belonging to the same stripe line. At that time, the flash package 230 uses the flash package group information 2300 to determine whether or not a plurality of data sets belong to the same stripe line.

Figure 13:
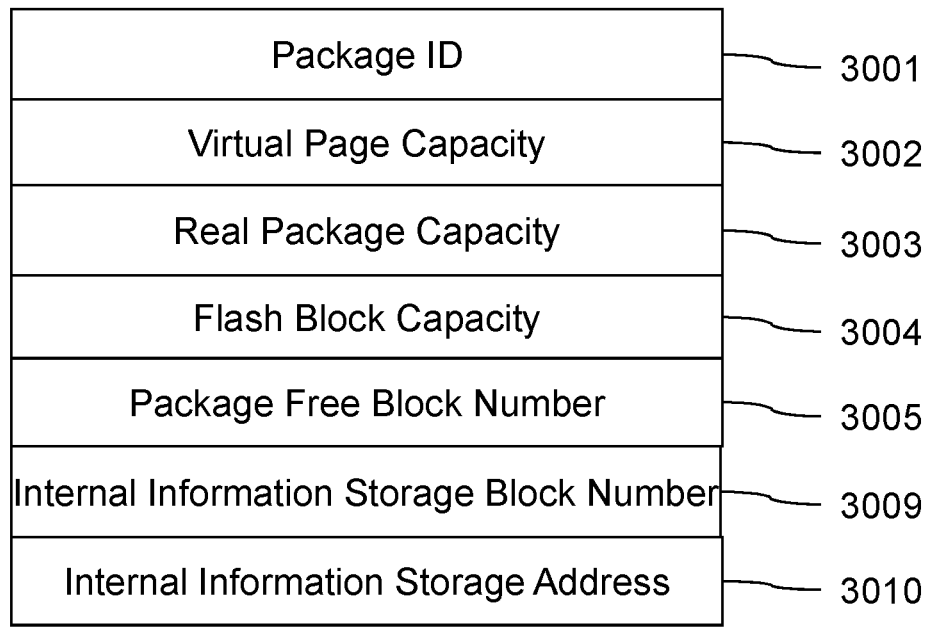
FIG. 13 is a diagram illustrating the format of package information.

FIG. 13 illustrates the format of the package information 3000. The package information 3000 may include a package ID 3001, a virtual package capacity 3002, a real package capacity 3003, a flash block capacity 3004, a package free block number 3005, an internal information storage block number 3009, and an internal information storage address 3010.

The package ID 3001 is an identifier of the flash package 230. The virtual package capacity 3002 is the virtual capacity of the flash package 230. The real package capacity 3003 is the capacity of the physical storage area (real blocks or real segments of the flash chip 300) of the flash package group 280. However, this capacity is a sum of a capacity for storing write data from the storage controller 200, a capacity for storing information used for deduplication, a capacity for evacuating information in the package memory 320, and a capacity of an area used for purposes of reclamation (spare area) or the like.

The flash block capacity 3004 is the size of a block, which is an erase unit of the flash memory. The number of free blocks 3005 is the number of free blocks in the flash package 230.

The internal information storage block number 3009 is the number of blocks of real blocks (these real blocks will be referred to as "internal information storage blocks") of the package information 3000, the chip information 3100, the virtual block group information 3200, the real block information 3300, the historical information 3400, the non-leaf segment hash index information 3500, and the free real block information pointer 3600 stored in the package memory 320 to be evacuated in the event of a power off or a failure occurrence. The internal information storage address 3010 is the address of the internal information storage block. As the package information 3000, the chip information 3100, the virtual block group information 3200, and the real block information 3300 are important information, they may be stored n times. Also, as evacuation is not performed a greater number of times, the erasure count of the real blocks, etc., are not considered to be problematic.

Figure 14:
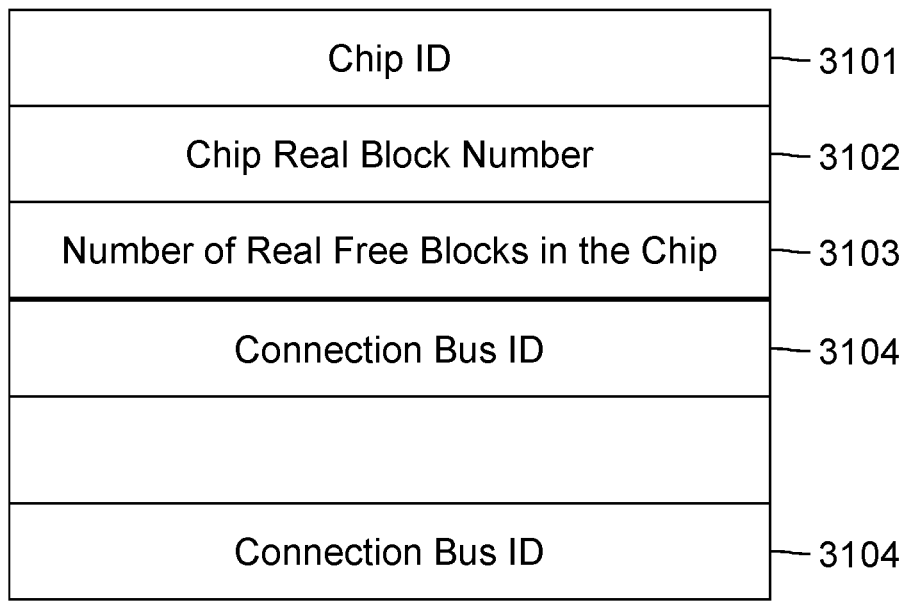
FIG. 14 is a diagram illustrating a format of chip information.

FIG. 14 depicts the format of chip information 3100. The chip information 3100 is information for managing the attribute information of the flash chip 300. The chip information 3100 is information that exists for each flash chip 300. The chip information 3100 may have a chip ID 3101, a chip real block number 3102, a number of free real blocks in the chip 3103, and a connection bus ID 3104. Hereinafter, the flash chip 300 to be managed by particular chip information 3100 is referred to as a "management target chip".

The chip ID 3101 is the chip ID of the management target chip. The chip real block number 3102 is the number of real blocks possessed by the management target chip. The number of free real blocks in the chip 3103 indicates the number of free real blocks in the management target chip. Note that the free real block number refers to a real block not allocated to a virtual block group. The connection bus ID 3104 is an identifier of the package bus 340 to which the management target chip is connected.

Figure 15:
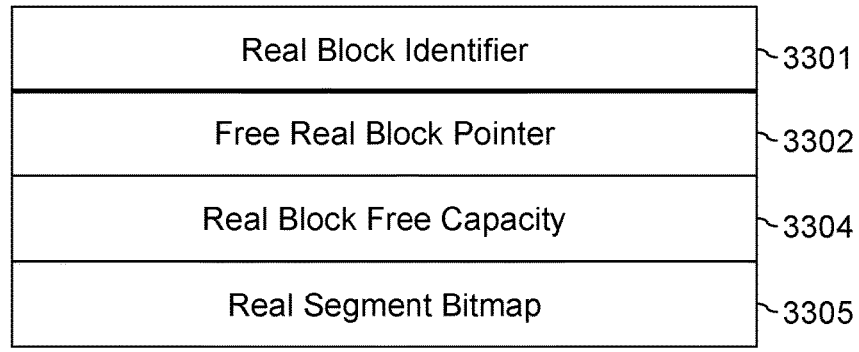
FIG. 15 is a diagram illustrating the format of real block information.

FIG. 15 illustrates the format of the real block information 3300. The real block information 3300 is information that exists for each real block. The real block information 3300 may include a real block identifier 3301, a free real block pointer 3302, a real block free capacity 3304, and a real segment bitmap 3305. In the following description, a real block to be managed by particular real block information 3300 will be referred to as a "management target real block".

The real block identifier 3301 is an identifier of the management target real block. In this embodiment, the identifier of the real block is expressed as a combination of the chip ID, die number, and block number of the flash chip 300 to which the real block belongs in order to uniquely identify the real block in the flash package 230. The free real block pointer 3302 points to the real block information 3300 of the real block in the next free state when the real target block to be managed is not allocated to the virtual block group (in a free state).

The real block free capacity 3304 indicates the current free space of the management target real block. The package processor 310 can store the write data in a free area of the management target real block when it receives write data from the storage controller 200 of a size less than or equal to the real block free capacity 3304 of the management target real block. After storing the write data, the package processor 310 subtracts the size of the stored data from the real block free capacity 3304. Note that, as the smallest write unit of the flash memory is a segment, the size of the stored data is an integral multiple of a segment (actual segment).

The actual segment bitmap 3305 is N-bit size information when the number of real segments in the real block is N. When the kth bit in the real segment bitmap 3305 is 1 (ON), this means that the kth actual segment from the top in the management target real block is in use (allocated to a virtual segment), when it is 0 (OFF), this means that the kth actual segment from the top in the management target real block is unused (not allocated to a virtual segment).

Figure 16:
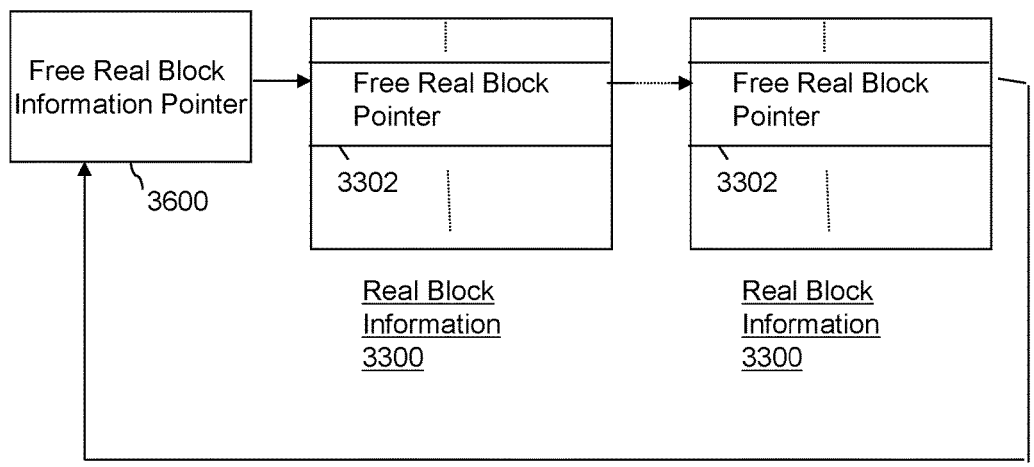
FIG. 16 is a diagram illustrating the structure of a free real block information queue.

Next, the free real block information pointer 3600 will be described. A free real block information pointer 3600 exists for each flash chip 300. FIG. 16 illustrates a set of free real blocks managed by the free real block information pointer 3600. This structure is called a free real block information queue 1700. The free real block information pointer 3600 points to the real block information 3300 of the top free real block within the free real block information queue 1700 (that is, the free real block information pointer 3600 stores an address on the package memory 320 in which the real block information 3300 of the top free real block is stored). Next, the free real block pointer 3302 in the real block information 3300 of the top free real block points to the real block information 3300 of the next free real block. In FIG. 16, the free real block pointer 3302 of the real block information 3300 of the free real block information 3300 at the end of the free real block information queue 1700 indicates the free real block information pointer 3600, but may also be a null value.

In response to receiving a write request for a virtual segment within a virtual block group to which no real block is allocated, the package processor 310 searches for a free real block from the free real block information pointer 3600 corresponding to any one of the flash chips 300 and allocates it to the virtual block group. For example, it may be desirable that a free real block is selected from the flash chip 300 that has the largest number of free real blocks (number of free real blocks in the chip 3103).

Figure 17:
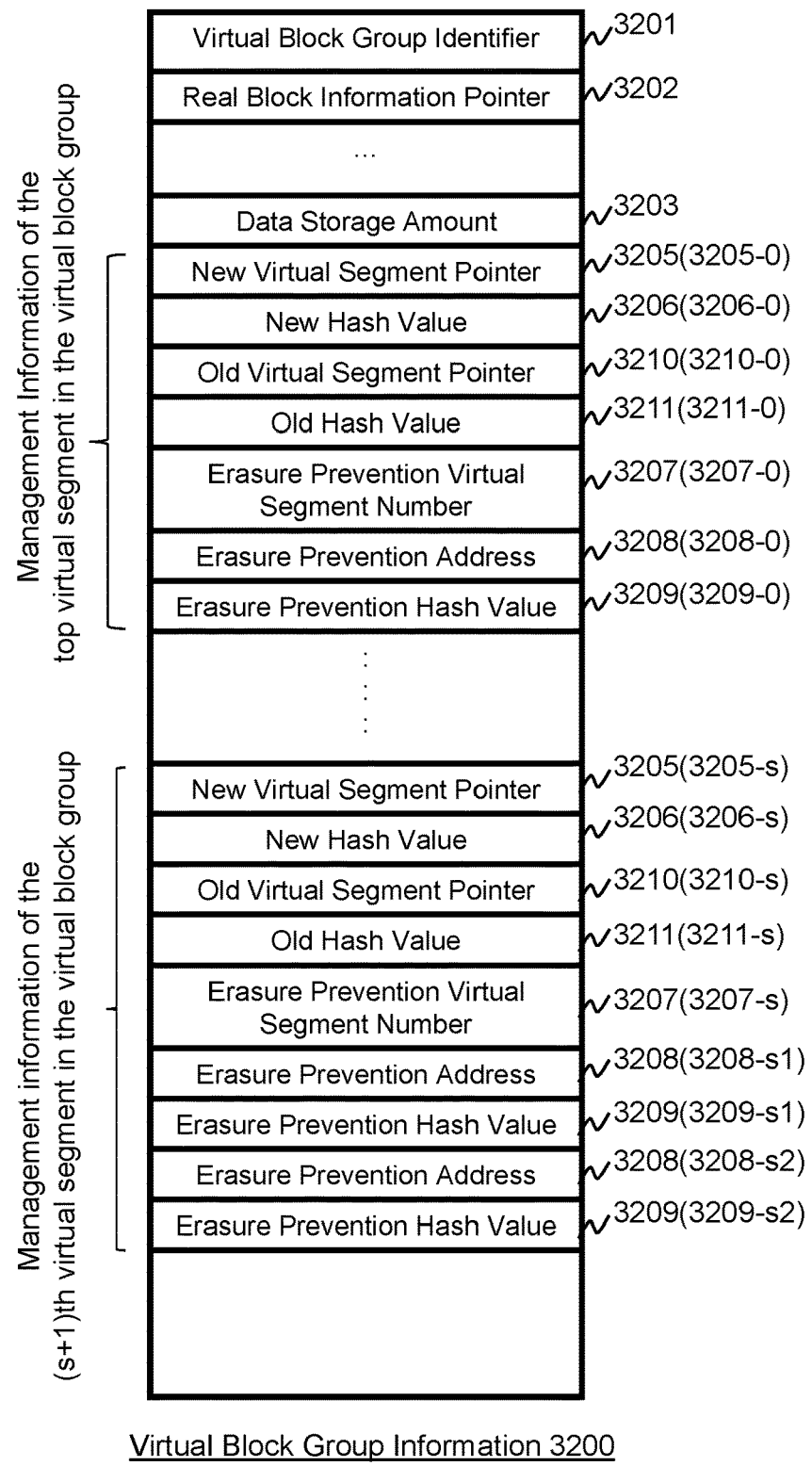
FIG. 17 is a diagram illustrating a format of virtual block group information.

FIG. 17 illustrates the format of the virtual block group information 3200. The virtual block group information 3200 is information for managing a virtual block group, and is information that exists for each virtual block group. It is assumed that the virtual block group information 3200 is arranged in order of the addresses of the virtual block group in the package memory 320. The top virtual block group information 3200 in the package memory 320 is management information for virtual block group #0. The kth virtual block group information 3200 from the top in the package memory 320 is management information for the virtual block group #(k−1).

The virtual block group information 3200 may include a virtual block group identifier 3201, a real block information pointer 3202, a data storage amount 3203, a new virtual segment pointer 3205, a new hash value 3206, an old virtual segment pointer 3210, an old hash value 3211, an erasure prevention virtual segment number 3207, an erasure prevention address 3208, and an erasure prevention hash value 3209. Hereinafter, the virtual block group managed by the virtual block group information 3200 will be referred to as a "management target virtual block group".

In the present embodiment, an example is described in which the unit of the deduplication processing is a segment. However, the present invention is also applicable when the unit of deduplication is not a segment. The storage system 100 according to the present embodiment checks, for each virtual segment in which update data is written, whether or not data having the same hash value as the hash value of the update data written in the relevant virtual segment has already been stored in one of the flash packages 230. If such data already exists, the update data is not stored (but rather deleted). This has the effect of reducing the amount of data stored in the flash package 230.

The virtual block group identifier 3201 is an identifier of the management target virtual block group. The real block information pointer 3202 is a pointer to the real block information 3300 (an address on the package memory 320 in which the real block information 3300 is stored) of the real block allocated to the management target virtual block group. There may be m+1 real block information pointers 3202. When no real blocks are allocated, the real block information pointer 3202 is a null value. In a case that the number of real blocks allocated to the virtual block group is p (m+1 or less), p real block information pointers 3202 from the top are valid (not null values).

The data storage amount 3203 represents the amount of data stored in the management target virtual block group. The maximum capacity is (capacity of real blocks×(m+1)). In the case of flash memory, when the content of a virtual segment is updated, the update data is stored in a real segment different from the real segment previously allocated to the virtual segment. Accordingly, data (most recent data and pre-update data) written to the same virtual segment exists in a plurality of locations. Therefore, there are cases where the data storage amount 3203 may become larger than the total size of the virtual segments within the virtual block group.

The new virtual segment pointer 3205, the new hash value 3206, the erasure prevention virtual segment count 3207, the erasure prevention address 3208, the erasure prevention hash value 3209, the old virtual segment pointer 3210, and the old hash value 3211, which will be subsequently described, are information that is provided for each virtual segment. Hereinafter, these pieces of information may be collectively referred to as "virtual segment management information".

Each of the new virtual segment pointer 3205, the new hash value 3206, the old virtual segment pointer 3210, and the old hash value 3211 are information that exist within the virtual block group information 3200 in a number equal to the number of virtual segments in the virtual block group. Note that, in the Figures, there are locations where the reference number of the new virtual segment pointer 3205 is listed as "3205-s". This indicates that the relative virtual segment number is the new virtual segment pointer of the virtual segment of "s". This reference number assignment rule is also applied to the new hash value 3206, the old virtual segment pointer 3210, the old hash value 3211, the erasure prevention virtual segment number 3207, the erasure prevention address 3208, and the erasure prevention hash value 3209.

The new virtual segment pointer 3205 represents the address of the area currently allocated to the virtual segment. To be precise, address information for the area (actual segment or virtual segment) in which the storage controller 200 stores the most recent data (updated data) among the data written to the virtual segments is stored in the new virtual segment pointer 3205. The new hash value 3206 is a hash value of the most recent data written in the virtual segment. In particular, it is a hash value of data stored in the area specified by the new virtual segment pointer 3205.

In the new virtual segment pointer 3205, the old virtual segment pointer 3210, and the erasure prevention address 3208, either information directly indicating an actual segment or information indicating a virtual segment is stored. Information directly indicating a real segment is information composed of a combination of an identifier (real block identifier 3301) of a real block in which data is stored and a relative address (relative segment number) of that real block, and this information may be referred to as a real segment address.

Figure 18:
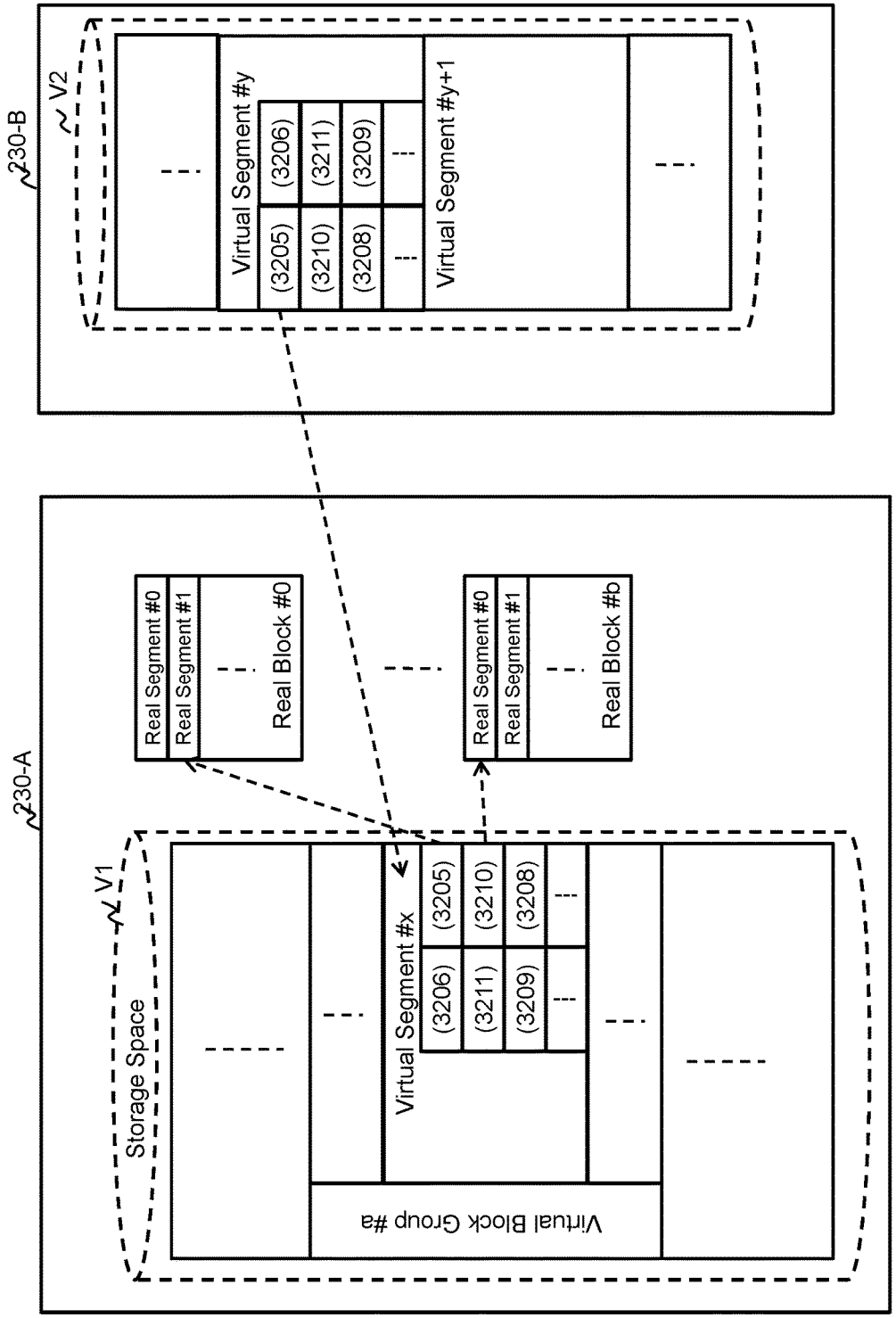
FIG. 18 is a conceptual diagram illustrating a state of a virtual segment when deduplication processing is performed.

For example, in the example depicted in FIG. 18, the most recent data written in the virtual segment #x of the flash package 230-A is stored in the real segment #1 (representing a real segment with a relative segment number of 1) of the real block #0. In that case, a set of the real block identifier 3301 of the real block #0 and the relative segment number (1) of the real block #0 are stored in the new virtual segment pointer (3205) of the virtual segment #x. In response to receiving a read request for the virtual segment #x from the storage controller 200, the flash package 230-A can identify the real segment (real segment #1 in the real block #0) in which the read target data is stored by referring to the new virtual segment pointer (3205) of the virtual segment #x.

In contrast, a virtual segment address is used as information indicating a virtual segment. When the virtual segment deduplication processing is performed, there are cases where the virtual segment address may be stored in the new virtual segment pointer 3205. In FIG. 18, for example, it is assumed that the same data as the data written in the virtual segment #x is written in the virtual segment #y, and the deduplication processing is performed. In this case, the virtual segment address of the virtual segment #x of the flash package 230-A is stored in the new virtual segment pointer (3205) of the virtual segment #y.

In the present embodiment, when the virtual segment address of the virtual segment #x is stored in the new virtual segment pointer 3205 (of the virtual segment #y) as in the state shown in FIG. 18, the virtual segment #y is stated to be "referring to the virtual segment #x". Also, the virtual segment #x may be expressed as "a virtual segment referenced by the virtual segment #y". In addition, when the virtual segment address of the virtual segment #x is stored in the old virtual segment pointer 3210 (of the virtual segment #y) or the erasure prevention address 3208, it can be stated that "virtual segment #y refers to virtual segment #x". It should be noted that these same expressions can be used for real segments. For example, in FIG. 18, the real segment address of the real segment #1 of the real block #0 is stored in the new virtual segment pointer 3205 of the virtual segment #x. In this case, it can be stated that "the real segment #1 is referenced by the virtual segment #x".

Note that in the present embodiment, in order that the flash package 230 (package processor 310) can recognize whether the information stored in the new virtual segment pointer 3205 (or the old virtual segment pointer 3210 or the erasure prevention address 3208) is a real segment address or a virtual segment address, the format of the real segment address and the virtual segment address may be defined. For example, it may be preferable that the uppermost bit of the real segment address always be "1," and the uppermost bit of the virtual segment address always be "0".

When the storage controller 200 issues a read request for the virtual segment #y to the flash package 230-B in the state shown in FIG. 18, the flash package 230-B may recognize that the virtual segment address of the virtual segment #x is stored in the new virtual segment pointer (3205) by referring to the new segment pointer (3205) of the virtual segment #y. In this case, the flash package 230-B may return the read virtual segment address and the like to the storage controller 200. In response to receiving this information, the storage controller 200 may issue a read request with the returned virtual segment address (virtual segment #x) as the access destination, and thereby obtain the target read data (that is, access redirection performed). Details thereof will be described later.

The old virtual segment pointer 3210 may store, from among the data written in the virtual segment, address information for an area in which pre-update data is stored. The old hash value 3211 is a hash value of the data stored in the area specified by the old virtual segment pointer 3210. In FIG. 18, the old virtual segment pointer (3210) of the virtual segment #x may point to the real segment #0 of the real block #b. This means that the pre-update data of the virtual segment #x is stored in the real segment #0 of the real block #b.

As a general rule, when an update to a virtual segment occurs, data (pre-update data) written in the virtual segment in the past may be erased. However, when deduplication processing is performed, a state may occur in which other virtual segments refer to this pre-update data (it is pointed to by the new virtual segment pointer 3205 of another virtual segment or the like) (for example, in FIG. 18, the virtual segment #x of the flash package 230-A is referred to by the virtual segment #y of the flash package 230-B). In this case, as the pre-update data cannot be erased, the old virtual segment pointer 3210 and the old hash value 3211 are used for storing (saving) this data.

When further updates occur in the virtual segment, it becomes necessary to evacuate the contents stored in the old virtual segment pointer 3210 and the old hash value 3211 as well. Accordingly, the erasure prevention address 3208 and the erasure prevention hash value 3209 described later are utilized.

Note that, although an example was described in the present embodiment in which a new virtual segment pointer 3205, a new hash value 3206, an old virtual segment pointer 3210, and an old hash value 3211 exist for each virtual segment, it is also possible to provide the same information for two or more virtual segments.

The erasure prevention address 3208 and the erasure prevention hash value 3209 may be used for evacuating the values of the old virtual segment pointer 3210 and the old hash value 3211. The number of old virtual segment pointers 3210 and old hash values 3211 that need to be evacuated is not necessarily 1. Accordingly, one or more erasure prevention addresses 3208 and erasure prevention hash values 3209 may be provided for one virtual segment.

In addition, the number of erasure prevention virtual segments 3207 indicates the number of virtual segments that should not be erased (that is, the number of sets of the erasure prevention address 3208 and the erasure prevention hash value 3209). In the example of the virtual block group information 3200 depicted in FIG. 17, there are two of each of the erasure prevention address (3208-$s1$, 3208-$s1$) and the erasure prevention hash values of the (s+1)th virtual segment (the virtual segment with relative virtual segment number s) in the virtual block group. In this case, the value of the number of erasure prevention virtual segments (3207-$s$) becomes 2.

As described above, information such as the new virtual segment pointer 3205, the old virtual segment pointer 3210, and the erasure prevention address 3208 are provided for each virtual segment, and as a result, there are cases where a plurality of real segments (or virtual segments) may be assigned to a single virtual segment. As described above, the most recent data (updated data) among the data written from the storage controller 200 to the virtual segment is stored in the real segment pointed to by the new virtual segment pointer 3205. Accordingly, when receiving the read request from the storage controller 200, as a general rule, the flash package 230 may read out and return the data of the real segment pointed to by the new virtual segment pointer 3205 as described above.

However, when access redirection occurs, it may be necessary to return the pre-update data (that is, the data stored in the actual segment pointed to by the old virtual segment pointer 3210 and the erasure prevention address 3208). This specific method will be described later.

In the following description, among the data written in the virtual segment, the data stored in the real segment pointed to by the new virtual segment pointer 3205 of the virtual segment will be referred to as "data after update of the virtual segment" or "virtual segment update data". In contrast, the data stored in the real segment pointed to by the old virtual segment pointer 3210 or erasure prevention address 3208 of the virtual segment is referred to as "data prior to update of the virtual segment" or "old data of the virtual segment".

Note that the storage system 100 according to the present embodiment may use the hash function SHA-256 to calculate a hash value of data to be written in the virtual segment by. In SHA-256, the probability of occurrence of collision is extremely low. Accordingly, in the storage system 100 according to this embodiment, when there are a plurality of data sets having the same hash value, it is assumed that the contents of these data sets are the same, and deduplication processing is performed. However, in addition to the hash value comparison, the present invention can also be applied to a case where deduplication determination is made by comparing the entire contents of each data set (in units of bits or bytes).

Figure 19:
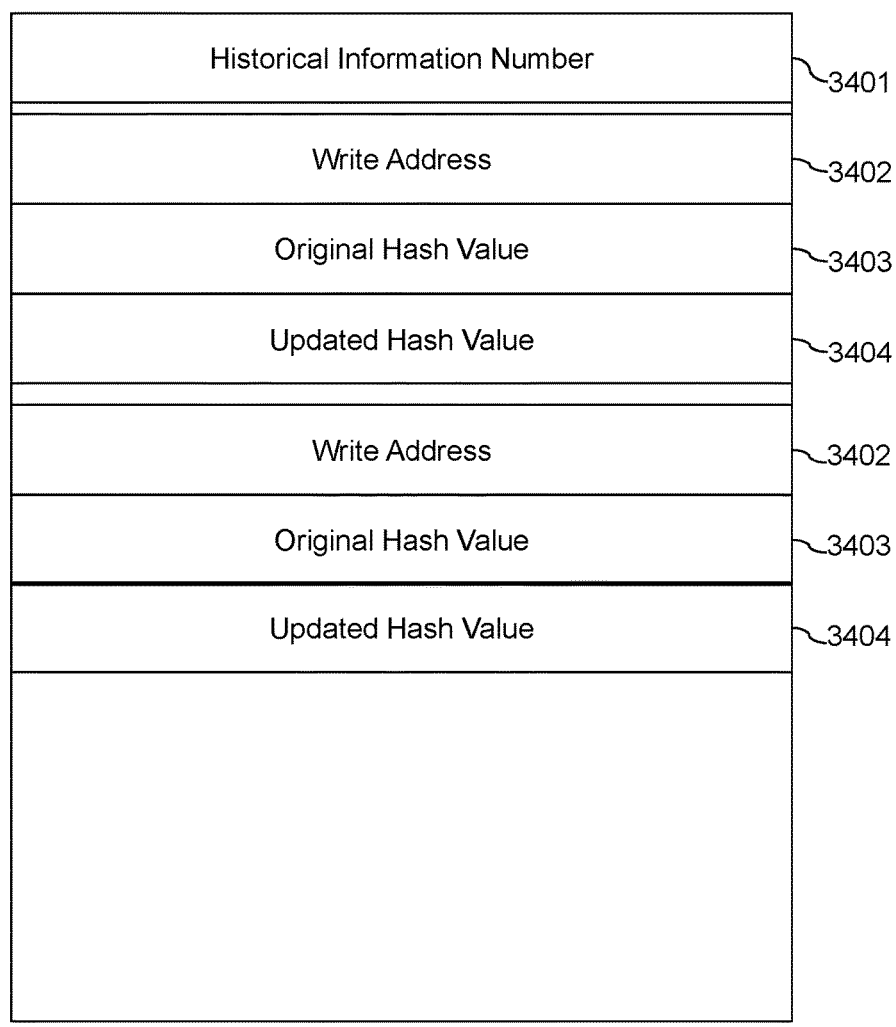
FIG. 19 is a diagram illustrating a format of historical information.

Next, the historical information 3400 illustrated in FIG. 19 will be described. In the storage system 100 according to the present embodiment, the deduplication processing is executed asynchronously with the write processing of the host 110. Accordingly, the flash package 230 may maintain historical information 3400 indicating the history of the write processing. The historical information 3400 may include a historical information number 3401, a write address 3402, an original hash value 3403, and an updated hash value 3404.

The write address 3402 is a virtual segment address of a virtual segment in which write data is written from the storage controller 200. Hereinafter, the write address 3402 may be referred to as "virtual segment address 3402".

The original hash value 3403 and the updated hash value 3404 may represent the hash value of the data (original data or updated data) written in the virtual segment specified by the write address 3402. The updated hash value 3404 is information indicating the hash value of the updated data. In contrast, the original hash value 3403 is information indicating the hash value of the original data. Hereinafter, a set of the write address 3402, the original hash value 3403, and the updated hash value 3404 is referred to as a "write history".

The historical information number 3401 is information indicating the number of write histories (sets of the write address 3402, original hash value 3403, and updated hash value 3404) stored in the historical information 3400, and the initial value is 0. Each time the flash package 230 receives a write request from the storage controller 200 and performs write processing, the write history is added to the historical information 3400 and the value of the historical information number 3401 is increased. The write history is stored in the historical information 3400 in the order of the time when the write request was received. The write history stored immediately after the historical information number 3401 is the oldest write history. In response to receiving a historical information transmission request from the storage controller 200, the flash package 230 transmits the historical information 3400 to the storage controller 200 and clears all the information in the historical information 3400 (the historical information number 3401 is set to 0. Also, each write history may also be erased).

Next, the hash index information 3500 will be described. As described above, in the storage system 100 according to the present embodiment, the range of the hash value assigned to each flash package 230 is predetermined. The hash index information 3500 is information for specifying the flash package 230 (to be precise, the virtual segment address) in which data having the hash value is stored when a hash value is provided. In the hash index information 3500, a hash value assigned to the flash package 230 and information on the storage position of the data having the hash value are stored.

Figure 20:
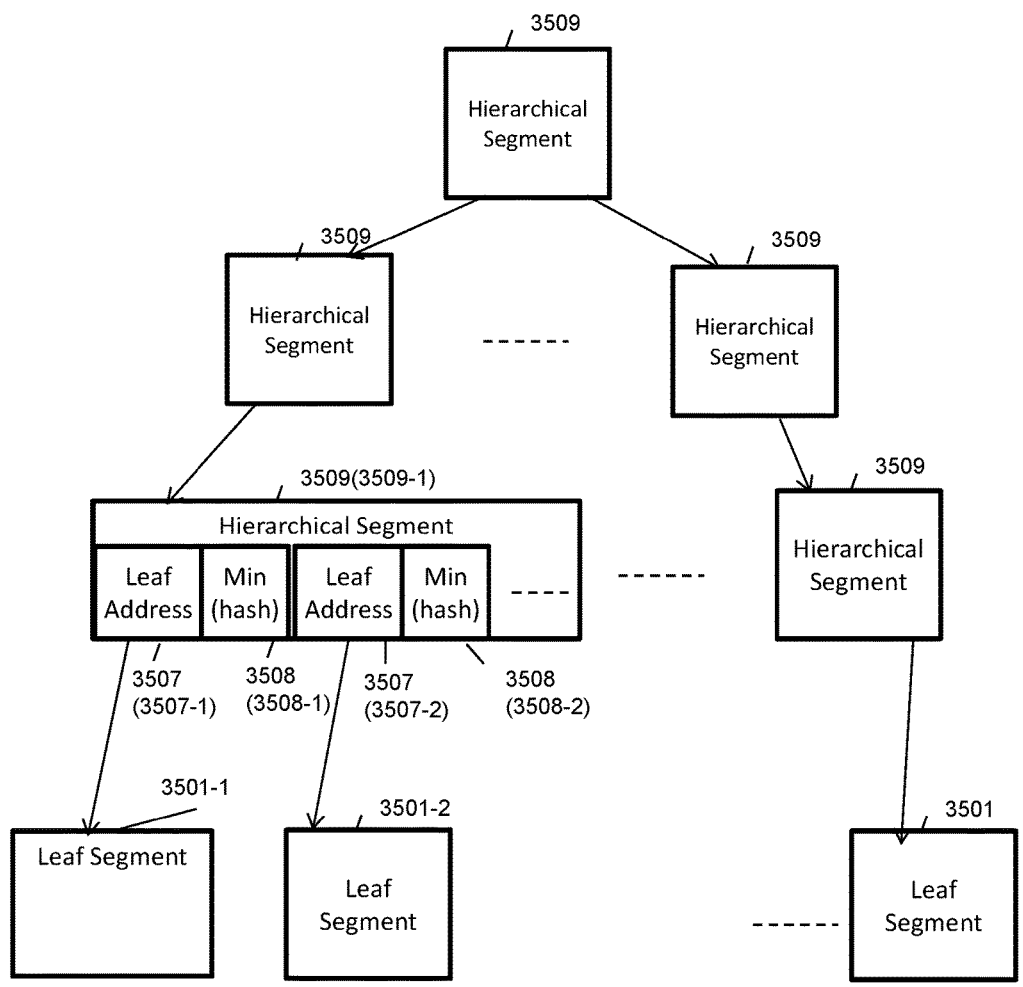
FIG. 20 is a diagram illustrating the structure of hash index information.

The structure of the hash index information 3500 is depicted in FIG. 20. Basically, this structure has the same structure as B+Tree, etc., used for indices managed by DBMSs (database management system).

The leaf segment 3501 corresponds to a leaf node in a tree structure such as B+Tree. In the present embodiment, each node existing on the route from the root node of the B+Tree to the leaf node is called a hierarchical segment 3509. Information (each layer segment 3509) other than the leaf segment 3501 is stored in the package memory 320 (and internal information storage block). In contrast, the leaf segment 3501 is stored in the flash chip 300.

However, as described above, the flash package 230 has an area (hidden area) where the leaf segments 3501 are stored on the flash volume. A program that refers to or updates the leaf segment 3501 (such as the deduplication determination unit 12300 described later) issues a read request or a write request to a virtual segment on the hidden area, thereby reading and writing the leaf segment 3501. As a result, the leaf segment 3501 is written to the flash chip 300 (real segment allocated to the virtual segment).

Accordingly, the size of the leaf segment 3501 is the same size as the virtual segment. In the leaf segment 3501, only an amount of information less than the size of the virtual segment may be stored. In this case, by padding with invalid data such as "0," the program for updating the leaf segment 3501 may make the leaf segment 3501 have the same size as the virtual segment, and store it in the flash chip 300.

The leaf segment 3501 stores a hash value and a set of storage positions of data having that hash value. A virtual segment address is used as information for expressing the storage position of the data. Accordingly, hereinafter, the storage position of data having a hash value H is referred to as a "virtual segment having a hash value H".

Information regarding the range of the hash values stored in the leaf segment 3501 is included in a parent node (hierarchical segment 3509) of the leaf segment 3501. The range of the hash values stored in the leaf segment 3501 will be described with reference to FIG. 20. In FIG. 20, the leaf segment 3501-1 and the leaf segment 3501-2 are connected to a hierarchical segment 3509-1, which is a common parent node.

The hierarchical segment 3509 includes one or more sets (equal to the number of leaf segments 3501 connected to the hierarchical segment 3509) of a leaf address 3507 and a minimum value Min (hash)) 3508 of the hash values. The leaf address 3507 is a pointer to the leaf segment 3501. The value used for the pointer to the leaf segment 3501 is the virtual segment address (since the leaf segment 3501 is written to the virtual segment). The minimum value of the hash value to be stored in the leaf segment 3501 pointed to by the leaf address 3507 is stored in the Min (hash) 3508.

In the structural example of FIG. 20, for example, when 0 is stored in Min (hash) 3508-1 and k (where k is a value larger than 0) is stored in Min (hash) 3508-2, hash values in the range from 0 to (k−1) are stored in the leaf segment 3501-1 pointed to at the leaf address 3507-1, and hash values having a value of k or more are stored in the leaf segment 3501-2. Therefore, by referring to the contents (Min (hash) 3508) of each hierarchical segment 3509, it is possible to identify the leaf segment 3501 in which the hash value of the search target is stored. However, in the initial state, hash values are not stored in the leaf segment 3501. After the write data is stored in the flash package 230 and the hash value of the write data is calculated, the hash values are stored in the leaf segment 3501, which will be described in detail later.

Incidentally, one or more sets of leaf addresses 3507 and Min (hash) 3508 are also included in the hierarchical segment 3509, which is the parent node of the hierarchical segment 3509 (for example, the hierarchical segment 3509-1 of FIG. 20). In this case, an address on the memory (package memory 320) in which the lower hierarchical segment 3509 is placed is used as the leaf address 3507. In the Min (hash) 3508 corresponding to this leaf address 3507, the minimum value among the plurality of Min (hash) 3508 stored in the lower hierarchical segment 3509 is stored. In this method, a higher hierarchical segment 3509 is formed, and the structure of the highest hierarchical segment 3509, that is, the root node, can store information regarding the entire space of the hash value.

Details of the information stored in the leaf segment 3501 will be described with reference to FIG. 21. One or more sets of a registered hash value 3502, a registered data number 3503, a segment number 3504, a registered address 3505, and an invalid flag 3506 are stored in the leaf segment 3501. Hereinafter this set is referred to as entry 3510.

In the example of FIG. 21, an example is illustrated in which three entries 3510 are stored. However, the number of entries 3510 in the leaf segment 3501 may be less than 3, or may be 4 or more. In addition, a plurality of sets of the registered address 3505 and the invalid flag 3506 may be stored in the entry 3510 in some cases. In the example of FIG. 21, three sets of the registered address 3505 and the invalid flag 3506 are stored in the entry 3510-1.

Hereinafter, the information stored in the entry 3510 will be described. As described above, hash values are stored in the leaf segment 3501. In particular, hash values are stored in the registered hash value 3502 in the entry 3510. One hash value may be stored in one entry 3510. For example, when n hash values are stored in a leaf segment 3501, n entries 3510 are provided in the leaf segment 3501, and a hash value is stored in the registered hash value 3502 of each entry 3510.

Also, immediately after the registered hash value 3502, the registered data number 3503 is stored. The registered data number 3503 indicates the number of virtual segments (referred to as overlapping segments) having the same hash value as the hash value stored in the registered hash value 3502 in the entry 3510. However, the registered data number 3503 does not include the number of virtual segments that are not subject to deduplication processing.

After the number of registered data 3503, the segment number 3504, the registered address 3505, and the invalid flag 3506 are stored. The registered address 3505 may be the virtual segment address of the virtual segment having the hash value stored in the registered hash value 3502 in the entry 3510. The invalid flag 3506 may be information indicating whether or not a valid value is stored in the immediately preceding registered address 3505. When "1" (ON) is stored in the invalid flag 3506, this indicates that a valid value is not stored in the immediately preceding registered address 3505.

In the segment number 3504, the number of sets of the registered address 3505 and the invalid flag 3506 stored in the entry 3510 is stored. In principle, immediately after the deduplication process is performed, there may be only one virtual segment having the same hash value in the storage system 100 (that is, there may be only one registered address 3505 in the entry 3510). However, in the storage system 100 according to the present embodiment, when virtual segments having the same hash value exist on the same stripe line, the deduplication processing is not performed on these virtual segments for the reasons described above. In the case that a virtual segment having the same hash value as the virtual segment designated by the first registered address 3505 exists on the same stripe line, the flash package 230 stores the virtual segment addresses of the virtual segments in the second and subsequent registered addresses 3505. A detailed description of this processing will be described later.

As mentioned earlier, the registered data number 3503 does not include the number of virtual segments that are not subject to deduplication processing. In the registered data number 3503, a virtual segment specified by the first registered address 3505 and the sum of the virtual segments existing on a strip line different from this virtual segment that also have the same hash value are stored (that is, the virtual segments that became targets of the deduplication processing). When all the virtual segments having the same hash value as the virtual segment identified by the first registered address 3505 exist on the same stripe line, the registered data number 3503 is one.

When new data is written to the virtual segment from the storage controller 200, if a hash value of the data does not exist in the hash index information 3500, an entry 3510 for storing the hash value is added to the leaf segment 3501. However, if the entry 3510 cannot be stored in one leaf segment 3501, a leaf segment 3501 is added. Then, the information that has been stored in the leaf segment 3501 (or the hierarchical segment 3509) may be rearranged. However, since this operation is a known operation similar to insertion of data into tree structures such as B+Trees, the description thereof will be omitted herein.

Next, the processing executed by the storage controller 200 and the flash package 230 will be described using the above-described management information.

Figure 22:
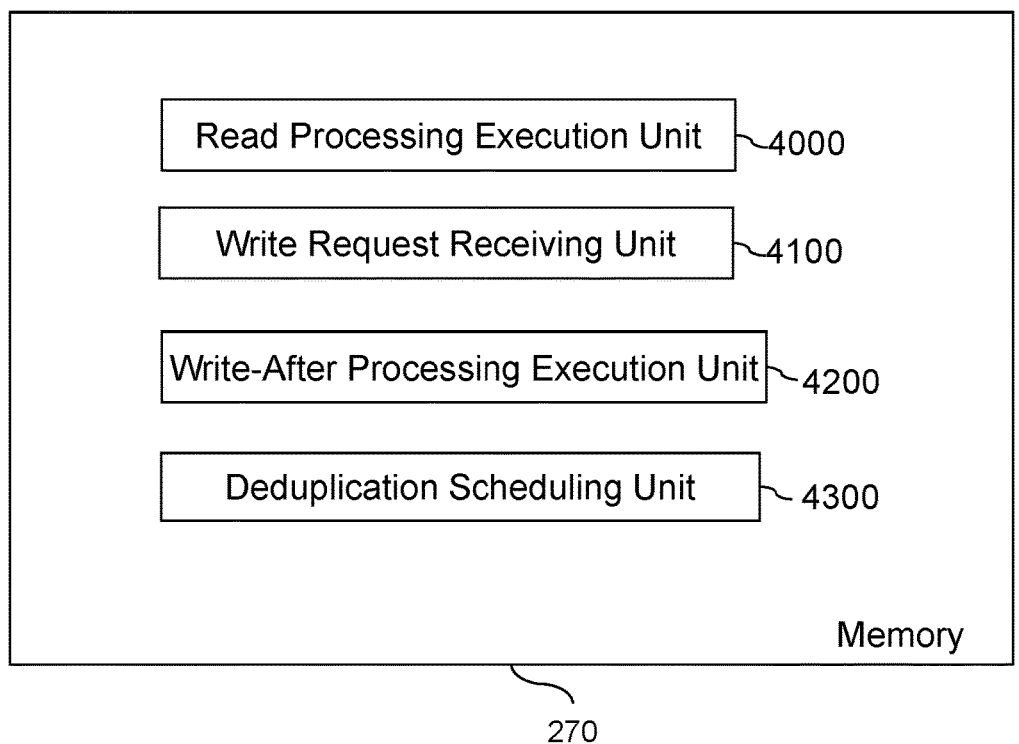
FIG. 22 is a diagram illustrating a program stored in the memory of the storage controller in the first embodiment.

First, the processing performed by the storage controller 200 will be described. As a general rule, the processing performed by the storage controller 200 is realized by the processor 260 in the storage controller 200 executing a program. In addition, this program may be stored in the memory 270. FIG. 22 illustrates a program related to the present embodiment stored in the memory 270.

The program related to the present embodiment may include a read process execution unit 4000, a write request acceptance unit 4100, a write-after process execution unit 4200, and a deduplication scheduling unit 4300. These programs may be programs used to realize upper level wear leveling techniques and capacity virtualization techniques. Note that, in the following description of each process, there are locations where the processing is explained using the program (the read processing execution part 4000 etc.) as the subject. However, in reality, this refers to a case where processing is performed by the program (the read processing execution unit 4000 or the like) being executed by the processor 260.

Note that, as described above, in the storage system 100 according to the present embodiment, the flash package 230 may execute the wear leveling function and the lower-level capacity virtualization function. However, as another embodiment, the storage controller 200 may execute the wear leveling function and the lower-level capacity virtualization function. In this case, a program that implements the wear leveling function and the lower level capacity virtualization function may be executed by the storage controller 200. Accordingly, since the storage controller 200 executes both the higher-level program (a program for implementing the higher-level capacity virtualization function and the like) and the lower-level program, although the interfaces between the programs may differ, the contents executed by the higher-level program do not differ a great deal. Accordingly, in the present embodiment, the read processing execution unit 4000, the write request receiving unit 4100, the write-after processing unit 4200, and the deduplication schedule unit 4300 will be described in detail based on the premise that the low-level wear leveling technique and the capacity virtualization technique are implemented by the flash package 230.

In addition, in the present embodiment, the data access range designated by the read request or the write request from the host 110 is explained on the premise that it coincides with the virtual segment boundary, which is the read/write unit of the flash memory. Of course, even if the access range designated from the host 110 does not coincide with the virtual segment boundary, the logical volume can be accessed. For example, when a partial area of the virtual segment is designated as a write area, the flash package 230 may read out the entire virtual segment, update only the designated partial area, and write the entire virtual segment.

Figure 23:
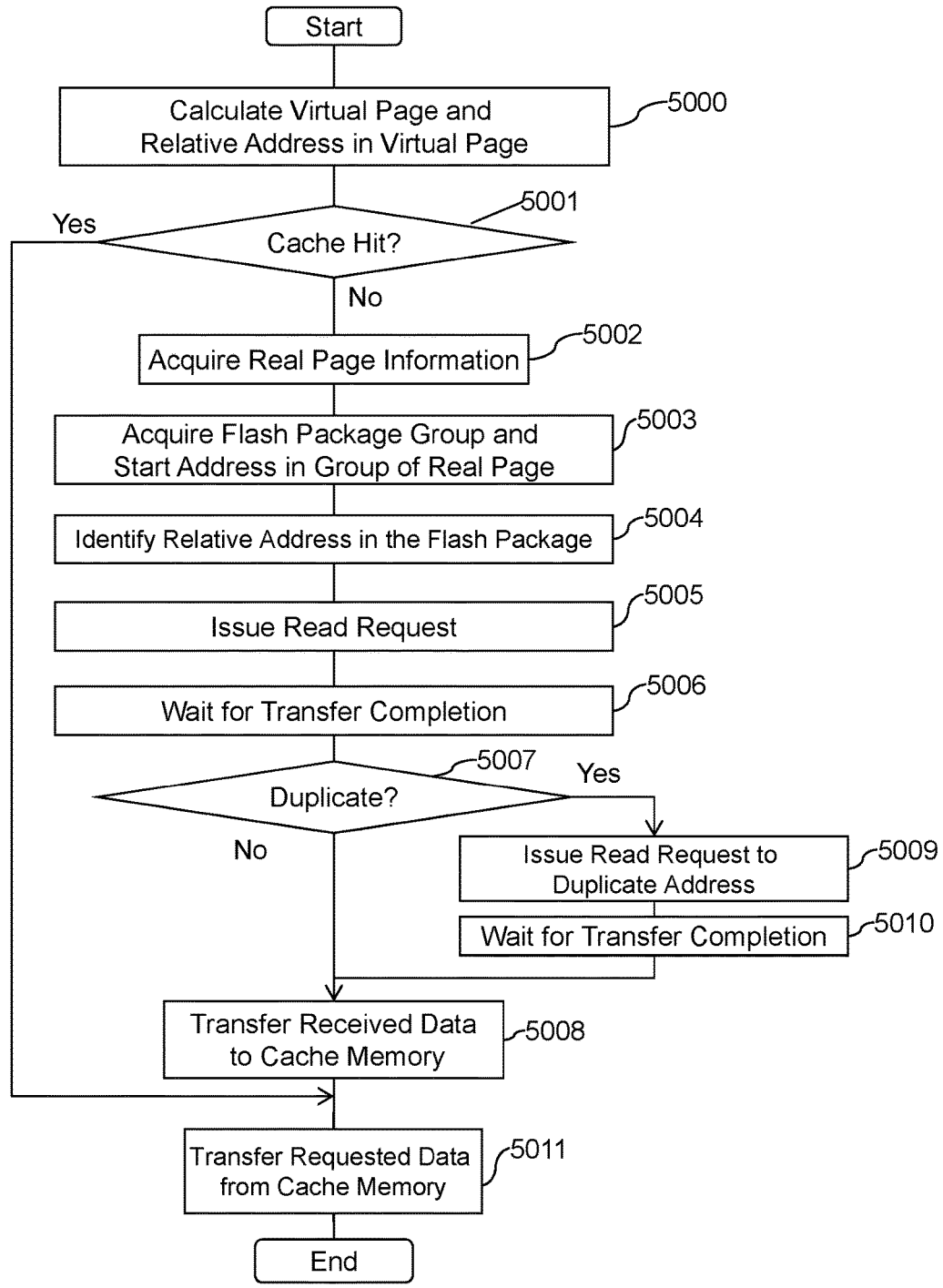
FIG. 23 is a diagram illustrating a processing flow of a read processing execution unit in the first or second embodiment.

FIG. 23 is a processing flow of the read processing execution unit 4000. The read processing execution unit 4000 is executed when the storage controller 200 receives a read request from the host 110.

Step 5000: The read process execution unit 4000 (the processor 260) calculates, based on the address of the read target area designated by the received read request, the virtual page # of the virtual page corresponding to the read target area and the relative address in the virtual page.

Step 5001: The read processing execution unit 4000 checks whether the data to be read is stored in the cache memory 210 (a hit). This technique is known in the art. If it is a hit (Step 5001: Yes), then step 5011 is performed. If it is not a hit (Step 5001: No), then step 5002 is performed.

Step 5002: Here, it is necessary to load the data to be read into the cache memory 210. First, the read processing execution unit 4000 identifies the real page information 2100 of the real page allocated to the read target virtual page by referring to the real page pointer 2004 of the logical volume information 2000. It should be noted that the real page assigned to the virtual page to be read is referred to as a "read target real page" in the following description.

Step 5003: Based on the package group 2101 and the real page address 2102 of the identified real page information 2100, the read process execution unit 4000 may calculate the flash package group 280 to which the read target real page belongs and the address in the flash package group 280 where the (top of the) read target real page is located.

Step 5004: Based on the relative address in the virtual page obtained in step 5001 and the package group RAID type 2302, the read processing execution unit 4000 calculates the location in the real page where the read target data is stored (in particular, the relative address in the real page). Then, the read processing execution unit 4000 may uses the calculated relative address in the real package, the package group RAID type 2302 and the flash package pointer 2305 to identify the flash package 230 in which the read target data is stored as well as the address within the flash package 230.

Step 5005: The read process execution unit 4000 may issue a read request to the address of the flash package 230 specified in step 5004.

Step 5006: The read processing execution unit 4000 may wait for data to be sent from the flash package 230.

Step 5007: As a result of issuing the read request, there are cases where a response indicating that data is deduplicated may be returned from the flash package 230. In this case, the response may include a set of virtual segment addresses and hash values. In step 5007, the read processing execution unit 4000 may determine whether or not a response indicating that the data is deduplicated is returned from the flash package 230. If so, (Step 5007: Yes), the read processing execution unit 4000 next executes Step 5009. Otherwise (Step 5007: No), read data is returned from the flash package 230. In this case, Step 5008 is executed next.

Step 5008: The read processing execution unit 4000 may reserve an area in the cache memory 210 for storing the read target data, and stores the data sent from the flash package 230 in the reserved area. Subsequently, Step 5011 may be performed.

Step 5009: This step is executed when a response (a response including a set of virtual segment addresses and hash values) indicating that data is deduplicated is returned from the flash package. The virtual segment address included in the response is information indicating the flash package 230 and the virtual segment in which the read target data is actually stored. In this case, the read processing execution unit 4000 issues a read request (a "hash designation read request," which will be described later) designating the virtual segment address and the hash value included in the response to the flash package 230 in which the data is actually stored (as the virtual segment address included in the response includes the package ID, the flash package 230 can be identified).

Step 5010: The read processing execution unit 4000 waits for data to be sent from the flash package 230. When data transfer from the flash package 230 is initiated, the read process execution unit 4000 may executes Step 5008.

Step 5011: The read processing execution unit 4000 may read the read target data from the cache memory 210 and transfer it to the host 110, thereby completing the processing.

Figure 24:
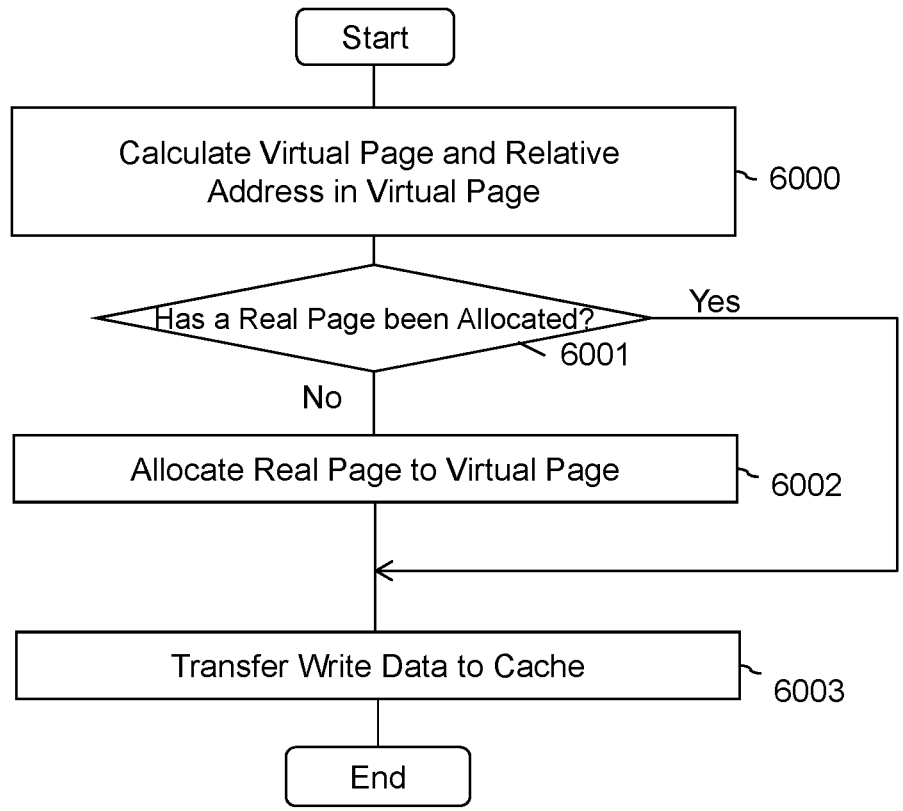
FIG. 24 is a diagram illustrating a processing flow of a write request receiving unit.

FIG. 24 is a processing flow of the write request receiving unit 4100. The write request receiving unit 4100 is executed when the storage controller 200 receives a write request from the host 110.

Step 6000: The write request receiving unit 4100 (processor 260) calculates the virtual page # of the virtual page corresponding to the write target area and the relative address in the virtual page based on the address of the write target area specified by the received write request.

Step 6001: The write request acceptance unit 4100 identifies the logical volume information 2000 of the logical volume designated by the write request. Then, the write request receiving unit 4100 checks whether or not the real page is allocated to the virtual page identified in step 6000 by referring to the real page pointer 2004 in the identified logical volume information 2000. If a real page has been allocated, step 6002 is skipped and then step 6003 is executed.

Step 6002: The write request receiving unit 4100 allocates a real page to the virtual page corresponding to the write target area. At this time, the write request receiving unit 4100 refers to the logical volume RAID type 2003 of the logical volume information 2000 identified in Step 6001, the package group RAID type 2303 of each flash package group information 2300, and the free real page number 2304, etc., to determines which flash package group 280 to which the real page will be allocated. Thereafter, the write request receiving unit 4100 refers to the free real page management information pointer 2200 of the determined flash package group 280 and configures the real page pointer 2004 of the virtual page to which the write target area belongs to indicate the top free real page information 2100. In this way, the real page is allocated to the virtual page to which the write target area belongs.

Note that the free real page management information pointer 2200 is modified so as to indicate the next real page information 2100 (the real page information 2100 indicated by the free page pointer 2103 in the real page real page information 2100 assigned to the virtual page), and further, the free page pointer 2103 in the real page information 2100 of the real page allocated to the virtual page is made to be null. In addition, the write request receiving unit 4100 reduces the number of free real pages 2304 of the flash package group management information corresponding to the real pages. In the present embodiment, although an example has been described in which the process of allocating a virtual page to a real page is executed when a write request is received, this allocation process may be executed until the data is stored in the flash package 230.

Step 6003: The write request receiving unit 4100 stores the write data designated by the write request from the host 110 in the cache memory 210. Note that, when storing the write data in the cache memory 210, the write request receiving unit 4100 attaches the write position information of the write data (the ID of the flash package 230, the address on the flash volume (LBA), etc.) and stores it. Thereafter, the process completes.

As the flash package group 280 has a RAID configuration, it is necessary to generate redundant data corresponding to the write data stored in the cache memory 210 (redundant data to be stored in the parity stripe belonging to the same stripe line as the data stripe storing the write data). However, as this is a well-known process, it will not be described in detail herein. Generation of redundant data may be performed, for example, immediately after step 6003. When the processor 260 creates the redundant data, it temporarily stores the redundant data in the cache memory 210.

Further, as described above, in addition to the data stripe storing data, the parity stripe to store the redundant data corresponding to the data is uniquely determined from the address on the virtual page. Note that, when storing the redundant data in the cache memory 210, the processor 260 attaches the write position information to the redundant data in the same manner as for the write data.

The write data and the redundant data are written to the flash package 230 by the write-after process executing unit 4200, but, from the viewpoint of the flash package 230, as both of them are data to be written to the flash package 230, it is not necessary to distinguish them from each other. Therefore, the write-after process execution unit 4200 does not perform different processes in the case of writing the write data and the case of writing the redundant data.

However, from the viewpoint of deduplication processing, as redundant data is generated as a result of logical operations (exclusive OR or the like) of a plurality of data sets, the probability that deduplication can be performed (the probability that the same data exists elsewhere) is low in comparison to normal data. For this reason, in order to reduce the overhead of deduplication, it is not necessary to include it as a target of deduplication. In this case, when writing the redundant data, the storage controller 200 may attach information indicating that the data is not a target of the deduplication processing to the flash package 230. The flash package 230 that received this indication may not subject the redundant data to deduplication.

Figure 25:
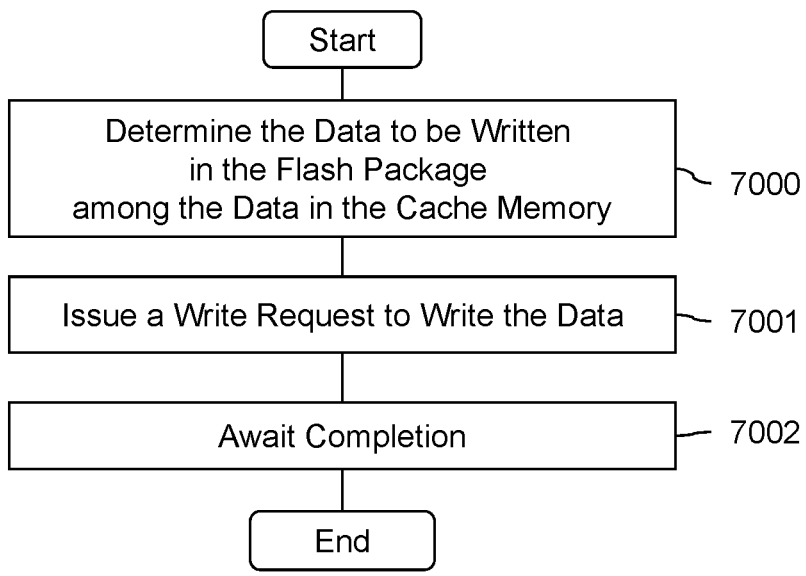
FIG. 25 is a diagram illustrating a processing flow of a write-after process execution unit.

FIG. 25 is a processing flow of the write-after process execution unit 4200. The write-after process execution unit 4200 is a process executed by the processor 260 with a predetermined timing. For example, the write-after process execution unit 4200 may be executed periodically. Or, the write-after process execution unit 4200 may be executed when an amount of dirty data in the cache memory 210 exceeds a predetermined amount.

The write-after process execution unit 4200 may execute a process of writing the write data or the redundant data received from the host 110 into the flash package 230. However, the write-after process executing unit 4200 processes both the write data and the redundant data as data to be written in the flash package 230 without distinguishing them from each other.

Step 7000: The write-after process execution unit 4200 (processor 260) searches the cache memory 210 and determines data to be written to the flash package 230. The write-after process execution unit 4200 may extract write location information attached to the found data. It should be noted that an example will be described herein of a case where the range of the area written by the write-after process execution unit 4200 does not extend over a plurality of flash packages 230.

Step 7001: The write-after process execution unit 4200 may issue a write request to the appropriate flash package 230 based on the write location information. In addition, when writing redundant data, at this time the write-after process executing unit 4200 may issue an instruction indicating that this data (the redundant data) should not be included as a target of deduplication.

Step 7002: The write-after process execution unit 4200 may wait for completion of the write request. When a completion report regarding the write request is returned from the flash package 230, the write-after process execution unit 4200 may end the process.

Figure 26:
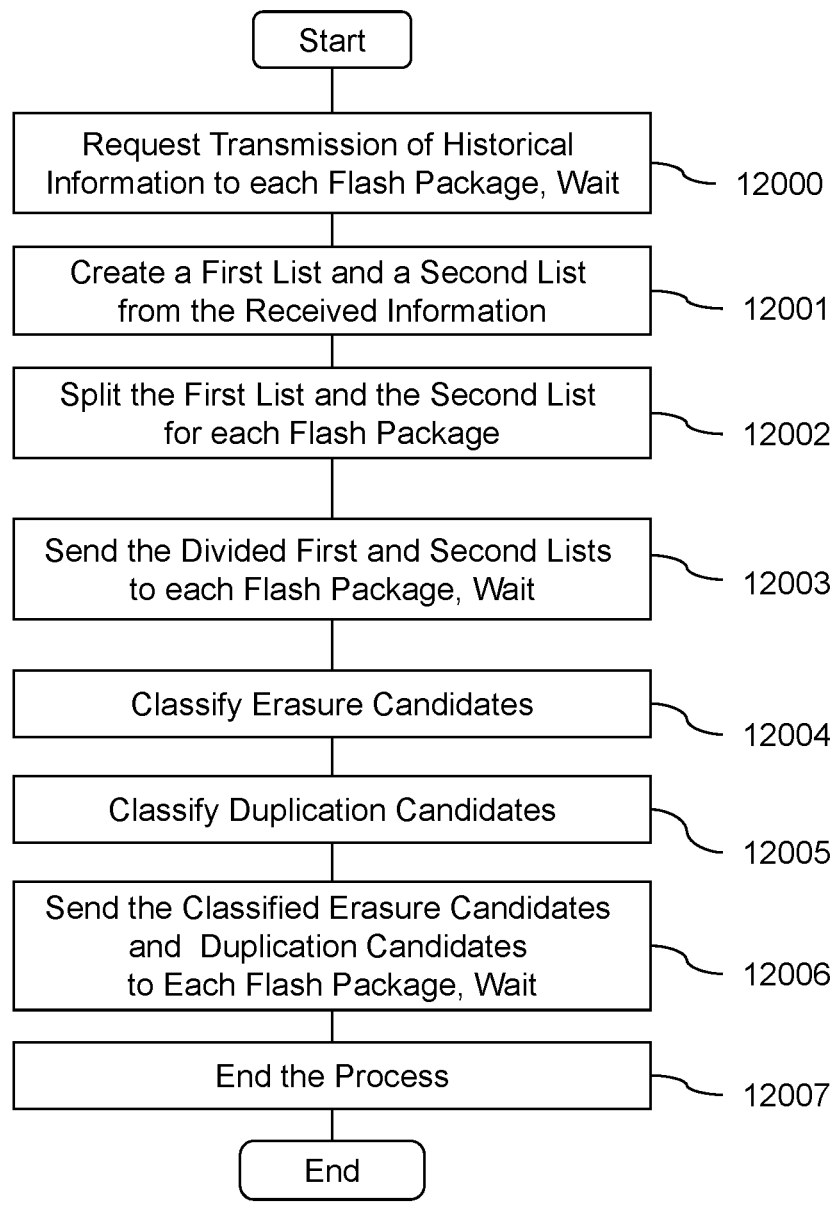
FIG. 26 is a diagram illustrating a processing flow of a deduplication scheduling unit according to the first embodiment.

FIG. 26 is a processing flow of the deduplication scheduling unit 4300. The deduplication scheduling unit 4300 may acquire the historical information 3400 accumulated in all the flash packages 230 in the storage system 100 and schedule deduplication processing. This process may be executed at appropriate intervals.

Step 12000: The deduplication schedule section 4300 may issue a historical information transmission request to each flash package 230 in the storage system 100, and wait for the historical information 3400 to be sent from each flash package 230. In response to receiving the historical information transmission request, the flash package 230 may return the historical information 3400 to the storage controller (deduplication scheduling unit 4300). The processing performed by the flash package 230 will be described later.

Step 12001: The deduplication scheduling unit 4300 may refer to the historical information 3400 sent from each of the flash packages 230 to create a list 1 and a list 2. The list 1 and the list 2 will be described below with reference to FIG. 27.

Figure 27:
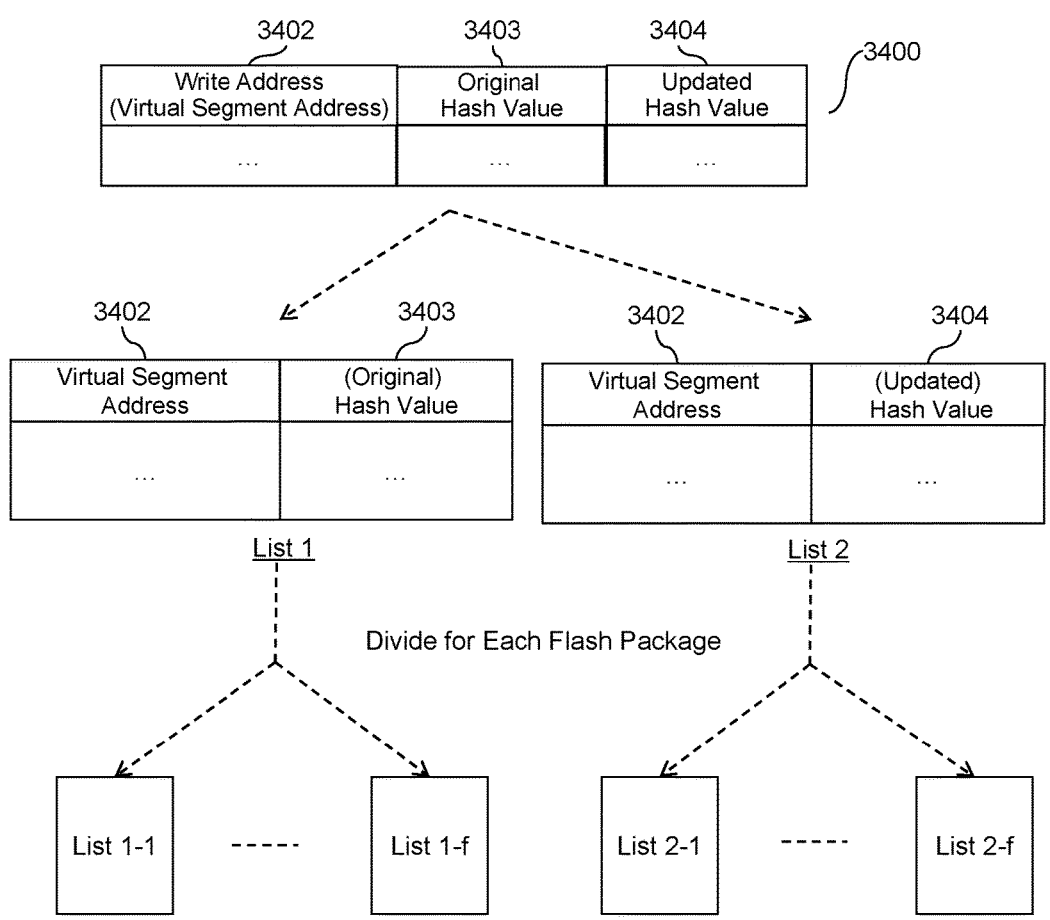
FIG. 27 is an explanatory diagram of the contents of a first list and a second list.

As described above, in the historical information 3400, one or more sets (referred to as a "write history") of the write address 3402, the original hash value 3403, and the updated hash value 3404 are included. As illustrated in FIG. 27, list 1 is a set of records generated by removing the updated hash value 3404 from each write history. List 2 is a set of records generated by removing the original hash value 3403 from each write history.

Note that there may be cases where multiple updates are made with respect to the same virtual segment (multiple pieces of write history for the same virtual segment may be included in the historical information 3400). In the case that multiple updates are made to the same virtual segment (when there are multiple write histories), the deduplication scheduling unit 4300 may extract the first write history (the oldest) and the last write history (the newest) from among the plurality of write histories having the same write address 3402. Then, the deduplication schedule section 4300 registers the record generated by removing the updated hash value 3404 from the former in the list 1 and the record generated by removing the original hash value 3403 from the latter in the list 2. However, when the hash value of the old data is a null value, the deduplication scheduling unit 4300 does not register the old hash value and the address of the virtual segment in the list 1.

Step 12002: Here, the deduplication schedule section 4300 divides the information in List 1 and List 2 into information to be transmitted to each flash package 230 based on the hash value (original hash value 3403 or updated hash value 3404). Hereinafter, among the information in the divided list 1, the information to be transmitted to the flash package #f is referred to as "list 1-*f*", and the information to be transmitted to the flash package #f among the information in the list 2 is referred to as "list 2-*f*".

The method of dividing the information is described below. For example, in the list 1, when the range of the hash values assigned to the flash package #f is a to b, the records in which the (pre-update) hash value 3403 is included within the range of a to b are extracted as information to be transmitted to the flash package #f, and set as list 1-*f*. Similarly, in the list 2, records in which the (updated) hash value 3404 is included within the range of a to be are extracted as information to be transmitted to the flash package #f, and set as list 2-*f*.

Step 12003: The deduplication scheduling unit 4300 may issue a deduplication determination request to each flash package 230. At that time, the deduplication schedule section 4300 may transfer the list 1 and the list 2 divided for each flash package 230 to the flash package 230 together with the deduplication determination request (for example, the list 1-*f* and the list 2-*f* may be sent to the flash package #f). Thereafter, the time deduplication scheduling unit 4300 waits for a response from each flash package 230.

When the flash package 230 (flash package #f, for example) receives the list 1-*f* together with the deduplication determination request, it may determine, for each virtual segment address 3402 registered in the list 1-*f*, whether or not to erase the old data of the virtual segment designated by the virtual segment address 3402, and return the result to the storage controller 200 (deduplication scheduling unit 4300). The returned result information is referred to as "erasure candidates."

Figure 28:
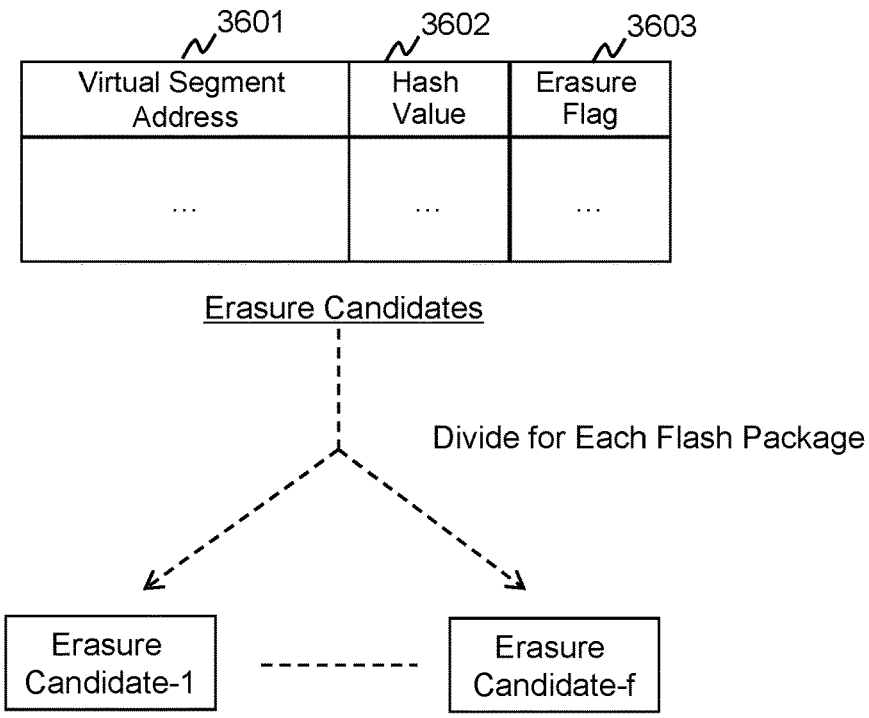
FIG. 28 is an explanatory diagram of contents of erasure candidates.

FIG. 28 illustrates an example of erasure candidates. The erasure candidates are information instructing the flash package 230 to erase the old data of the virtual segments. In the present embodiment, deletion of the old data of the virtual segments refers to a process of setting the value of the old virtual segment pointer 3210 (or erasure prevention address 3208) of the virtual segment to an invalid value (NULL). As a result of this processing, the segment (for example, the real segment) pointed to by the old virtual segment pointer 3210 (or the erasure prevention address 3208) is in a state not allocated to the virtual segment, such that the old data of the virtual segment is substantially deleted. Also, the real segments previously allocated to the virtual segments may be used for another purpose after erasing the real block (including the real segments) by garbage collection processing or the like performed in the flash package 230. As this process is well-known, the explanation thereof will be omitted herein.

The erasure candidates are a list of records including a virtual segment address 3601, a hash value 3602, and an erasure flag 3603. If the erasure flag 3603 in the record is "1", this indicates that the old data of the virtual segment designated by the virtual segment address 3601 of the record may be deleted. If the erasure flag 3603 in the record is "0", this indicates that the old data of the virtual segment designated by the virtual segment address 3601 of the record should not be erased. In addition, the hash value 3602 is the hash value of the old data of the virtual segment designated by the virtual segment address 3601.

In response to receiving the list 2-*f* (along with the deduplication determination request), the flash package 230 (flash package #f, for example) determines, for each virtual segment address 3402 registered in the list 2-*f*, whether or not deduplication processing can be performed on the update data of the virtual segment designated by the virtual segment address 3402, and returns the result to the storage controller 200 (deduplication scheduling unit 4300). The returned information may be referred to as "duplication candidates".

Note that, in the present embodiment, "deduplication of virtual segments" or "deduplication of update data of virtual segments" refers to a process of storing a virtual segment address of the virtual segment having the same data as the real segment in the new virtual segment pointer 3205 of the target segment, instead of the real segment pointed to by the new virtual segment pointer 3205 of a particular virtual segment (called a target segment). In this way, the real segments that have been allocated to the target segment so far (pointed to by the new virtual segment pointer 3205) are substantially deleted.

Figure 29:
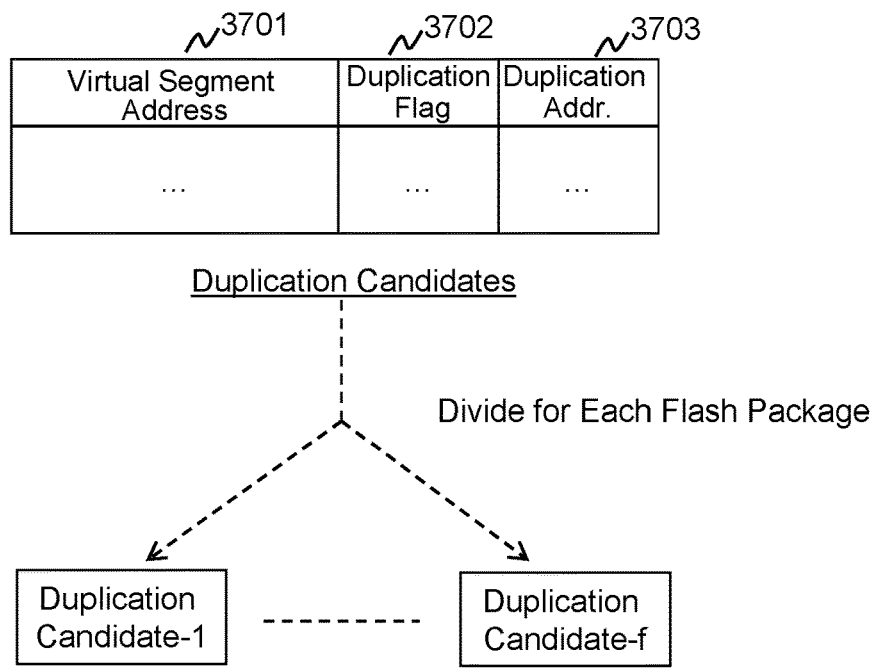
FIG. 29 is an explanatory diagram of the contents of duplication candidates.

FIG. 29 illustrates an example of duplication candidates. The duplication candidates are information instructing the flash package 230 to perform deduplication processing of virtual segments. The duplication candidates are a list of records including a virtual segment address 3701, a duplication flag 3702, and a duplicate Addr 3703. When the duplication flag 3702 in the record is "1", this indicates that the update data of the virtual segment specified by the virtual segment address 3701 of the record can be deduplicated, and that the data of the area specified by the virtual segment address 3701 can be deleted. In addition, in this case, the address (virtual segment address) of the virtual segment having the same hash value as that of the virtual segment designated by the virtual segment address 3701 is stored in the duplicate Addr 3703. Also, if the duplication flag 3702 in the record is "0", this indicates that the update data of the virtual segment designated by the virtual segment address 3701 of the record cannot be subjected to the deduplication process.

Step 12004: The deduplication scheduling unit 4300 classifies each record in the erasure candidates received from each flash package 230 based on the flash package 230 to which they should be transmitted. The classification at this time may be performed based on the virtual segment address 3601. The virtual segment address may include the identifier (package ID) of the flash package 230. When the package ID included in the virtual segment address 3601 is "f", it is determined to transmit that record to the flash package #f. Also, the list of records to be sent to the flash package #f is referred to as "erasure candidates-f".

Step 12005: The deduplication schedule section 4300 classifies each record within the received duplication candidates based on the flash package 230 to which they should be transmitted. This classification is performed based on the virtual segment address 3701, similarly to the classification performed in Step 12004. Hereinafter, among the records of the duplication candidates, the list of records to be transmitted to the flash package #f is referred to as "duplication candidates-f".

Step 12006: The deduplication scheduling unit 4300 may issue a deduplication execution request to each flash package 230. At that time, the deduplication scheduling unit 4300 may send the duplication candidates and the erasure candidates classified (created) in Steps 12004 and 12005 to the flash package 230 together with the deduplication execution request (for example, duplication candidates-f and erasure candidates-f are sent to the flash package #f), and wait for a response to come back.

That is, the storage controller 200 (the deduplication scheduling unit 4300) may transfer the duplication candidates and the erasure candidates received from each flash package 230 to the destination flash package based on the virtual segment address (3601, 3701). Put differently, it can be said that the flash package 230 is transmitting the created duplication candidates and erasure candidates to each flash package 230 via the storage controller 200.

When the duplication candidates and the erasure candidates are transmitted, the flash package 230 erases old data of the virtual segments specified by the virtual segment address 3601 included in the records of which the erasure flag 3603 is "1", and deduplication processing is executed for the virtual segments specified by the virtual segment address included in the records in which the duplication flag 3702 is "1." A detailed description of this processing will be described later.

Step 12007: The deduplication scheduling unit 4300 completes the process when responses are received from each flash package 230.

Next, the operations executed by the flash package 230 will be described. The operations of the flash package 230 are executed by the package processor 310, and the programs are stored in the package memory 320.

Figure 30:
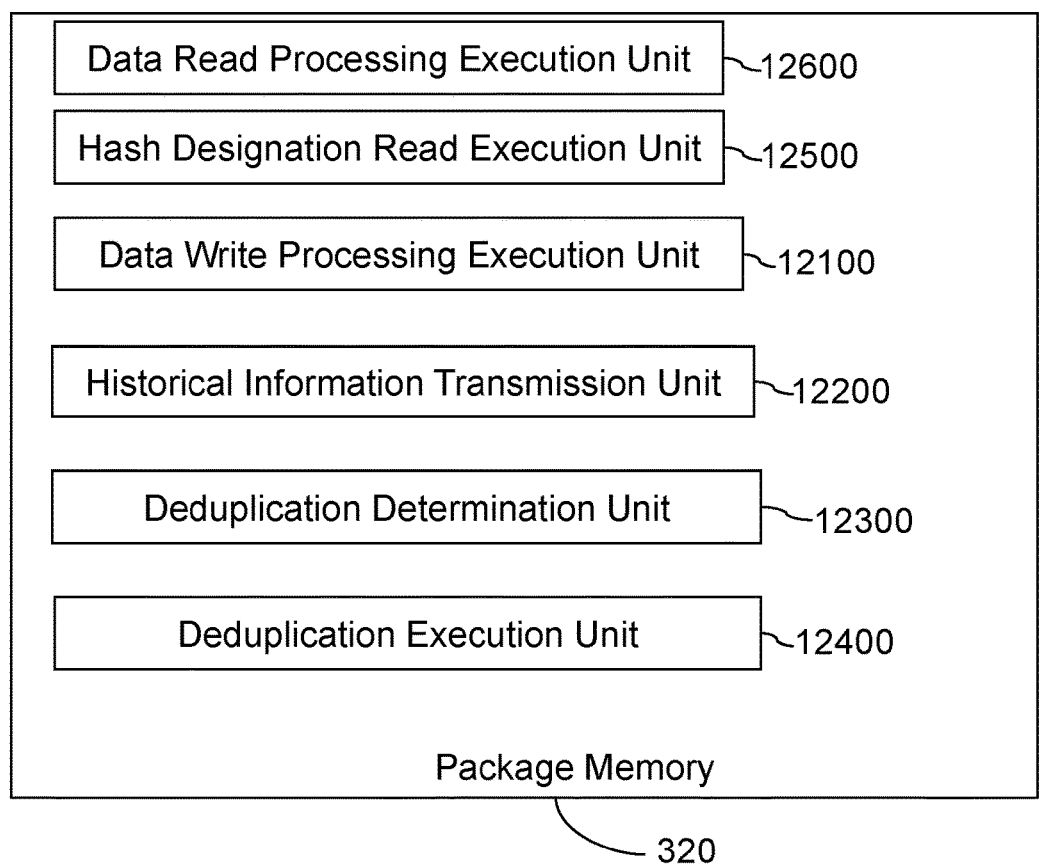
FIG. 30 is a diagram illustrating a program stored in a package memory of a flash package according to the first embodiment.

FIG. 30 illustrates a program related to the present embodiment stored in the package memory 320. The program related to the present embodiment includes a data read processing execution unit 12600, a data write processing execution unit 12100, a historical information transmission unit 12200, a deduplication determination unit 12300, a deduplication execution unit 12400, and a hash designation read execution unit 12500. The processing flow of each program will be described below. In the following description of each process, there may be locations where the processing is explained using the program (data read processing execution unit 12600 etc.) as the subject. However, in reality, this refers to a case where processing is performed by the program (data read processing execution unit 12600 or the like) being executed by the package processor 310.

Figure 31:
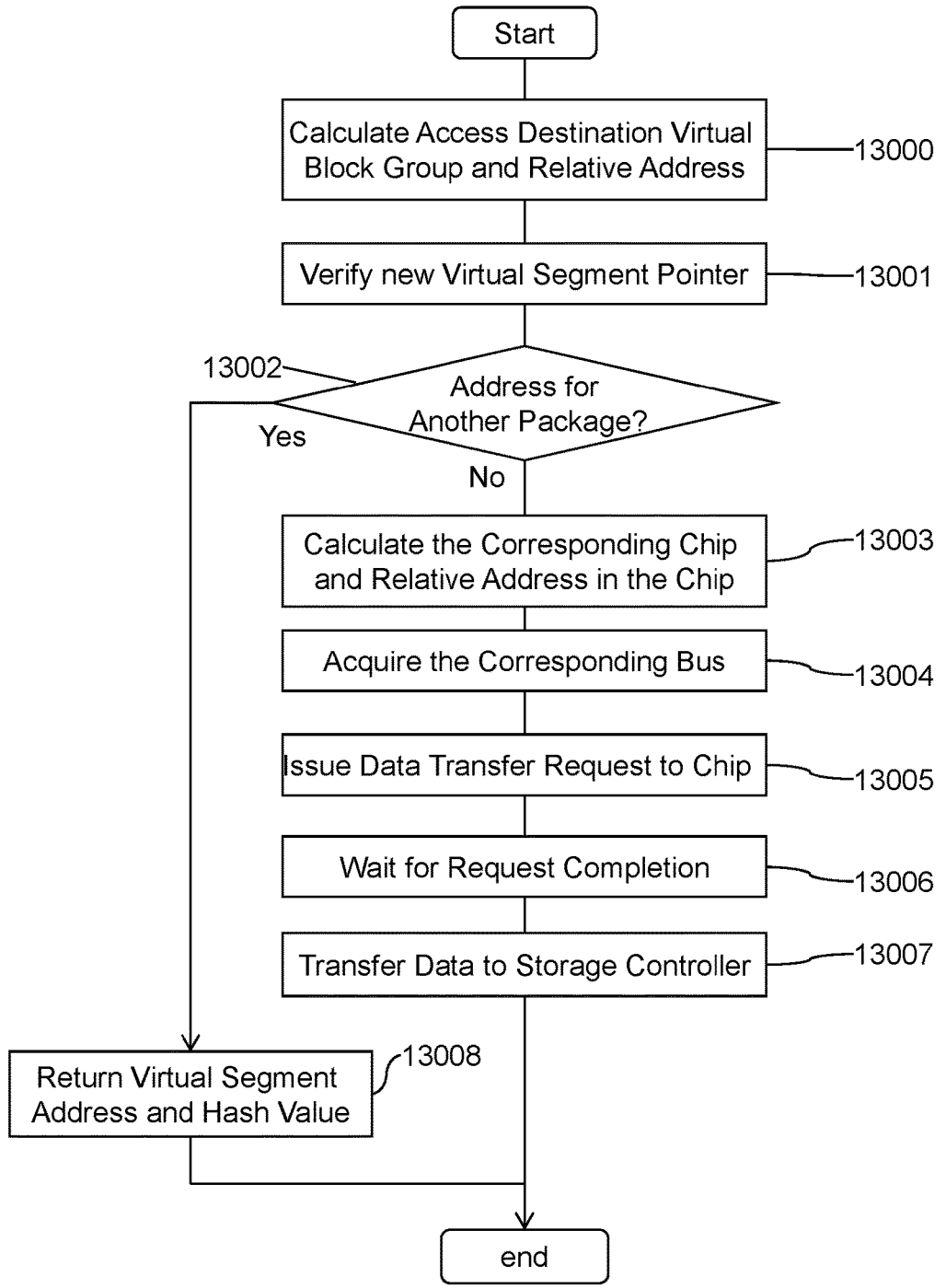
FIG. 31 is a diagram illustrating a processing flow of a data read processing execution unit.

FIG. 31 is a processing flow of the data read processing execution unit 12600. The data read processing execution unit 12600 is executed when a read request is received from the storage controller 200. In addition, this process may also be used when the deduplication determination unit 12300 reads out the leaf segments 3501. In the processing flow of FIG. 31 illustrated in the present embodiment, a processing flow of reading data stored in one virtual block group is depicted. However, in the present invention, it is also effective to read data stored across a plurality of virtual block groups by a read request.

In addition, there are two kinds of read requests issued by the storage controller 200 according to the present embodiment. In the first read request, a read target area (an area specified by an address and a data length) is specified. In contrast, in the second read request, a hash value is specified in addition to the read target area. Hereinafter, the first read request will be referred to as an "ordinary read request", and the second read request will be referred to as a "hash designation read request". The processing flow illustrated in FIG. 31 is performed when an ordinary read request is received from the storage controller 200.

Step 13000: The data read processing execution unit 12600 (package processor 310) may calculate, from the read target address designated by the received read request, the relative address in the virtual block group to which the read target area belongs and the virtual block group to be accessed. When the read target address is expressed by an LBA, the data read processing execution unit 12600 may calculate read target address×512÷(m×flash block capacity 3004). The quotient calculated by this calculation is the virtual block group number, and the remainder is the relative address within the virtual block group. In this way, the data read processing execution unit 12600 can specify the virtual block group (virtual block group information 3200) to be read.

Step 13001: In this step, the data read processing execution unit 12600 may convert the relative address in the virtual block group obtained in Step 13000 into a relative virtual segment number, and further use it to identify the new virtual segment pointer 3205 of the access target virtual segment.

Step 13002: The data read processing execution unit 12600 may identify whether the address stored in the new virtual segment pointer 3205 is a real segment address. When the obtained address is a real segment address (Step 13002: No), the data read processing execution unit 12600 next executes Step 13003. Otherwise (Step 13002: Yes), Step 13008 is executed.

Step 13003: As described above, the real segment address includes a set of the identifier of the real block in which the data is stored and the relative address (relative segment number) in the real block. The data read processing execution unit 12600 identifies the flash chip 300 in which the access target area exists and the location (address) in the flash chip 300 from the information included in the real segment address.

Step 13004: The data read processing execution unit 12600 may identify the package bus 340 to which the flash chip 300 is connected by referring to the chip information 3100 of the flash chip 300 specified in Step 13003, and recognize the corresponding package bus transfer device 350.

Step 13005: The data read processing execution unit 12600 may instruct the package bus transfer device 350 recognized in Step 13004 to transfer the data from the flash chip 300 to the buffer 330.

Step 13006: Subsequently, the data read processing execution unit 12600 may wait until the transfer is completed.

Step 13007: The data read processing execution unit 12600 may send the read data requested from the storage controller 200 stored in the buffer 330 to the storage controller 200, and ends the process.

Step 13008: When this step is executed, the virtual segment address is stored in the new virtual segment pointer 3205 specified in Step 13001. The data read processing execution unit 12600 may return the contents of the new virtual segment pointer 3205 and the new hash value 3206 to the storage controller 200 and complete the process.

Note that, as a result of checking the virtual segment address stored in the new virtual segment pointer 3205, it is possible that the virtual segment address is an address pointing to a virtual segment in its own flash package (the flash package 230 in which the data read processing execution unit 12600 is executed). In this case, the data to be read is in the flash package itself. Accordingly, in this case, instead of returning the contents of the new virtual segment pointer 3205 and the new hash value 3206, the data read processing execution unit 12600 may search for the data stored in the flash package 230 and send the retrieved data to the storage controller 200.

Figure 32:
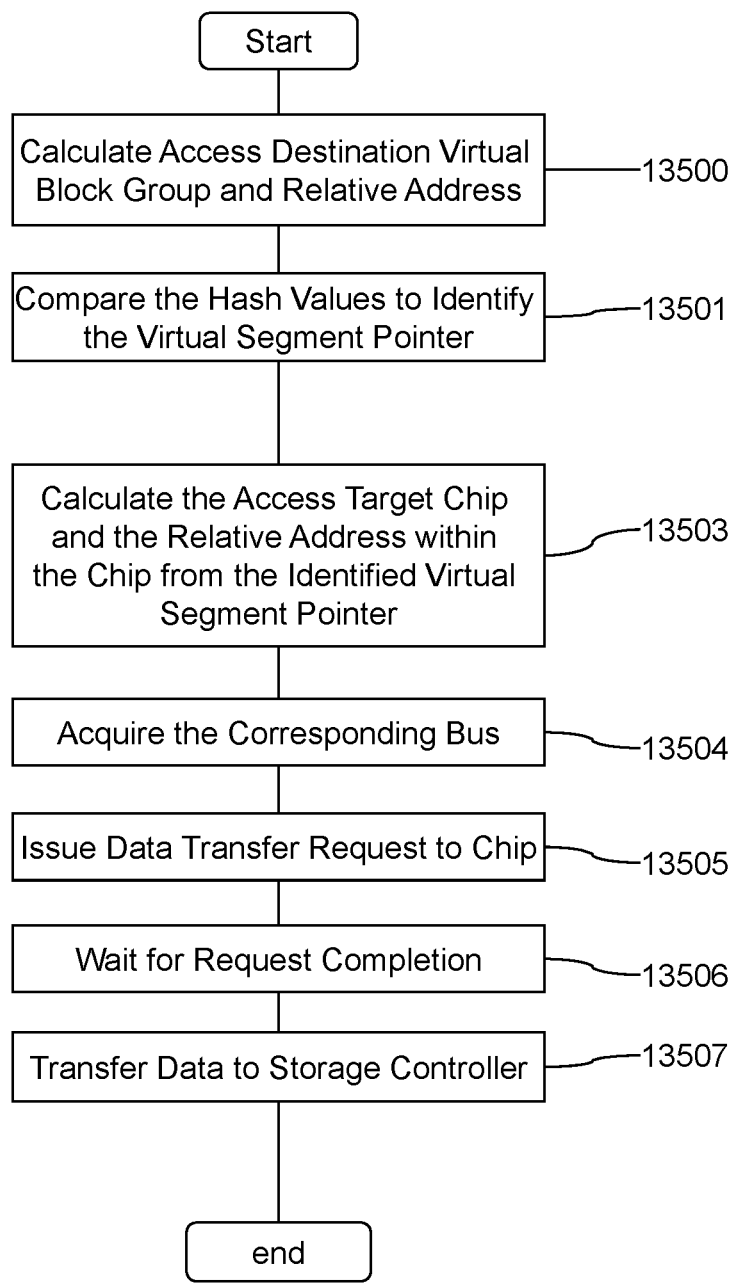
FIG. 32 is a diagram illustrating a processing flow of a hash designation read execution unit.

FIG. 32 is a processing flow of the hash designation read execution unit 12500. This processing is performed when the flash package 230 receives a hash designation read request from the storage controller 200 (when Step 5009 is executed). As described above, the hash designation read request includes a hash value in addition to the information (address) of the access target area. Note that, in the following description, the hash designation read request is abbreviated as a "read request".

Step 13500: This processing is the same as that of Step 13000. As a result of this processing, the hash designation read execution unit 12500 may identify the relative virtual segment number in the virtual block group corresponding to the access target area. Here, a case will be described in which the identified relative virtual segment number is "s". A virtual segment whose relative virtual segment number is "s" may be expressed as "virtual segment #s".

Step 13501: The hash designation read execution unit 12500 may compare the hash value designated by the received read request with the new hash value 3206, the old hash value 3211, and the erasure prevention hash value 3209 of the virtual segment #s. If the hash value designated by the read request matches the new hash value 3206, the hash designation read execution unit 12500 may acquire the information (address) stored in the new virtual segment pointer 3205 of the virtual segment #s.

If the hash value designated by the read request matches the old hash value 3211, the hash designation read execution unit 12500 may acquire the information (address) stored in the old virtual segment pointer 3210 of the virtual segment #s. In contrast, if the hash value specified by the read request matches the erasure prevention hash value 3209, the hash designation read execution unit 12500 may acquire the information (address) stored in the erasure prevention address 3208 of the virtual segment #s. Note that, when a plurality of erasure prevention hash values 3209 and erasure prevention addresses 3208 are provided in the virtual segment #s, the hash designation read execution unit 12500 may compare and collate the hash value designated by the read request with the respective erasure prevention hash values 3209.

Step 13503: The address acquired in Step 13501 is a real segment address. The data read processing execution unit 12600 identifies, from the actual segment address obtained in step 13501, the identifier of the flash chip 300 in which the read target data is stored and the address in the flash chip 300. This is the same process as that of Step 13003.

Step 13504: Processing similar to that of Step 13004 is performed.

Step 13505: Processing similar to that of Step 13005 is performed.

Step 13506: Processing similar to that of Step 13006 is performed.

Step 13507: Process similar to that of Step 13007 is performed. As a result, data is returned to the storage controller 200.

Next, with reference to FIG. 33 and FIG. 34, the processing flow of the data write processing execution unit 12100 will be described. The data write processing execution unit 12100 is executed when the flash package 230 receives a write request from the storage controller 200. Further, this processing flow may also be executed when the deduplication determination unit 12300 writes a leaf segment.

Figure 33:
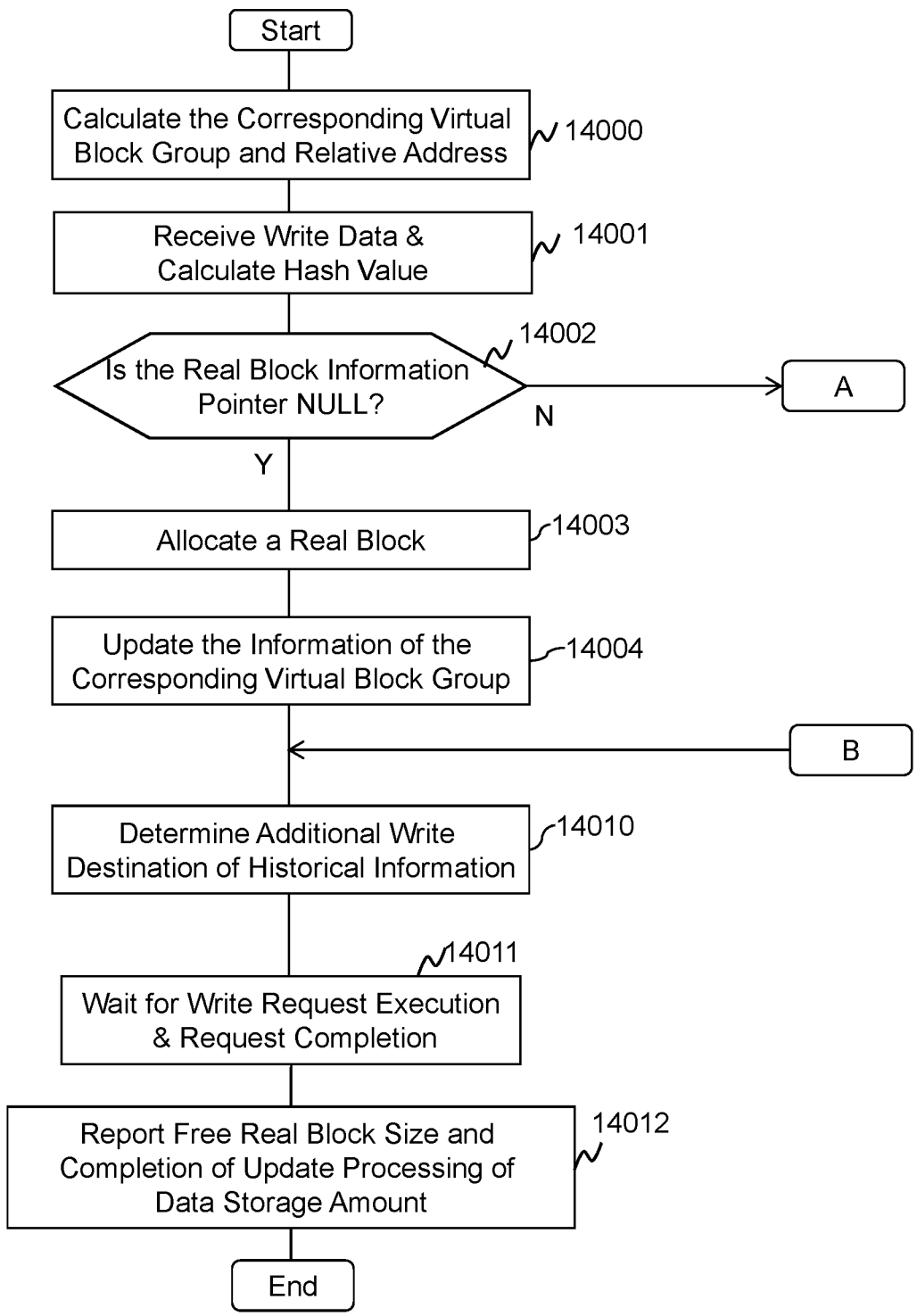
FIG. 33 is a diagram illustrating a processing flow (1) of the data write processing execution unit.
Figure 34:
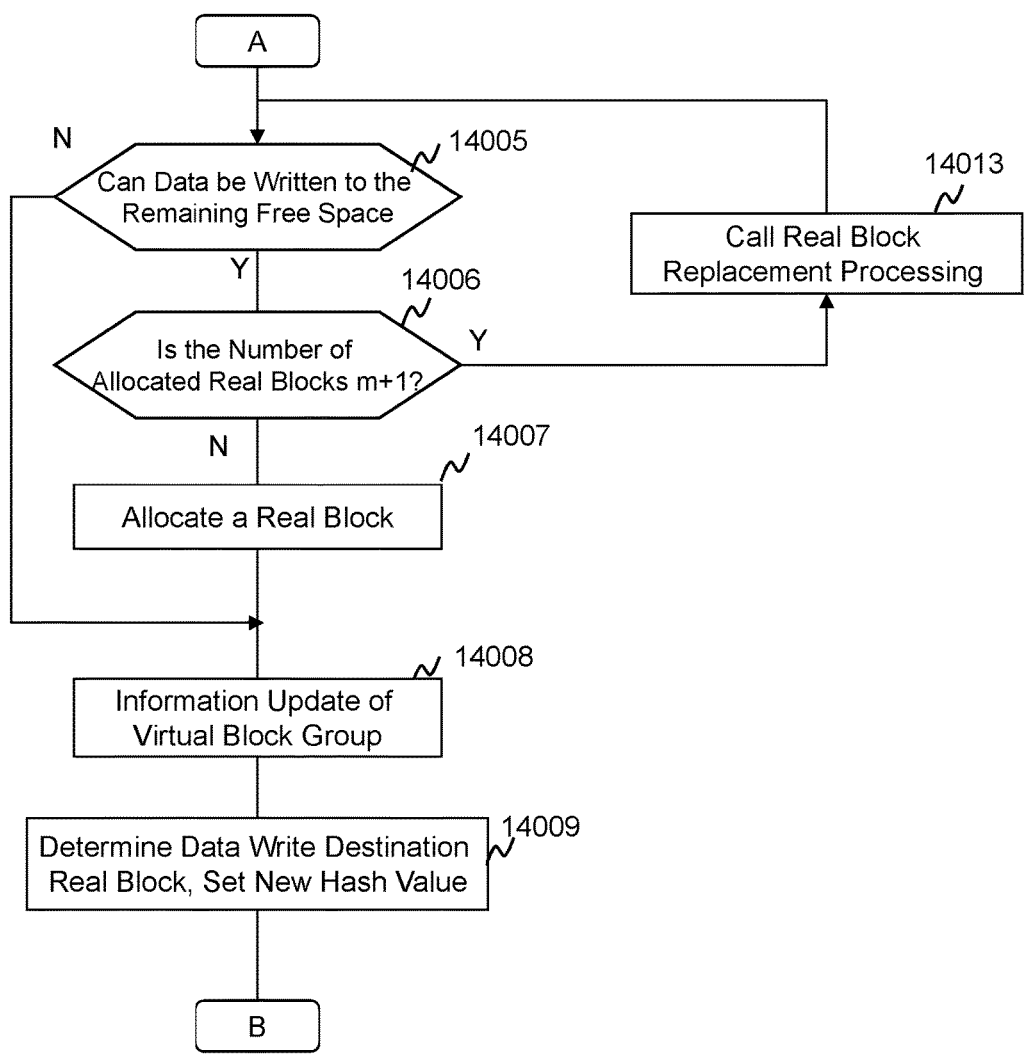
FIG. 34 is a diagram illustrating a processing flow (2) of the data write processing execution unit.

Note that, in the process flow of FIG. 33 and FIG. 34 illustrated in the present embodiment, a process is illustrated of a case in which the range designated by the write request is included in one virtual block group and does not extend over a plurality of virtual block groups. However, the present invention is also applicable when a write request is received for an area spanning a plurality of virtual block groups.

Step 14000: The data write processing execution unit 12100 (package processor 310) may calculate, from the address to be written by the received write request, the relative address within the virtual block group to be accessed and the virtual block group to which the write target area belongs. This is similar to the calculation performed in Step 13000. Further, the data write processing execution unit 12100 may identify the virtual segment corresponding to the write target area by converting the relative address in the virtual block group to which the write target area belongs to a relative virtual segment number. Hereinafter, this virtual segment is referred to as a "write target virtual segment". In addition, here, the new virtual segment pointer 3205 of the write target virtual segment is also identified.

In the present embodiment, an example will be described in which the write range specified by the write request from the storage controller 200 coincides with the virtual segment boundary. Of course, the present invention is also applicable when only a portion of the virtual segment is designated by the write request from the storage controller 200. Note that, when a partial area of the flash virtual segment is designated, the flash package 230 may read the entire virtual segment to the buffer 330 or the like, update only the specified partial area in the buffer 330, and write the updated data for one virtual segment to the virtual segment.

Step 14001: The data write processing execution unit 12100 may receive the write data specified by the write request from the storage controller 200 and stores it in the buffer 330. In addition, the data write processing execution unit 12100 may calculate a hash value of the data by using the hash circuit 370.

Step 14002: The data write processing execution unit 12100 may acquire the first real block information pointer 3202 from the virtual block group information 3200 (hereinafter referred to as "target virtual block group information") of the virtual block group to which the virtual segment that is the write target belongs. Then, the data write processing execution unit 12100 may check whether this value is null, that is, whether a real block is allocated. If a real block is allocated (Step 14002: No), the data write processing execution unit 12100 may next executes Step 14005. If a real block has not been allocated (Step 14002: Yes), then Step 14003 is executed.

Step 14003: The data write processing execution unit 12100 may assign a real block in a free state to the virtual block group to which the virtual segment that became the write target belongs. Herein, it is assumed that the allocated real block is erased and the data is not stored.

In particular, the data write processing execution unit 12100 may refer to the number of free real blocks in the chip 3103 etc., of each set of chip information 3100 and determine a target flash chip 300 to acquire a free real block. Thereafter, the data write processing execution unit 12100 may refer to the free real block information pointer 3600 of the determined flash chip 300 and obtain a pointer to the top real block information 3300. Then, the data write processing execution unit 12100 may store the obtained pointer in the first real block information pointer 3202 of the target virtual block group information. This assigns the first real block to the virtual block group.

Note that the free real block information pointer 3600 may be modified to indicate the next real block information 3300 (the real block information 3300 indicated by the free real block pointer 3302 in the real block information 3300 of the real block allocated to the virtual block group), and further, the free real block pointer 3302 in the real block information 3300 of the real block allocated to the virtual block is made null. In addition, the data write processing execution unit 12100 may reduce the number of free real blocks in the chip 3103 of the chip information 3100 corresponding to the real block. Then, the data write processing execution unit 12100 may set the real block free capacity 3304 corresponding to the allocated real blocks to the capacity of the real block. Here, data is written from the top of the allocated real block.

Step 14004: The data write processing execution unit 12100 may generate the real segment address of the first real segment of the allocated real block. In particular, by combining the identifier of the real block and the relative address within the real block (in this case, the relative address becomes 0), the real segment address can be generated. Then, the data write processing execution unit 12100 may set the generated actual segment address in the new virtual segment pointer 3205 of the write target virtual segment. In this way, the real segment may be allocated to the write target virtual segment. In addition, the data write processing execution unit 12100 may set the hash value calculated in Step 14001 to the new hash value 3206 of the write target virtual segment. Further, the data write processing execution unit 12100 may set the old virtual segment pointer 3210 and old hash value 3211 of the write target virtual segment to null values. In addition, the data write processing execution unit 12100 may set 0 in the data storage amount 3203. Subsequently, the data write processing execution unit 12100 may execute Step 14010.

Step 14005: The data write processing execution unit 12100 may identify the real block information 3300 corresponding to the real block that will become the write target. This is the real block information 3300 pointed to by the real block information pointer 3202 at the end of the real block information pointer 3202 in which a valid value (non-NULL value) is stored in the virtual block group information 3200. The data write processing execution unit 12100 may check, based on the real block free capacity 3304 of the identified real block information 3300 and the length of the write data stored in the buffer 330, whether the received data can be written in the free area of the real block. If writing is possible (Step 14005: No), then Step 14008 is executed. Otherwise, the data write process execution unit 12100 next executes Step 14006.

Step 14006: This step is a step executed when the length of the write data is greater than the free area of the real block set as the write target. In this step, the data write processing execution unit 12100 may determine whether (m+1) real blocks are allocated to the virtual block group (determine whether all (m+1) real block information pointers 3202 in the virtual block group information 3200 are non-NULL values). When (m+1) real blocks are allocated, the data write processing execution unit 12100 may execute step 14013.

Step 14007: This step is a step of allocating a real block in a free state to a corresponding virtual block group, and the same processing as in Step 14003 is performed.

Step 14008: The data write processing execution unit may 12100 check the old virtual segment pointer 3210 of the write target virtual segment in the virtual block group information 3200, and if the value is a null value, the new virtual segment pointer 3205 and the new hash value 3206 of the write target virtual segment may be copied to the old virtual segment pointer 3210 and the old hash value 3211, respectively (when the old virtual segment pointer 3210 is not a null value, information is not copied to the old virtual segment pointer 3210 and the old hash value 3211). Note that, when the write request for the relevant virtual segment is received for the first time, the old virtual segment pointer 3210 and the old hash value 3211 of the relevant virtual segment are null values. The fact that the old hash value 3211 is a null value indicates that the hash value thereof is invalid.

Step 14009: The data write processing execution unit 12100 may determine the last real block (the real block indicated by the last real block information pointer 3202 whose real block information pointer 3202 is not a null value) among the real blocks allocated to the virtual block group to be a write target. In addition, the data write processing execution unit 12100 may set the hash value calculated in Step 14001 as the new hash value 3206 of the write target virtual segment.

Step 14010: The data write processing execution unit 12100 may add the new hash value 3206 of the write target virtual segment, the old hash value 3211, and the write target virtual segment address to the historical information 3400, and increment the historical information number 3401 by one. In addition, the data write processing execution unit 12100 may determine, based on the real block free capacity 3304 of the data write target real block, the address to write this time (a real segment address; that is, a combination of a chip ID, a die number, a block number, and a relative segment number within a real block). As the data write processing execution unit 12100 sequentially writes data in order from the top real segment of the real block, if the real block free capacity 3304 and the size of the real block are known, the relative address in the real block (relative segment number) to be written this time can be easily determined. The data write processing execution unit 12100 may set this address as the new virtual segment pointer 3205 of the write target virtual segment. Further, the data write processing execution unit 12100 may turn on, in the actual segment bitmap 3305, the bit corresponding to the real segment which is the current write target.

Step 14011: The data write processing execution unit 12100 may set a request to the transfer apparatus to write the write data in the buffer 330 in the write target real segment, and wait for the write to complete.

Step 14012: The data write processing execution unit 12100 may reduce the real block free capacity 3304 corresponding to the write target real blocks by the value corresponding to the total size of the real segments that have been written this time. Further, the data write processing execution unit 12100 may add the capacity of the virtual segment set as the write target to the data storage amount 3203. Then, the data write process execution unit 12100 may report completion of the process to the storage controller 200, and complete the process.

Step 14013: Here, a process (a garbage collection process, as it is known) may be performed to move valid data in the real blocks previously allocated to the virtual block group to a new free real block. In particular, the data write processing execution unit 12100 may read out valid information, that is, only the data stored in the real segments pointed to by the new virtual segment pointer 3205, the old virtual segment pointer 3210, and the erasure prevention address 3208, from among the real blocks allocated to the virtual block group so far, write the read data to a new free real block, and update the virtual block group information 3200. More particularly, the data write processing execution unit 12100 may store a pointer to the real block information 3300 of the real block in which the data is written in the real block information pointer 3202, and set the address of the (real segment of) the real block in which the data is written in the new virtual segment pointer 3205, the old virtual segment pointer 3210, and the erasure prevention address 3208. In addition, the real block free capacity 3304 and the real segment bit map 3305 are also set for the real block information 3300 of the real blocks to which data is newly written. Note that the newly allocated real blocks are selected according to a wear leveling algorithm (an algorithm for balancing the number of erasures of each real block). As wear leveling is a well-known technique, it will not be described here in detail. In addition, the real blocks that have been allocated to the virtual block group so far are erased and managed as free real blocks. Thereafter, Step 14005 may be executed.

Figure 35:
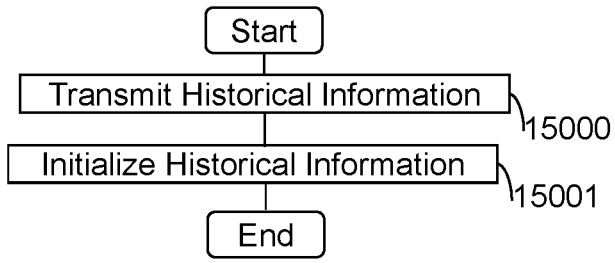
FIG. 35 is a diagram illustrating a processing flow of a historical information transmission unit.

FIG. 35 is a processing flow of the historical information transmitting unit 12200. The historical information transmitting unit 12200 is executed when a historical information transmission request is sent from the storage controller 200 (Step 12000).

Step 15000: The historical information transmitting unit 12200 sends the historical information 3400 to the storage controller 200.

Step 15001: The historical information transmitting unit 12200 initializes the historical information 3400. In particular, the historical information transmitting unit 12200 clears the area in the package memory 320 in which the historical information 3400 was stored. Subsequently, the process completes.

Figure 36:
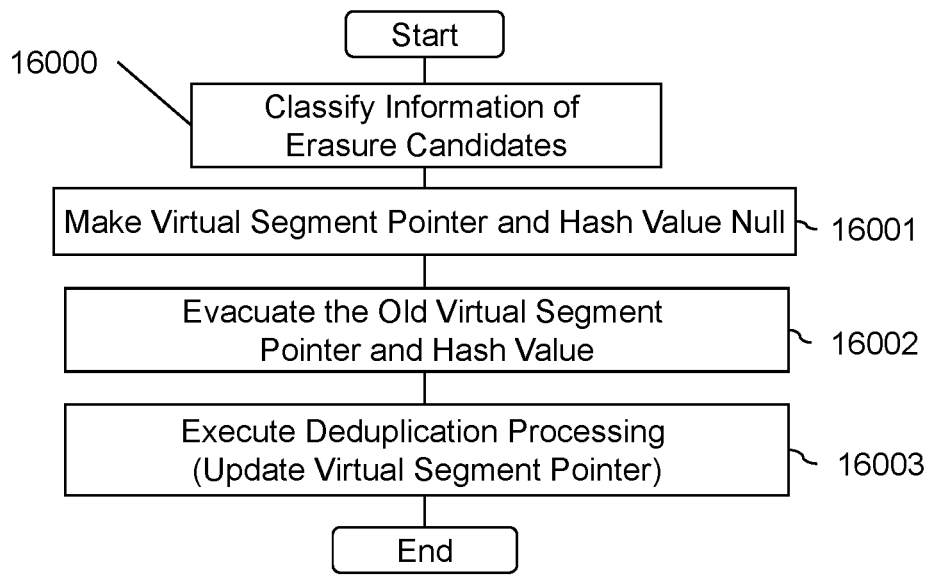
FIG. 36 is a diagram illustrating a processing flow of a deduplication execution unit.

FIG. 36 is a processing flow of the deduplication execution unit 12400. The deduplication execution unit 12400 is a processing flow that is executed when the deduplication execution request, the erasure candidates and the duplication candidates described above are sent from the storage controller 200 (Step 12006) (to be precise, the erasure candidates and the duplication candidates classified in Step 12004 and Step 12005 are sent to the flash package 230. For example, the flash package #x may receive erasure candidate-x and duplication candidate-x, but in the following description, the erasure candidate-x and the duplication candidate-x are simply referred to as an "erasure candidate" and a "duplication candidate", respectively).

Step 16000: The deduplication execution unit 12400 divides the record of the erasure candidate sent from the storage controller 200 into records with erasure flags 3603 of "1" and records of "0".

Step 16001: In this step, processing is performed on records with erasure flags 3603 of "1". Hereinafter, an example will be described of a case where there is one record with an erasure flag 3603 of "1" as a result of executing Step 16000. In the description of Step 16001, the virtual segment specified by the virtual segment address 3601 of this record is referred to as a "target virtual segment".

The deduplication execution unit 12400 may obtain, from the virtual segment address 3601 of the record, the virtual block group to which the target virtual segment belongs and the relative virtual segment number of the target virtual segment. An example will be described below of a case where the obtained relative virtual segment number is "s".

Next, by referring to the virtual block group information 3200 of the specified virtual block group, the deduplication execution unit 12400 may read the old hash value 3211 (3211-s) and the erasure prevention hash value 3209 (3209-s) of the target virtual segment and compare them with the hash value 3602.

When the hash value 3602 matches the old hash value 3211-s, the deduplication execution unit 12400 determines whether or not the address stored in the old virtual segment pointer 3210-s is the real segment address. If it is the real segment address, the deduplication execution unit 12400 may subtract the size of the virtual segment from the data storage amount 3203.

In addition, the deduplication execution unit 12400 identifies the real block information 3300 of the real block having the real segment in which the old data was stored by referring to the address stored in the old virtual segment pointer 3210-s (more particularly, the real block identifier included in the real segment address) and the real block information pointer 3202. Then, in the real segment bitmap 3305 of the real block information 3300, the deduplication execution unit 12400 turns off the bit corresponding to the real segment in which the old data was stored. If the address stored in the old virtual segment pointer 3210-s is not the actual segment address, this process is not performed.

Next, the deduplication execution unit 12400 sets the old virtual segment pointer 3210-s and the old hash value 3211-s to null. As a result, the area (the real segment pointed to by the old virtual segment pointer 3210-s) in which the old data had been stored (evacuated) and which was allocated to the virtual segment may be substantially deleted.

When the hash value 3602 matches the erasure prevention hash value 3209-s, the deduplication execution unit 12400 sets the erasure prevention hash value 3209-s and the erasure prevention address 3208-s to null, and decreases the erasure prevention virtual segment number 3207 by 1. In this way, the area (the real segment pointed to by the erasure prevention address 3208-s) in which the old data had been stored (evacuated), and which was allocated to the virtual segment may be substantially deleted.

In addition, the deduplication execution unit 12400 may subtract the size of the virtual segment from the data storage amount 3203, and turn off the bit of the actual segment bitmap 3305 corresponding to the real segment that had been pointing to the erasure prevention address 3208-s. This is the same as the processing performed for the old virtual segment pointer 3210-s described above.

Further, the deduplication execution unit 12400 may front-fill the erasure prevention hash value 3209 and the erasure prevention address 3208, which are stored behind the nullified erasure prevention hash value 3209-s and erasure prevention address 3208-s, up to the nullified erasure prevention hash value 3209 and erasure prevention address 3208.

Step 16002: In this step, processing is performed on records with erasure flags 3603 of "0". In the following, as in Step 16001, an example will be described of a case in which there is one record with an erasure flag 3603 of "0". In addition, the virtual segment specified by the virtual segment address 3601 of this record is referred to as a "target virtual segment".

The deduplication execution unit 12400 may obtain the virtual block group to which the target virtual segment belongs and the relative virtual segment number of the target virtual segment from the virtual segment address 3601 of the record. An example of a case where the obtained relative virtual segment number is "s" will be described below. The deduplication execution unit 12400 may update the virtual block group information 3200 of the specified virtual block group.

In particular, the deduplication execution unit 12400 may increment the erasure prevention virtual segment number 3207-*s* by one. Further, the deduplication execution unit 12400 may copy the old virtual segment pointer 3210 and the old hash value 3211 to the area of the erasure prevention address 3208 and the erasure prevention hash value 3209. Further, the deduplication execution unit 12400 may set the old virtual segment pointer 3210 and the old hash value 3211 to null.

Step 16003: Here, processing related to duplication candidates is executed. If the duplication candidates include a record whose duplication flag 3702 is "0", that record is ignored. If the duplication flag 3702 contains a record of "1", deduplication processing should be performed for the virtual segment specified by the virtual segment address 3701 of the record. Hereinafter, an example will be described of a case where one duplication flag 3702 "1" is included in the duplication candidates. In the following example, an example is described in which the relative virtual segment number of the virtual segment (referred to as the target virtual segment) specified by the virtual segment address 3701 of the record is "s".

The deduplication execution unit 12400 may update the virtual block group information 3200 of the virtual block group to which the target virtual segment belongs. In particular, the deduplication execution unit 12400 nullifies the new virtual segment pointer 3205-*s,* and reduces the size of the virtual segment from the data storage amount 3203. In addition, the deduplication execution unit 12400 turns off the real segment bitmap 3305 corresponding to the real segment indicated by the new virtual segment pointer 3205-*s* in the same manner as the processing in Step 16001.

Further, the deduplication execution unit 12400 sets the value of the duplicate Addr 3703 to the new virtual segment pointer 3205-*s*. In this way, the new virtual segment pointer 3205-*s* points to a virtual segment having the same hash value, and the deduplication processing of the target virtual segment is performed. Note that virtual segments having the same hash values may exist in the same flash package 230 or may be present in another flash package 230.

Upon completion of Step 16003, the deduplication execution unit 12400 notifies the storage controller 200 that the processing has been completed and ends the process. Note that, in the above description, although an example was described in which there is only one record of the erasure candidates (or duplication candidate records) to be processed in each step, but in cases where there are a plurality of records (or duplication candidate records) to be deleted, the above-described processing is performed for each record.

Figure 37:
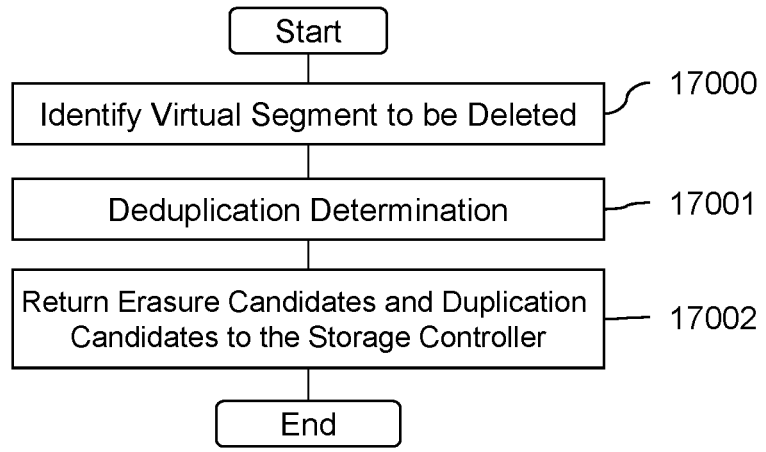
FIG. 37 is a diagram illustrating a processing flow of a deduplication determination unit.

FIG. 37 is a processing flow of the deduplication determination unit 12300. The deduplication determination unit 12300 is a processing flow executed when the deduplication determination request, the list 1, and the list 2 described above are sent from the storage controller 200 (Step 12003). The deduplication determination unit 12300 may receive a list of hash values assigned to the flash package 230 (for example, the flash package #x receives a list 1-*x* and a list 2-*x*).

Step 17000: In this step, processing related to the list 1-*x* is executed. The deduplication determination unit 12300 reads records one by one from the list 1-*x,* determines, whether or not to erase the old data of the virtual segment based on the virtual segment address 3402 and (pre-update) hash value 3403 stored in each record, and creates records for the erasure candidates.

Hereinafter, an example of processing performed when a certain record in the list 1-*x* is read out will be described. In addition, in the following, an example will be described in which the (pre-update) hash value 3403 of the read record is H. Further, the virtual segment specified by the virtual segment address 3402 of the read record is referred to as a "target segment", and the virtual segment address (i.e., virtual segment address 3402) of the target segment is referred to as a "target segment address".

When the (pre-update) hash value 3403 is H, the deduplication determination unit 12300 searches the hash index information 3500, identifies the leaf segment 3501 in which the information of the hash value H is stored, and reads the leaf segment 3501 to the buffer 330. At this time, the deduplication determination unit 12300 reads the virtual segment in which the leaf segment 3501 is stored by calling the data read processing execution unit 12600.

Subsequently, the deduplication determination unit 12300 may identify, from the read leaf segment 3501, the entry 3510 whose registered hash value 3502 is H. Further, the deduplication determination unit 12300 may determine whether or not a registered address 3505 having a value equal to the target segment address exists in the entry 3510, and perform different processing depending on the determination result.

First, a description will be provided of a case where there is a registered address 3505 equal to the value of the target segment address. In this case, there may be cases where the existing registered address 3505 is the top registered address 3505 in the entry 3510, as well as cases where it is not.

If the registered address 3505 which is equal to the value of the target segment address is not the top registered address 3505 in the entry 3510, the old data of the target segment may be deleted. As the addresses of virtual segments for which deduplication processing has not been performed are stored in the second and subsequent registered addresses 3505 in the entry 3510 (the virtual segment address of the virtual segment belonging to the same stripe line as the first registered address 3505 is stored), no problem occurs even if the old data of these virtual segments is deleted.

Accordingly, at this time, the deduplication determination unit 12300 creates, as the record of the erasure candidate, a record in which the target segment address is stored in the virtual segment address 3601, H is written to the hash value 3602, and 1 is stored in the erasure flag 3603. The deduplication determination unit 12300 may turn on the invalidation flag 3506 corresponding to the registered address 3505 that is equal to the value of the target segment address. At the same time, NULL may be stored in the registered address 3505. Further, the deduplication determination unit 12300 may reduce the number of segments 3504 by one.

Note that editing of the entry 3510 performed here (updating of segment number 3504 and the like) is performed for the contents of the entry 3510 read onto the buffer 330.

In contrast, when the registered address 3505 at the top of the entry 3510 is equal to the value of the target segment address, the old data of the target segment may or may not be deleted. When the number of registered data 3503 is 1, this indicates that there are no virtual segments having a hash value H other than the virtual segment specified by the target segment address (or the top registered address 3505). Therefore, in this case, the old data of the target segment may be erased. Also, even if the registered data number 3503 is 1, if the segment number 3504 is 2 or more, then there are a plurality of virtual segments having the hash value H. In this case, however, all the virtual segments having the hash value H exist in the same stripe line in a particular flash package group 280. As deduplication processing is not performed for virtual segments belonging to the same stripe line, they may be deleted. In contrast, when the registered data number 3503 is 2 or more, this indicates that there is a virtual segment referring to the target segment (it has been deduplicated). In that case, the old data of the target segment should not be deleted.

Accordingly, when the registered data number 3503 is 1, the deduplication determination unit 12300 creates, as a record of the erasure candidate, a record in which the target segment address is stored in the virtual segment address 3601, H is stored in the hash value 3602, and 1 is stored in the erasure flag 3603. Further, the deduplication determination unit 12300 deletes, from the leaf segment 3501, the entry 3510 whose registered hash value 3502 is H. This is because the virtual segment having the hash value H, which was also the virtual segment to be subjected to the deduplication processing, has disappeared.

When the registered data number 3503 is 2 or more, the deduplication determination unit 12300 creates, as a record of the erasure candidate, a record in which the target segment address is stored in the virtual segment address 3601, H is stored in the Hash value 3602, and 0 is stored in the erasure flag 3603 (that is, it does not allow the target segment to be erased). At this time, the deduplication determination unit 12300 does not modify the contents of the entry 3510.

Next, a description will be provided of a case where there is no registered address 3505 equal to the value of the target segment address in the entry 3510. In this case, the target segment is a virtual segment referring to the virtual segment specified by the registered address 3505 at the top of the entry 3510. Conversely, as the target segment is not being referred to by another virtual segment, the old data of the target segment may be erased. Accordingly, the deduplication determination unit 12300 creates, as a record of the erasure candidate, a record in which the target segment address is stored in the virtual segment address 3601, H is stored in the hash value 3602, and 1 is stored in the erasure flag 3603. Further, the deduplication determination unit 12300 may reduce the data registered number 3503 by one. Updating of the number of registered data 3503 performed here is also performed on the contents of the entry 3510 read onto the buffer 330.

The above processing is performed for all the records in the list 1. After the processing described above is performed for all the records in the list 1, the deduplication determination unit 12300 writes the edited (updated) leaf segments 3501 on the buffer 330. At this time, the deduplication determination unit 12300 calls the data write processing execution unit 12100 shown in FIG. 33 and FIG. 34 in order to execute the write. As can be understood from the description of the data write processing execution unit 12100, when writing to the virtual segment is performed, the write data is written in a real segment (free real segment) different from the actual segment allocated to the virtual segment.

Step 17001: In this step, processing related to list 2 is executed. The deduplication determination unit 12300 reads records one by one from the list 2-x, performs the deduplication determination based on the virtual segment address 3402 and (updated) hash value 3404 stored in each record, and creates records for the duplication candidates. Hereinafter, an example will be described of the processing performed when a certain record in the list 2-x is read. As in the case of the description of step 17000, an example will be described below of a case where the (updated) hash value 3404 of the read record is H. Further, the virtual segment specified by the virtual segment address 3402 of the read record is referred to as a "target segment," and the virtual segment address (that is, the virtual segment address 3402) of the target segment is referred to as a "target segment address".

In a case where the (updated) hash value 3404 is H, the deduplication determination unit 12300 searches the hash index information 3500, identifies the leaf segment 3501 that may possibly store the information of the hash value H, and reads them to the buffer 330. As in step 17000, at this time, the deduplication determination unit 12300 reads the leaf segments 3501 by calling the data read processing execution unit 12600.

Subsequently, the deduplication determination unit 12300 may determine whether there is an entry 3510 in the read leaf segments 3501 in which the registered hash value 3502 is H. If a corresponding entry 3510 is not found, deduplication cannot be performed (as this means that there is no duplicate data). In this case, the deduplication determination unit 12300 creates, as the duplication candidate record, a record in which the target segment address is stored in the virtual segment address 3701, 0 is written in the overlap Flag 3702, and NULL is stored in the duplicate Addr 3703. In addition, the deduplication determination unit 12300 may record the hash value H and the virtual segment address in the leaf segment 3501 read onto the buffer 330. In particular, the deduplication determination unit 12300 may newly create an entry 3510 in which H is stored in the registered hash value 3502. Further, the deduplication determination unit 12300 may sets the registered data number 3503 and the segment number to 1, set the target segment address to the first registered address 3505 in the entry 3510, and turn off the invalid flag 3506.

If there is an entry 3510 whose registered hash value 3502 is H, there is a possibility that deduplication can be performed. In this case, the deduplication determination unit 12300 may compare the virtual segment address recorded in the top registered address 3505 in the entry 3510 with the target segment address, and determine whether both belong to the same stripe line. In this determination, the flash package group information 2300 is used.

In particular, in the case that the virtual segment address recorded in the registered address 3505 and the package ID included in the target segment address are both those of the flash package 230 in the same flash package group 280, and the virtual segment address recorded in the registered address 3505 is equal to the internal virtual segment number included in the target segment address, then it can be determined that both belong to the same stripe line.

When both belong to the same stripe line, the deduplication determination unit 12300 determines not to perform the deduplication processing of the target segment. Accordingly, the deduplication determination unit 12300 creates, as the duplication candidate record, a record in which the target segment address is stored in the virtual segment address 3701, 0 is written in the overlap flag 3702, and NULL is stored in the duplicate Addr 3703. Further, the deduplication determination unit 12300 updates the entry 3510 in the leaf segment 3501 read into the buffer 330. In particular, the deduplication determination unit 12300 may increment the value of the segment number 3504 by 1, set the new registered address 3505 in the added set to the target segment address, and turn off the invalid flag 3506.

If both do not belong to the same stripe line, the target segment may be deduplicated. The deduplication determination unit 12300 may create, as the duplication record, a record in which the target segment address is stored in the virtual segment address 3701, 1 is stored in the duplication flag 3702, and the content of the top registered address 3505 in the entry 3510 is stored in the duplicate Addr 3703. Further, the deduplication determination unit 12300 may increment the registered data number 3503 in the entry 3510 by one.

The above processing is performed for all the records in the list 2. Thereafter, the deduplication determination unit 12300 writes the edited (updated) leaf segment 3501 on the buffer 330. As described in step 17000, the deduplication determination unit 12300 may execute the write by calling the data write processing execution unit 12100 depicted in FIG. 33 and FIG. 34.

Step 17002: The deduplication determination unit 12300 may return the list of the erasure candidates and the duplication candidates created in Step 17000 and Step 17001 to the storage controller 200, and then complete the processing.

The above is the processing of the deduplication determination unit 12300. In the above description, an example was described in which writing (writing to the actual segment) of the edited (updated) leaf segment 3501 on the buffer 330 is performed after completion of Step 17000, and writing of the edited (updated) leaf segments 3501 on the buffer is performed after completion of step S7001. However, in Steps 17000 and 17001, the same leaf segments 3501 to be processed (referenced or updated) may be included. Accordingly, the deduplication determination unit 12300 may not write the leaf segment 3501 to the actual segment at the time of completion of the step 17000, but may collectively perform the writing in Step 17001.

This concludes the explanation of the storage system according to this embodiment. In the storage system according to the present embodiment, deduplication of data between flash packages can be executed, so duplication elimination can be performed efficiently. In principle, as the flash package executes the deduplication processing, there is an advantage that the storage controller does not become a performance bottleneck.

In the storage system according to the present embodiment, only the data addresses corresponding to the hash values are exchanged between the storage controller and the flash package for the deduplication process. Then, the storage controller may transfer a plurality of hash values and data addresses with one command, thereby reducing the number of accesses to the flash package from the storage controller.

In addition, in the storage system that performs the deduplication processing, as in the hash index of the storage system according to the above-described embodiment, it is necessary to store the information (hereinafter referred to as an index) of the area in which the data having the hash values is stored. As these sets of information are large, storing them in an expensive storage medium such as DRAM or the like increases the bit cost of the storage device. Therefore, in the storage system according to this embodiment, these sets of information are stored in the flash memory of the flash package.

The index is modified each time a data write (update) from the host occurs. For this reason, if the indexes are consolidated and stored in a specific flash package, the number of updates of the flash package becomes large, which tends to be a performance bottleneck and can shorten the lifetime of the flash memory.

In the storage system according to the above-described embodiment, the indices may be distributed and stored in a plurality of flash packages, and the distributed and stored indexes may be managed (referenced or updated) by the respective flash packages. Accordingly, processing related to the indices does not concentrate in a specific controller (or flash package). Also, as the areas (segment) on the flash memory to which the indices are written are also managed as targets of wear leveling processing, the number of erasures may be controlled so as to not deviate between the segments in which an index is written and the segments in which the data is written.

In addition, the overhead associated with index update processing is large. Normally, when the data is updated, the hash value is also modified from a different value (old hash value to new hash value). Accordingly, once the data is updated, the following three update processes occur with respect to the index: 1) updating the hash value of the data to the new hash value, 2) adding the address of the data to the set of data having the new hash value, and 3) deleting the address of the data from the set of data having the old hash value. When trying to perform these updates with the storage controller, the flash memory access for reading out these pieces of information takes place three times and flash memory access occurs three times for the writing process, resulting in a large overhead.

In the storage system according to the embodiment described above, when transferring the write processing history and the hash value of the write data used in the deduplication processing between the storage controller and the flash package, the write processing history and the hash value may be aggregated and collectively transferred. Therefore, the overhead of information transfer can be reduced.

[Second Embodiment]

Subsequently, the second embodiment will be described. The hardware configuration of the information system in the second embodiment is the same as that of the information system (FIG. 1) in the first embodiment. In addition, in the following description, the same reference numerals used in the first embodiment may be used when specifying the same elements as those of the information system according to the first embodiment.

The storage system according to the first embodiment and the storage system according to the second embodiment have the following main differences. The flash package according to the first embodiment has a program (duplication elimination determination unit 12300) for determining whether or not deduplication is possible, and by executing the deduplication determination unit 12300, it was determined whether or not duplication elimination was possible based on the information transmitted from the storage controller 200 (list 1, list 2). In contrast, in the storage system according to the second embodiment, the storage controller 200 may include a program (in the second embodiment, this is referred to as "deduplication determination unit 12300'") for executing the same processing as the deduplication determination unit 12300 described in the first embodiment. Then, the storage controller 200 may execute the deduplication determination unit 12300', thereby determining whether or not deduplication is possible. Conversely, the flash package according to the second embodiment does not have the deduplication determination unit 12300.

Subsequently, the difference between the management information possessed by the storage system according to the first embodiment and the management information possessed by the storage system according to the second embodiment will be described. Unlike the flash package according to the first embodiment, the flash package 230 according to the second embodiment does not have the hash index information 3500. Instead, in the storage system according to the second embodiment, the storage controller 200 manages the hash index information 3500, and the hash index information 3500 is stored in the shared memory 220. Accordingly, in the flash package 230 according to the second embodiment, it is not always necessary to provide a hidden area in the flash volume.

In the second embodiment, the format of the hash index information 3500 of the storage controller 200 is the same as that described in the first embodiment. However, in the hash index information 3500 according to the second embodiment, the fact that the address on the shared memory 220 in which the leaf segment 3501 is stored is used as the leaf address 3507, which is a pointer to the leaf segment 3501, is different from the hash index information in the first embodiment (in the hash index information in the first embodiment, the virtual segment address was used as the leaf address).

In addition, the flash package 230 according to the second embodiment does not need to have the flash package group information 2300 and the hash value storage information 2400. In contrast, the storage controller 200 according to the second embodiment may have the flash package group information 2300 as in the first embodiment, but it is not necessary for it to have the hash value storage information 2400.

In the storage system according to the second embodiment, the storage controller 200 refers to/updates the hash index information 3500. Note that, in the storage system according to the first embodiment, as each flash package 230 had the hash index information 3500, a number of hash index information 3500 equal to the number of flash packages 230 were present in the storage system. In contrast, in the storage system according to the second embodiment, the storage controller 200 only needs to have one hash index information 3500. Also, in the second embodiment, an example will be described in which the hash index information 3500 is stored in the shared memory 220. However, the hash index information 3500 may be stored in the cache memory 210 instead of the shared memory 220. Alternatively, in the storage system according to the second embodiment, the hash index information 3500 may be configured to be stored in a storage area of a storage device such as the flash package 230 or an HDD.

Next, the processing executed by the storage controller 200 according to the second embodiment will be described. As described above, the flash package according to the second embodiment differs from the flash package in the first embodiment only in that it does not have the deduplication determination unit 12300, and does not execute the deduplication determination unit 12300. Accordingly, the description of the processing executed by the flash package according to the second embodiment will be omitted.

The storage controller 200 according to the second embodiment stores at least a read processing execution unit 4000, a write request receiving unit 4100, a write-after processing execution unit 4200, a deduplication scheduling unit 4300', and a deduplication determination unit 12300' in the memory 270 (not shown). The read process execution unit 4000, the write request receiving unit 4100, and the write-after process execution unit 4200 are the same programs as those described in the first embodiment. That is, when receiving a write request or read request from the host 110, the processing performed by the storage system 100 according to the second embodiment is the same as that described in the first embodiment.

Figure 38:
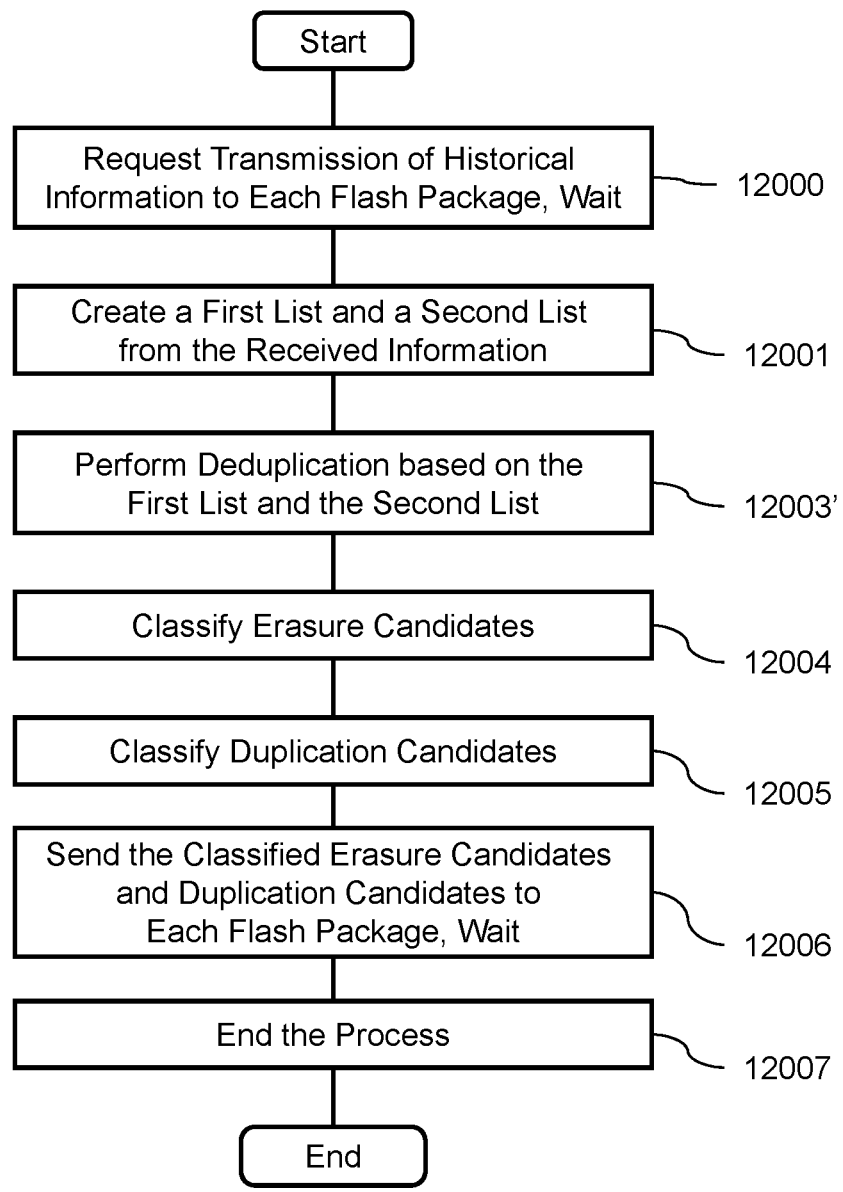
FIG. 38 is a diagram illustrating a processing flow of a deduplication scheduling unit according to the second embodiment.

The deduplication scheduling unit 4300' is a program similar to the deduplication schedule section 4300 described in the first embodiment, but there are minor differences. These differences will be primarily explained below. A flow of processing performed by the deduplication scheduling unit 4300' will be described with reference to FIG. 38.

Steps 12000 and 12001 are the same as those described in the first embodiment (Step 12000 to Step 12001 in FIG. 26). Accordingly, the explanation thereof is omitted herein. After Step 12001 is completed, the deduplication scheduling unit 4300' then executes Step 12003'.

Step 12003': This step is a substitute for the Step 12003 explained in the first embodiment. In Step 12003', the deduplication scheduling unit 4300' makes a determination as to whether deduplication is possible or not using the list 1 and the list 2 created in Step 12001. At this time, the deduplication scheduling unit 4300' determines whether or not deduplication is possible by calling the deduplication determination unit 12300'. The deduplication determination unit 12300' performs the same processing as that of the deduplication determination unit 12300 described in the first embodiment to determine whether or not to delete old data (pre-update data), to determine whether deduplication of update data is possible or not, and outputs the erasure candidates and the duplications candidate (similar to that described in the first embodiment).

After Step 12003', the deduplication scheduling unit 4300' executes Steps 12004 to 12007. Steps 12004 to 12007 are the same as the Steps 12004 to 12007 described in the first embodiment, so the description thereof will be omitted herein.

Subsequently, the flow of processing of the deduplication determination unit 12300' will be described. The main difference between the deduplication determination unit 12300 described in the first embodiment and the deduplication determination unit 12300' in the second example is that the deduplication determination unit 12300' is executed by the processor 260 of the storage controller 200. As the processing flow of the deduplication determination unit 12300' is the same as the processing flow of the deduplication determination unit 12300 described in the first embodiment, illustration of the flowchart thereof is omitted here, description will be performed with reference to FIG. 37 used in the first embodiment. Also, the following description will focus on the differences between the processing of the deduplication determination unit 12300' from the processing of the deduplication determination unit 12300 described in the first embodiment.

The deduplication determination unit 12300' starts processing based on a trigger of being called by the deduplication scheduling unit 4300'. At this time, the deduplication determination unit 12300' receives the list 1 and the list 2 from the deduplication schedule unit 4300'. In the first embodiment, the deduplication schedule unit 4300 divided the list 1 and the list 2 (based on the hash values) and transmitted the divided list 1 and the divided list 2 to the deduplication determination unit 12300 of the flash package 230. The deduplication scheduling unit 4300 according to the second embodiment does not divide the list 1 and the list 2. Accordingly, at this time, the deduplication determination unit 12300' receives the undivided lists 1 and 2 from the deduplication scheduling unit 4300'.

The processing performed after the deduplication determination unit 12300' receives the list 1 and the list 2, particularly the Steps 17000 and 17001 of FIG. 37, are substantially similar to those described in the first embodiment. Note that, in Steps 17000 and 17001, the hash index information 3500 may be updated, but in the second embodiment, as the hash index information 3500 is stored in the shared memory 220, it is unnecessary to perform processing such as reading the contents of the leaf segment 3501 from the virtual segment (or the real segment assigned to it) to the buffer and writing the updated contents on the buffer to the virtual segment as in the deduplication determination unit 12300 of the first embodiment, which differs from that described in the first embodiment.

As a result of execution of Step 17000 and Step 17001, erasure candidates and duplication candidates are generated. The deduplication determination unit 12300 in the first embodiment returns the erasure candidates and the duplication candidates (from the flash package 230) to the storage controller 200 after the end of Step 17001, but the deduplication determination unit 12300' in the second embodiment transmits the generated erasure candidates and duplication candidates to the calling program (deduplication scheduling unit 4300'). Thereafter, the deduplication determination unit 12300' terminates the processing.

By performing the above processing, the storage system according to the second embodiment can perform deduplication processing similarly to the storage system according to the first embodiment.

[Third Embodiment]

Figure 39:
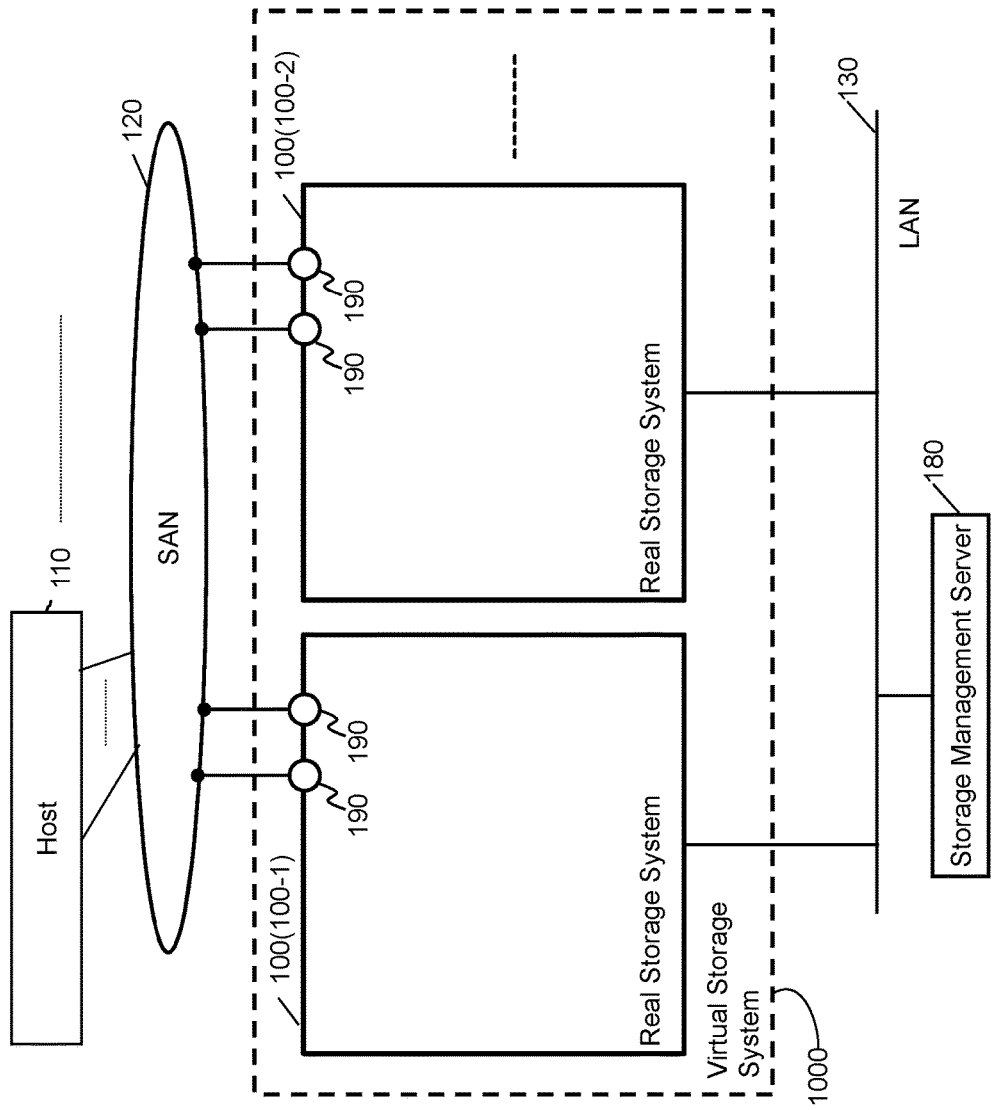
FIG. 39 is a diagram illustrating a configuration of an information system including a virtual storage system according to a third or fourth embodiment.

FIG. 39 illustrates a hardware configuration of the information system according to the third embodiment. The information system according to the third embodiment includes a plurality of real storage systems (100-1, 100-2 . . . ), one or more hosts 110, and a SAN 120 that connects them. The hardware configuration of each real storage system (100-1, 100-2 . . . ) is the same as that of the storage system 100 described in the first or second embodiments, and includes at least one storage controller 200, a cache memory 210, a shared memory 220, a flash package 230, and one or more connecting devices 250 connecting these elements (these elements are not shown in FIG. 39). In the following description, when collectively referring to each real storage system (100-1, 100-2 . . . ), it is referred to as "real storage system 100".

In FIG. 39, an element 190 of the real storage system 100 is a communication interface for connecting the real storage system 100 to the SAN 120. In the present embodiment, this is called a "port". Each real storage system 100 may include one or more ports 190. The port 190 is used by the real storage system 100 to transmit and receive data to and from the host 110 and the other real storage system 100.

The real storage system 100 according to the third embodiment may transmit and receive data and requests between the real storage systems 100, and the real storage system 100 transmits and receives data and requests via the port 190 at that time. The storage system according to the first embodiment or the second embodiment also has a port, but the description of the port is omitted in the first and second embodiments.

Further, the information system according to the third embodiment may include a storage management server 180, and the storage management server 180 is connected to each real storage system 100 via a local area network (LAN) 130.

The real storage system 100 according to the third embodiment may have the same function as the function of the storage system 100 according to the first embodiment. Therefore, as described in the first embodiment, the real storage system 100 may define one or more logical volumes and provide them to the host 110 or the like. The fact that the real storage system 100 divides and manages the storage space of each logical volume into a plurality of virtual pages, and the fact that the real page is formed from the area of the flash package group 280 and the real pages are allocated to the virtual page are the same as in the first embodiment.

In addition to the functions of the storage system 100 according to the first embodiment, the real storage system 100 according to the third embodiment also has a function of using (sharing) the storage areas of the respective real storage systems 100 with each other. Accordingly, in the third embodiment, the collection of the real storage systems 100 that can use this storage area with each other are referred to as a "virtual storage system 1000".

The virtual storage system 1000 may be defined, for example, by a user (administrator) of the information system. When the administrator determines the set of the real storage systems 100 belonging to one virtual storage system 1000, the storage management server 180 is used to notify each real storage system 100 of a set of identification numbers (for example, manufacturing numbers, etc.) of the real storage systems 100 that are to belong to one virtual storage system 1000. By receiving this information, each real storage system 100 can recognize each real storage system 100 that will belong to the virtual storage system 1000.

One example of a configuration in which each real storage system 100 shares storage areas with each other is a configuration in which deduplication is performed across a plurality of real storage systems 100. In the following, an example of a configuration in which deduplication is performed across a plurality of real storage systems 100 will be described with reference to FIG. 18, which was used also in the first embodiment. It is assumed that the flash package 230-A shown in FIG. 18 is mounted in the real storage system 100-1, while the real storage system 100-2 is equipped with the flash package 230-B.

It is assumed that the same data as the data written in the virtual segment #x of the flash package 230-A is written in the virtual segment #y of the flash package 230-B. In this case, the real segment in the flash package 230-B is once allocated to the virtual segment #y of the flash package 230-B, and the written data is stored in the allocated actual segment.

In the subsequent deduplication process, the flash package 230-B stores the virtual segment address of the virtual segment #x of the flash package 230-A in the new virtual segment pointer (3205) of the virtual segment #y, such that the virtual segment #y is made to refer to the virtual segment #x. Then, the real segment that was previously allocated to the virtual segment #y can no longer be allocated to the virtual segment #y (however, as described in the first embodiment, in the case that there is another virtual segment referring to the virtual segment #y in the virtual storage system 1000, the address of the real segment is evacuated to the erasure prevention address 3208 of the virtual segment #y (or old virtual segment pointer 3210), and the state where the real segment is allocated to the virtual segment #y is maintained).

Subsequently, when the host 110 issues a read request including the virtual segment #y in the read target range, data is read out from the flash package 230-A having the virtual segment #x and returned to the host 110. This process will be described later. As described above, the deduplication across the plurality of real storage systems 100 is performed in the virtual storage system 1000 according to the third embodiment, such that it can be anticipated that the efficacy of reducing the data amount will be greater than the storage systems according to the first or second embodiments.

As another example in which each real storage systems 100 share a storage area with each other, there may be a configuration in which each real storage system 100 shares real pages. For example, the real storage system 100-1 may have a function of allocating a real page of the real storage system 100-2 to the virtual page of the logical volume defined by the real storage system 100-1, such that when the write data for the virtual page of the logical volume defined by the real storage system 100-1 is received from the host 110, the write data may be stored in the real page of the real storage system 100-2. However, as this function is not directly related to deduplication processing, the description of this function is abbreviated herein. Also in the following description, explanation will be made assuming that the real storage system 100 does not have this function.

Next, the management information possessed by the real storage system 100 according to the third embodiment will be described. First, the real storage system 100 retains at least the management information (management information depicted in FIG. 5) described in the first embodiment in the shared memory 220. In addition to this, the real storage system 100 also retains information (storage system information 2700 to be described later) regarding each real storage system 100 in the virtual storage system 1000 in the shared memory 220.

Figure 40:
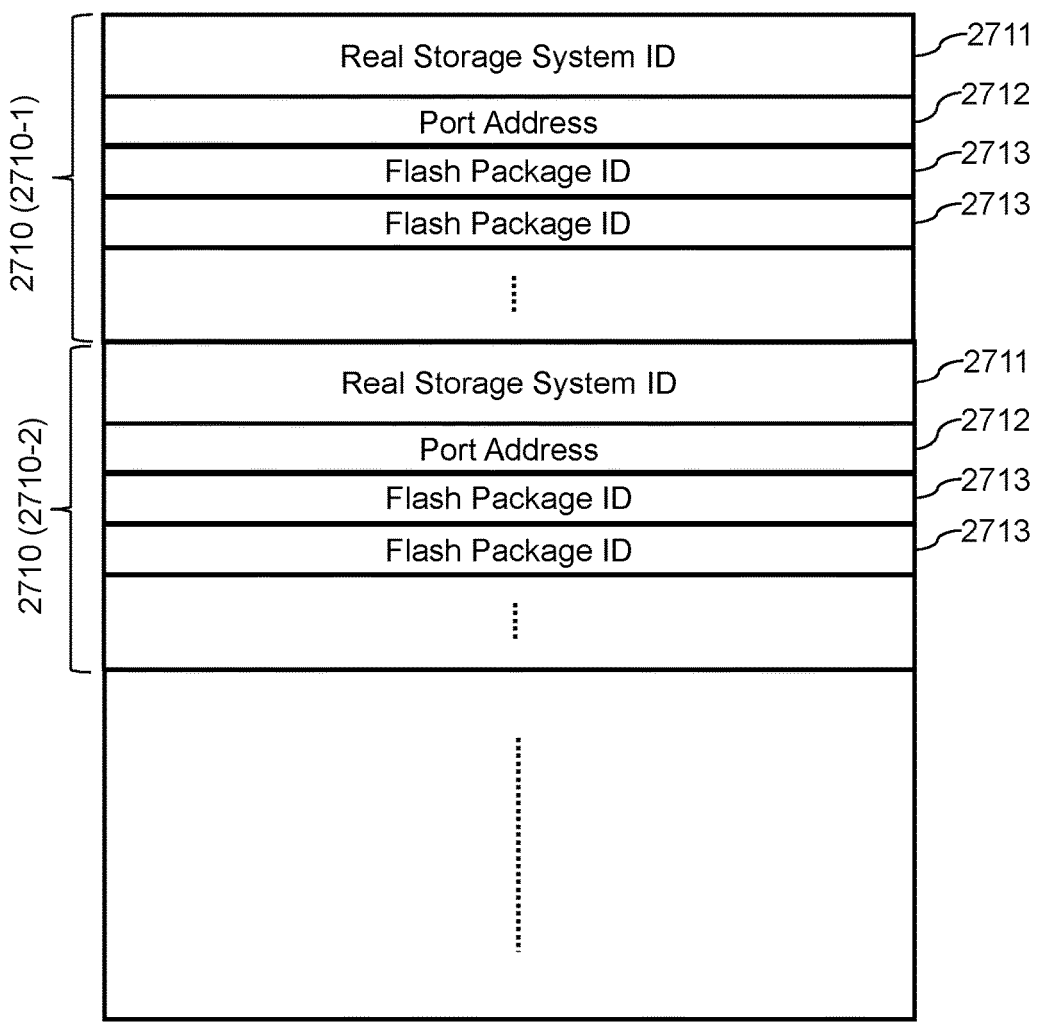
FIG. 40 is a diagram illustrating a format of storage system information.

The contents of the storage system information 2700 will be described with reference to FIG. 40. The storage system information 2700 is a set of the information of the flash packages 230 of each real storage system 100 in the virtual storage system 1000 and information of the ports of each real storage system 100.

Also, a set of information for a flash package 230 possessed by one real storage system 100 in the virtual storage system 1000 and port information is referred to as "real storage system information 2710". The storage system information 2700 includes real storage system information 2710 of all the real storage systems 100 in the virtual storage system 1000.

The contents of the real storage system information 2710 will be described with reference to FIG. 40. The real storage system information 2710 includes a real storage system ID 2711, a port address 2712, and a flash package ID 2713.

The real storage system ID 2711 is an identification number (for example, a manufacturing number or the like) of the real storage system 100. The port address 2712 may be an identifier of a port possessed by the real storage system 100 and is, for example, an N_Port ID or WWN (World Wide Name). The real storage system 100 according to the third embodiment may issue a data transmission/reception request (a request such as an external package read request to be described later) to another real storage system 100 via the SAN 120. At this time, it issues an access request designating the port of the real storage system 100 that is the target of the request transmission. Port address 2712 is used for that purpose. When the real storage system 100 includes a plurality of ports, a plurality of port addresses 2712 may be stored in the real storage system information 2710.

The flash package ID 2713 is the package ID of the flash package 230 of the real storage system 100. Typically, the real storage system 100 is equipped with a plurality of flash packages 230. Package IDs for all the flash packages 230 of the real storage system 100 are stored in the real storage system information 2710. Note that, in the virtual storage system 1000 according to the third embodiment, an identifier unique within the virtual storage system 1000 is used as the package ID for each flash package 230.

The storage system information 2700 is information that all the real storage systems 100 in the virtual storage system 1000 have. The contents of the storage system information 2700 of each real storage system 100 in the virtual storage system 1000 are the same.

Subsequently, the hash value storage information 2400 included in the real storage system 100 according to the third embodiment will be described. However, since the format of the hash value storage information 2400 is the same as that described in the first embodiment (FIG. 11), the figure illustration thereof is omitted herein.

In the virtual storage system 1000 according to the third embodiment, similarly to the first embodiment, each flash package 230 makes a determination as to whether or not deduplication is possible, and the hash values are stored in the flash package 230 (as described in the first embodiment, the hash values are stored in the leaf segment 3501 in the hash index information 3500). Also, as in the first embodiment, the ranges of the hash values assigned to each flash package 230 are different for each flash package 230. As with the hash value storage information 2400 described in the first embodiment, the hash value storage information 2400 of the virtual storage system 1000 according to the third embodiment stores information regarding the range of the hash values handled by each flash package 230. As in the first embodiment, in the virtual storage system 1000 according to the third embodiment, the hash value storage information 2400 may be stored in the shared memory 220 of each real storage system 100 and the package memory 320 of each flash package 230.

The format of the hash value storage information 2400 according to the third embodiment is the same as that described in the first embodiment, and a plurality of sets of the hash range 2401 and the flash package ID 2402 are included. The difference between the hash value storage information 2400 of the real storage system 100 according to the third embodiment and the hash value storage information 2400 of the storage system 100 according to the first embodiment is that, although the hash value storage information 2400 included in the storage system 100 according to the first embodiment includes only the information of the hash value assigned to each flash package in the storage system 100, the hash value storage information 2400 included in the real storage system 100 according to the third embodiment includes information on hash values assigned to all the flash packages 230 of each real storage system in the virtual storage system 1000.

Next, the management information possessed by the flash package 230 will be described. The type of management information possessed by the flash package 230 according to the third embodiment is the same as the management information (FIG. 12) possessed by the flash package 230 according to the first embodiment. Also, the format of each set of management information is the same between the first embodiment and the third embodiment.

However, the management information possessed by the flash package 230 according to the first embodiment and the management information possessed by the flash package 230 according to the third embodiment have the following differences. The flash package 230 according to the first embodiment retains the flash package group information 2300 of all the flash package groups 280 in the storage system 100, but the flash package 230 according to the third embodiment retains the flash package group information

2300 of all the flash package groups 280 managed by each real storage system 100 in the virtual storage system 1000.

Subsequently, the processing executed by the storage controller 200 and the flash package 230 in the virtual storage system 1000 according to the third embodiment will be described. First, the processing performed by the storage controller 200 will be described.

The main program executed by the storage controller 200 according to the third embodiment includes a read processing execution unit 4000', a write request receiving unit 4100, a write-after processing execution unit 4200, a deduplication scheduling unit 4300", and an external package read execution unit 4400 (not shown). As the write request receiving unit 4100 and the write-after process execution unit 4200 are the same as those described in the first embodiment, the description thereof is omitted herein.

Similar to the read processing execution unit 4000 described in the first embodiment, the read processing execution unit 4000' is a program executed when a read request is received from the host 110. The deduplication scheduling unit 4300" is a program that performs the same processing as the deduplication scheduling unit 4300 described in the first embodiment.

The external package read execution unit 4400 is a program executed when the real storage system 100 receives a request (external package read request) from another real storage system. Hereinafter, a flow of processing executed by the read processing execution unit 4000', the deduplication scheduling unit 4300", and the external package read execution unit 4400 will be described.

First, the processing flow of the read processing execution unit 4000' in the third embodiment will be described with reference to FIG. 41. In the virtual storage system 1000 according to the third embodiment, the real storage system 100 that has received the read request from the host 110 may issue a request (external package read request) to another real storage system 100 in the virtual storage system 1000. In the following description, the real storage system 100 that has received the read request from the host 110 is referred to as "real storage A", and the real storage system 100 to which the real storage A issues the external package read request is referred to as "Real storage B".

Figure 41:
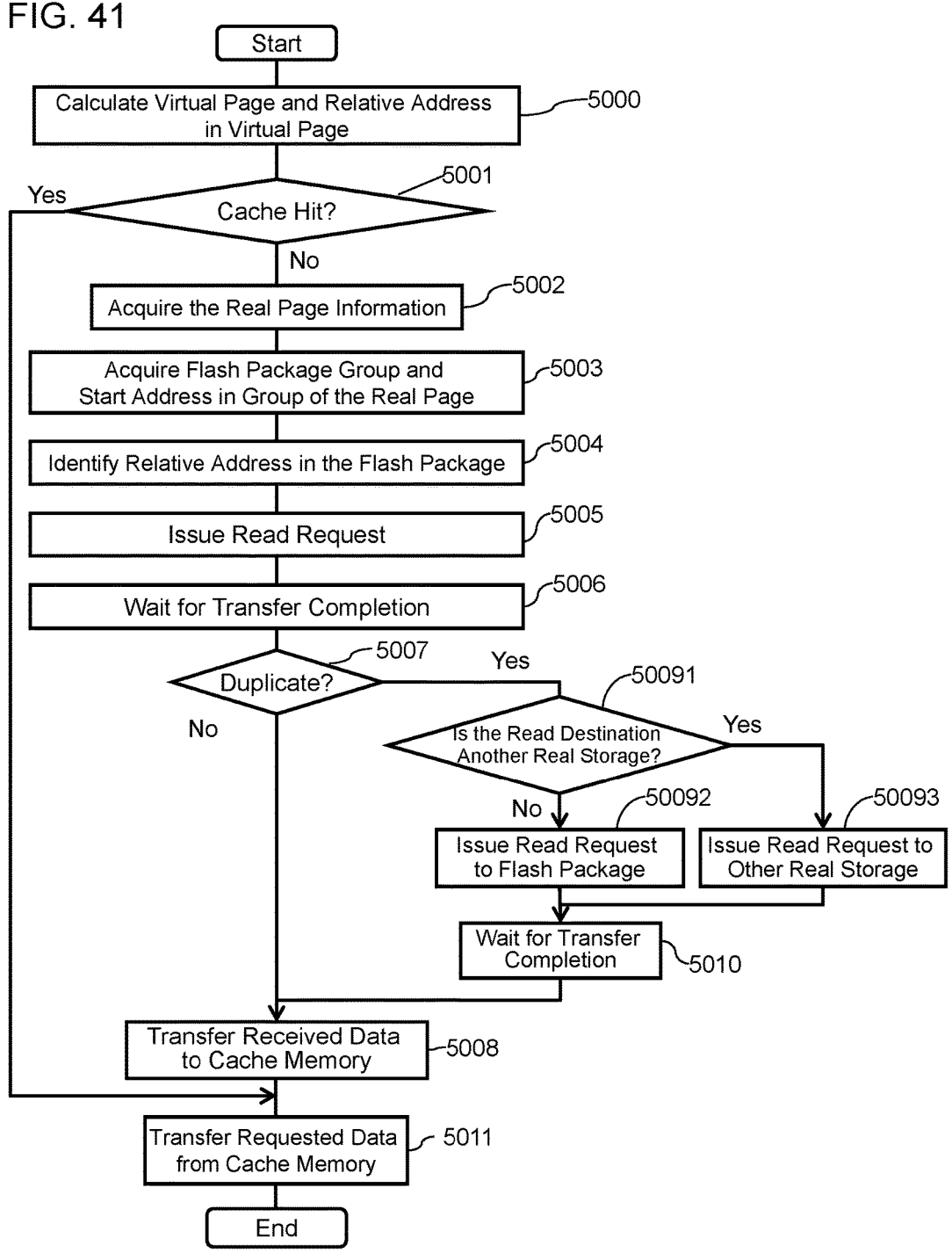
FIG. 41 is a diagram illustrating a processing flow of a read processing execution unit in Embodiment 3 or 4.

Each step shown in FIG. 41 is a process executed by the read processing execution unit 4000' of the real storage system 100 (that is, real storage A) that has received a read request from the host 110. Accordingly, in the following explanation, this indicates that the locations described with the read processing execution unit 4000' as the subject are the processes executed by the real storage A.

The read processing execution unit 4000' may execute Steps 50091 to 50093 instead of Step 5009, which was performed in the read processing execution unit 4000 in the first embodiment. The other processes (Step 5000 to Step 5007, Step 5008, Step 5010, Step 5011) are the same as those described in the first embodiment. Hereinafter, Steps 50091 to 50093 will be primarily described.

In Step 5006, when a response indicating that data was deduplicated is returned from the flash package 230 of the real storage A to the storage controller 200 of the real storage A (Step 5007: Yes), the read processing execution unit 4000' performs Step 50091. As described in the first embodiment, the response indicating that the data was deduplicated may include a set of the virtual segment address and the hash value.

In Step 50091, the read processing execution unit 4000' may determine, by referring to the storage system information 2700, whether the virtual segment address included in the response indicating that the data was deduplicated is a virtual segment address of a flash package 230 of the real storage A or a virtual segment address of a flash package 230 of another real storage system 100. As the package ID of the flash package 230 is included in the virtual segment address, the read processing execution unit 4000' can determine, by ascertaining which of the real storage system information 2710 of the storage system 2700 the package ID in the virtual segment address included in the response is included in, to which virtual segment address of the flash package 230 of the real storage system 100 the virtual segment address belongs.

If the virtual segment address included in the response is the virtual segment address of the flash package 230 possessed by the real storage A (Step 50091: No), the read processing execution unit 4000' may issue a hash designation read request to the flash package 230 of the real storage A (Step 50092). Step 50092 is the same processing as that of Step 5009 described in the first embodiment. Thereafter, the read processing execution unit 4000' may execute Step 5010, Step 5008, and Step 5011, and end the process.

When the virtual segment address included in the response is the virtual segment address of the flash package 230 of a real storage system 100 other than the real storage A (for example, real storage B) (Step 50091: Yes), the read processing execution unit 4000' requests the real storage B to acquire the data in the flash package 230 (Step 50093). The request issued here is called "external package read request".

In Step 50093, the read process execution unit 4000' may issue the external package read request to the real storage B via the SAN 120. The information included in the external package read request are the virtual segment address, the hash value, and the port address of the real storage system 100 (real storage B).

The processing performed in Step 50093 will be described in detail. In the following description, an example of a case will be described where the package ID (included in the virtual segment address) included in the response indicating that the data was deduplicated is "p". The read processing execution unit 4000' may identify the real storage system information 2710 whose flash package ID 2713 is "p" from among the real storage system information 2710 in the storage system information 2700.

Subsequently, the read processing execution unit 4000' acquires the port address 2712 included in the identified real storage system information 2710. Further, the read processing execution unit 4000' creates an external package read request using the acquired port address 2712, the virtual segment address, and the hash value included in the response indicating that the data is deduplicated, and sends the external package read request to the real storage B via the SAN 120. Details of the processing performed in the real storage system 100 (real storage B) that has received the external package read request will be described later.

Thereafter, the read processing execution unit 4000' waits until the response (response including the read data) is returned from the real storage B (step 5010). When the response is returned, the read processing execution unit 4000' may execute Steps 5008 and 5011 and end the processing.

Figure 42:
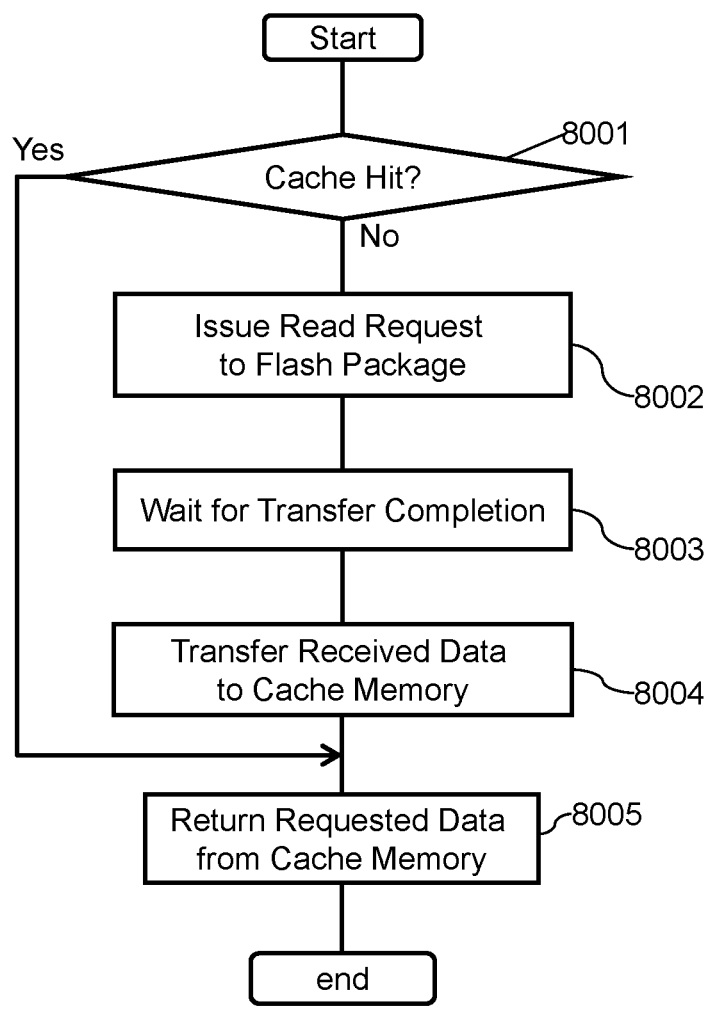
FIG. 42 is a diagram illustrating a processing flow of an external package read execution unit in Embodiment 3 or 4.

Subsequently, the flow of processing performed in the real storage system 100 that has received the external package read request will be described with reference to FIG. 42. Upon receiving the external package read request, the real storage system 100 initiates execution of the external package read execution unit 4400.

Step 8001: The external package read execution unit 4400 may check whether the read target data designated by the external package read request is stored in the cache memory 210 (hit). This is a known technique. If it is hit (Step 8001: Yes), the external package read execution unit 4400 returns the data stored in the cache memory 210 to the real storage system 100 of the request source (Step 8005), and ends the processing. If it is not hit (Step 5001: No), then step 8002 is performed.

Step 8002: This processing is similar to the Step 5009 described in the first embodiment. The external package read execution unit 4400 creates a hash designation read request using the virtual segment address and the hash value designated by the external package read request, and issues the created hash designation read request to the flash package 230 in which the read target data is stored. Since the package ID of the flash package 230 in which read target data is stored is stored in the virtual segment address specified by the external package read request, the external package read execution unit 4400 can specify the flash package 230 of the request issue destination.

Step 8003: The external package read execution unit 4400 waits for data to be sent from the flash package 230.

Step 8004: The external package read execution unit 4400 may reserve an area for storing the read target data in the cache memory 210, and store the data sent from the flash package 230 in the reserved area.

Step 8005: The external package read execution unit 4400 returns the data stored in the cache memory 210 to the real storage system 100 of the request source, and the processing is completed.

Next, the processing flow of the deduplication scheduling unit 4300" will be described. The deduplication scheduling unit 4300" is a program executed by all the real storage systems 100 included in the virtual storage system 1000. In the third embodiment, execution of the deduplication scheduling unit 4300" is initiated simultaneously in each real storage system 100 included in the virtual storage system 1000. For example, the storage management server 180 may periodically transmit a command instructing the start of execution of the deduplication scheduling unit 4300" to all the real storage systems 100 in the virtual storage system 1000, and each real storage system 100 may initiate execution of the deduplication scheduling unit 4300" according to the instruction from the storage management server 180. Alternatively, a particular one of the real storage systems 100 may periodically send an instruction instructing the start of execution of the deduplication scheduling units 4300" to all the real storage systems 100 in the virtual storage system 1000.

Figure 43:
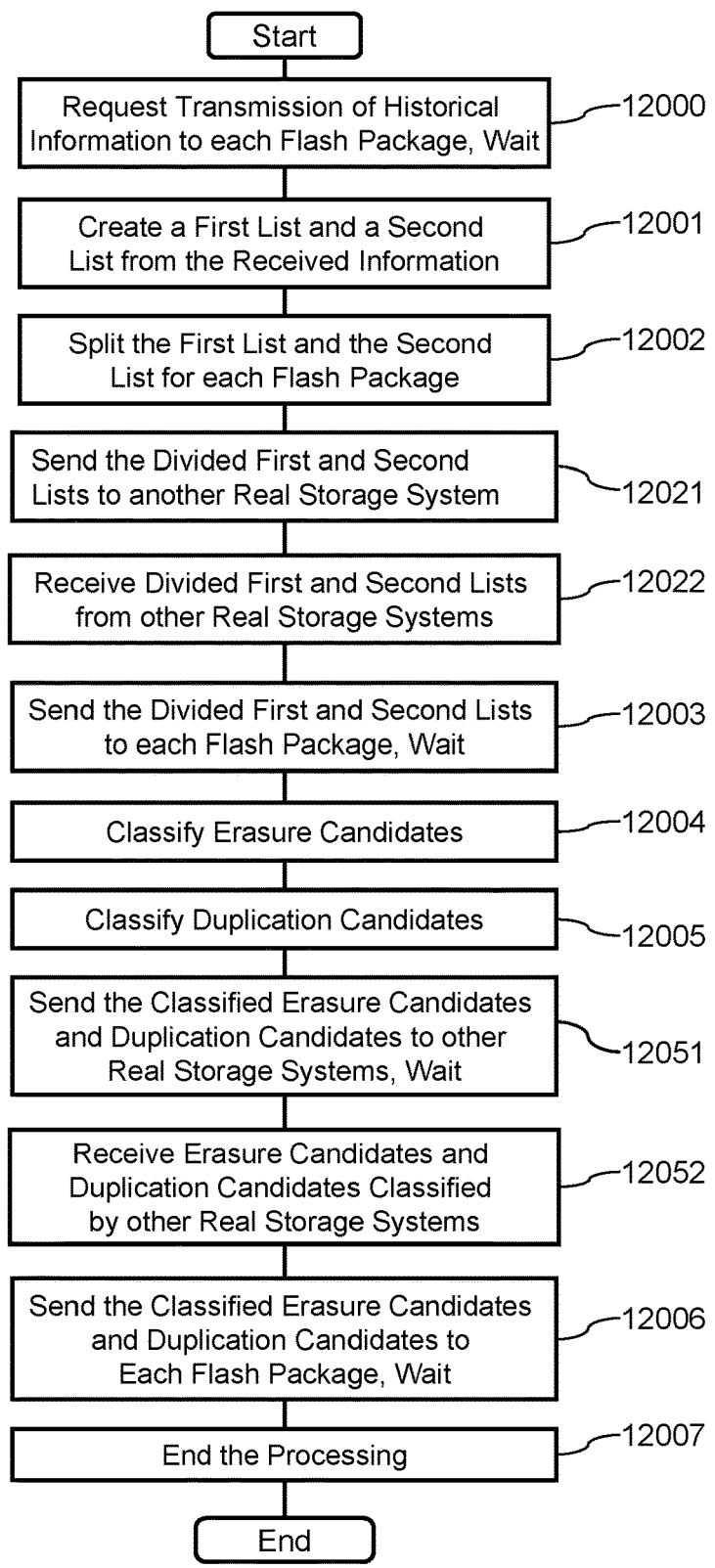
FIG. 43 is a diagram illustrating a processing flow of a deduplication scheduling unit in the third embodiment.

FIG. 43 illustrates a processing flow of the deduplication scheduling unit 4300" executed by a specific one of the real storage systems 100 in the virtual storage system 1000 (hereafter, this will be referred to as "real storage A"). Steps 12000 to 12002 are the same as the processing of the deduplication scheduling unit 4300 described in the first embodiment (FIG. 26), so the description thereof will be omitted herein.

Step 12021: The deduplication schedule section 4300" of the real storage A transmits those items that should be sent to another real storage system 100 from among the list 1 and the list 2 created and divided in the Steps 12001 to 12002 to the other real storage systems 100. In the following description, as in the first embodiment, the set of records determined in Step 12002 to be transmitted to the flash package #f among the records in the list 1 will be denoted as "list 1-*f*", and similarly, the set of records determined in Step 12002 to be sent to the flash package #f from among the records in list 2 will be denoted as "list 2-*f*".

In addition, in the explanation of FIG. 43, an example is described in Step 12021 in which the deduplication scheduling unit 4300" of the real storage A transmits the list 1-*f* and the list 2-*f* to the real storage system 100 having the flash package #f. By referring to the storage system information 2700, the deduplication scheduling unit 4300" of the real storage A may identify the port address 2712 of the real storage system 100 having the flash package #f, and transmit the list 1-*f* and the list 2-*f* to the port address 2712 of the identified real storage system 100. The transmission of the list 1-*f* and the list 2-*f* is performed via the SAN 120. However, as another embodiment, the list 1-*f* and the list 2-*f* may be transmitted via the LAN 130.

Note that, in Step 12002, as a result of the deduplication scheduling unit 4300" of the real storage A creating the divided lists 1 and 2, there may be cases where, for example, there are no records of list 1 (or records of list 2) to be sent to a particular real storage system 100 (hereinafter referred to as "actual storage C"). In such a case, the deduplication scheduling unit 4300" of the real storage A may create one record in which invalid values (NULL) are stored in the virtual segment address 3402 and the (pre-update) hash value 3403 in Step 12021, and transmit the created record to the real storage C.

When there are no records for list 1 (or records for list 2) to be sent to the real storage C, if the real storage A does not send anything to the real storage C, the real storage C cannot determine whether there are no records for list 1 (or records for list 2) to be sent from the real storage A to the real storage C, or if the records transmitted from the real storage A failed to reach the real storage C due to a failure or the like. Accordingly, when there are no records for list 1 (or records for List 2) to be sent to the real storage C, the real storage A creates a record in which invalid values (NULL) are stored and transmits it to the real storage C.

Step 12022: The deduplication scheduling unit 4300" of the real storage A waits until all the real storage systems 100 (excluding real storage A) in the virtual storage system 1000 receive the divided lists 1 and 2. Then, after the deduplication scheduling unit 4300" of the real storage A receives the divided lists 1 and 2 from all the real storage systems 100 in the virtual storage system 1000, it then executes Steps 12003 to 12005. As Steps 12003 to 12005 are the same as the processing described in the first embodiment, the description thereof will be omitted herein. However, in the third embodiment, when the deduplication scheduling unit 4300" of the real storage A transmits the list 1 and the list 2 divided in Step 12003 to each flash package 230, in addition to list 1 and list 2 (the list 1 and list 2 created and divided in Steps 12001, 12002) created in the real storage A, the list 1 and the list 2 received from the other real storage system 100 in Step 12022 are also transmitted to the flash package 230.

Also, in the following description, the set of records to be transmitted to the flash package #f among the records included in the erasure candidates received from each flash package 230 in Step 12003 is referred to as "erasure candidates-f" as in the first embodiment. Likewise, the set of records to be transmitted to the flash package #f among the records in the duplication candidates is referred to as "duplication candidates-f".

Step 12051: The deduplication scheduling unit 4300" of the real storage A selects the items that should be sent to another real storage system 100 from among the erasure candidates and duplication candidates classified in Steps 12004 to 12005, and transmits them to another real storage system 100. Similar to Step 12021, the deduplication scheduling unit 4300" of the real storage A refers to the storage system information 2700 to identify the port address 2712 of the real storage system 100 having the flash package #f, and transmits the erasure candidates-f and the duplication candidates-f to the identified real storage system 100.

Note that in some cases there may be no erasure candidate records (or duplication candidate records) to be transmitted to a particular real storage system 100 (provisionally referred to as "real storage C"). In that case, the deduplication scheduling unit 4300" creates one record in which an invalid value (NULL) is stored, for example, in the virtual segment addresses 3601 (or the virtual segment addresses 3701) as in the method described in Step 12021, and the record in which these invalid values are stored is transmitted to the real storage C.

Step 12052: The deduplication scheduling unit 4300" of the real storage A receives the classified erasure candidates and duplication candidates from the other real storage systems 100 in the virtual storage system 1000. Thereafter, the deduplication scheduling unit 4300" of the real storage A executes Steps 12006 to 12007. Steps 12006 to 12007 are substantially similar to the processing described in the first embodiment. In the third embodiment, however, in Step 12006, in addition to transmitting the erasure candidates and the duplication candidates created in the real storage A to the flash package 230, the deduplication schedule section 4300" of the real storage A transmits the erasure candidates and the duplication candidates received from the other real storage systems 100 to the flash package 230.

Note that, as the processing executed in the flash package 230 according to the third embodiment is substantially similar to that described in the first embodiment, the description of the processing executed in the flash package 230 will be omitted herein.

The above is the description of the processing executed in the virtual storage system 1000 in the third embodiment. In the virtual storage system 1000 according to the third embodiment, by performing the above-described processing, deduplication of a plurality of real storage systems 100 may become possible.

[Fourth Embodiment]

Subsequently, the fourth embodiment will be described. As the hardware configuration of the information system in the fourth embodiment is the same as that of the information system in the third embodiment, the figure illustration thereof is omitted herein. Also, in the following description, the same reference numerals used in the third embodiment are used when specifying the same elements as those of the information system according to the third embodiment.

As in the virtual storage system according to the third embodiment, the virtual storage system according to the fourth embodiment performs deduplication across a plurality of real storage systems 100. However, in the virtual storage system (or the real storage system) according to the fourth embodiment, the storage controller 200 performs a portion of the processing that was performed in the flash package according to the third embodiment (or the first embodiment).

The flash package according to the first or third embodiment included a program (deduplication determination unit 12300) for determining whether or not deduplication processing was possible, and performed the deduplication possibility determination based on the information (list 1, list 2) sent from the storage controller 200. In contrast, as in the storage system described in the second embodiment, the storage controller 200 of the fourth embodiment determines whether or not deduplication processing can be performed. Accordingly, the storage controller 200 may include a program similar to the deduplication determination unit 12300' described in the second embodiment (in the fourth embodiment, this was referred to as deduplication determination unit 12300"). Conversely, the flash package according to the fourth embodiment does not include the deduplication determination unit 12300.

Similar to the flash package 230 according to the second embodiment, the flash package 230 according to the fourth embodiment does not include the hash index information 3500. Instead, in the virtual storage system according to the fourth embodiment, each real storage system 100 in the virtual storage system has the hash index information 3500 in its shared memory 220.

Further, the flash package 230 according to the fourth embodiment need not include the flash package group information 2300 and the hash value storage information 2400. In contrast, the real storage system 100 according to the fourth embodiment may include the flash package group information 2300 in the shared memory 220. However, the real storage system 100 also retains the flash package group information 2300 of the flash package group 280 possessed by other real storage systems 100 in the virtual storage system 1000.

Figure 44:
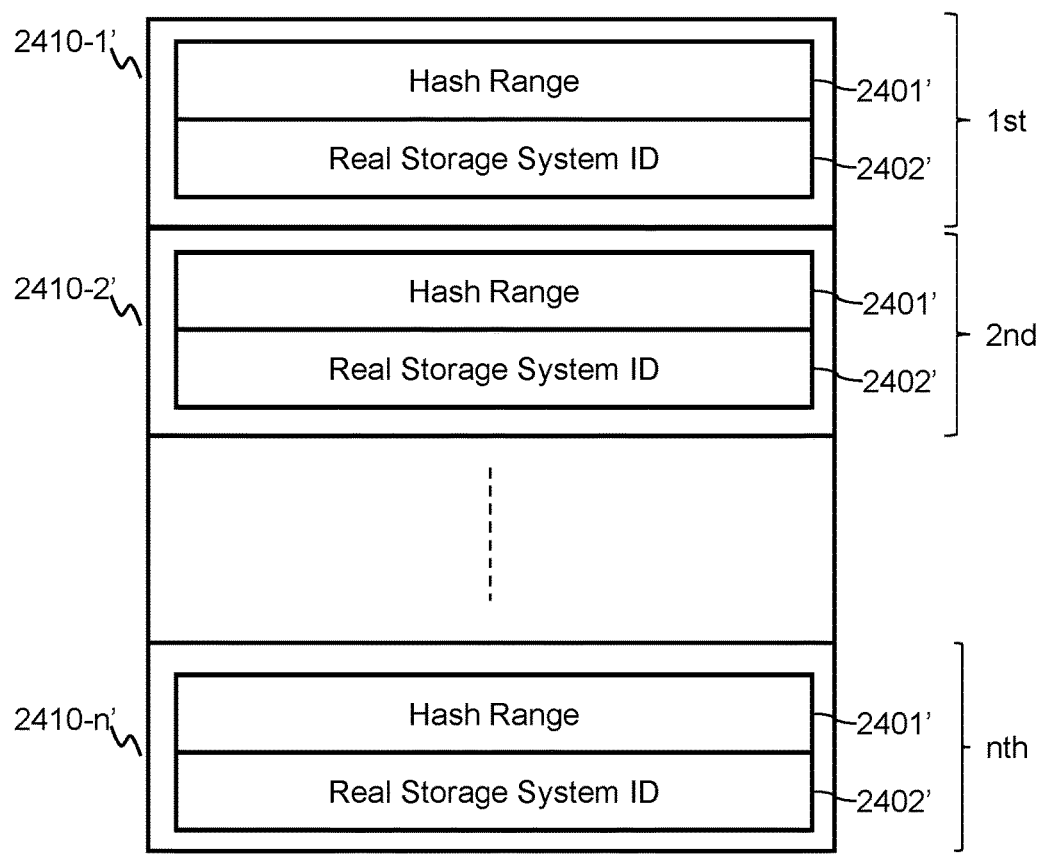
FIG. 44 is a diagram illustrating a format of hash value storage information in the fourth embodiment.

In addition, the real storage system 100 according to the fourth embodiment may include hash value storage information 2400' instead of the hash value storage information 2400 described in the first embodiment and the like. The format of the hash value storage information 2400' will be described with reference to FIG. 44. In the hash value storage information 2400 described in the first embodiment and the like, information regarding the range of the hash values assigned to each flash package 230 was stored. In contrast, the hash value storage information 2400' stores information regarding the range of hash values handled by each real storage system 100.

It should be noted that the meaning (definition) of "hash values handled by the real storage system 100" is the same as "hash value handled by the flash package". For example, when the real storage system #p (the real storage system 100 having the identification number p) determines whether deduplication is possible for a virtual segment whose hash value ranges are from a to b, this is expressed as "the range of the hash values handled by the real storage system #p is a to b".

The hash value storage information 2400' has a plurality of sets of a hash range 2401' and a real storage system ID 2402'. Here, the set of the hash range 2401' and the real storage system ID 2402' is referred to as an extent 2410'. For example, in a case that the hash value range stored in the hash range 2401' in a certain extent 2410' is a to b and the real storage system ID 2402' in the extent 2410' is p, this means that the range of the hash value handled by the real storage system #p is a to b, and when performing the deduplication possibility determination described later, the real storage system #p determines whether or not deduplication is possible for virtual segments having hash value ranges from a to b. Also in this case, the range of the hash values stored in the hash index information 3500 created and managed by the real storage system #p is a to b.

The hash value storage information 2400' is information stored in the shared memory 220 of all the real storage systems 100 in the virtual storage system 1000. Also, the content of the hash value storage information 2400' of each real storage system 100 is the same.

Next, the processing executed by the storage controller 200 according to the fourth embodiment will be described. Note that the flash package according to the fourth embodiment is the same as the flash package according to the second embodiment. That is, the flash package according to the fourth embodiment is different from the flash package in the first or third embodiments only in that it does not have the deduplication determination unit 12300 and does not execute the deduplication determination unit 12300. Accordingly, the description of the processing executed by the flash package according to the fourth embodiment will be omitted herein.

The storage controller 200 according to the fourth embodiment includes at least a read processing execution unit 4000', a write request receiving unit 4100, a write-after processing execution unit 4200, a deduplication scheduling unit 4300''', an external package read execution unit 4400, and a deduplication determination unit 12300' (not shown).

Both the read process execution unit 4000' and the external package read execution unit 4400 are the same as those described in the third embodiment. The write request receiving unit 4100 and the write-after process executing unit 4200 are the same as those described in the first embodiment and the like. The deduplication determination unit 12300' is the same as that described in the second embodiment. For this reason, the description thereof will be omitted herein.

Figure 45:
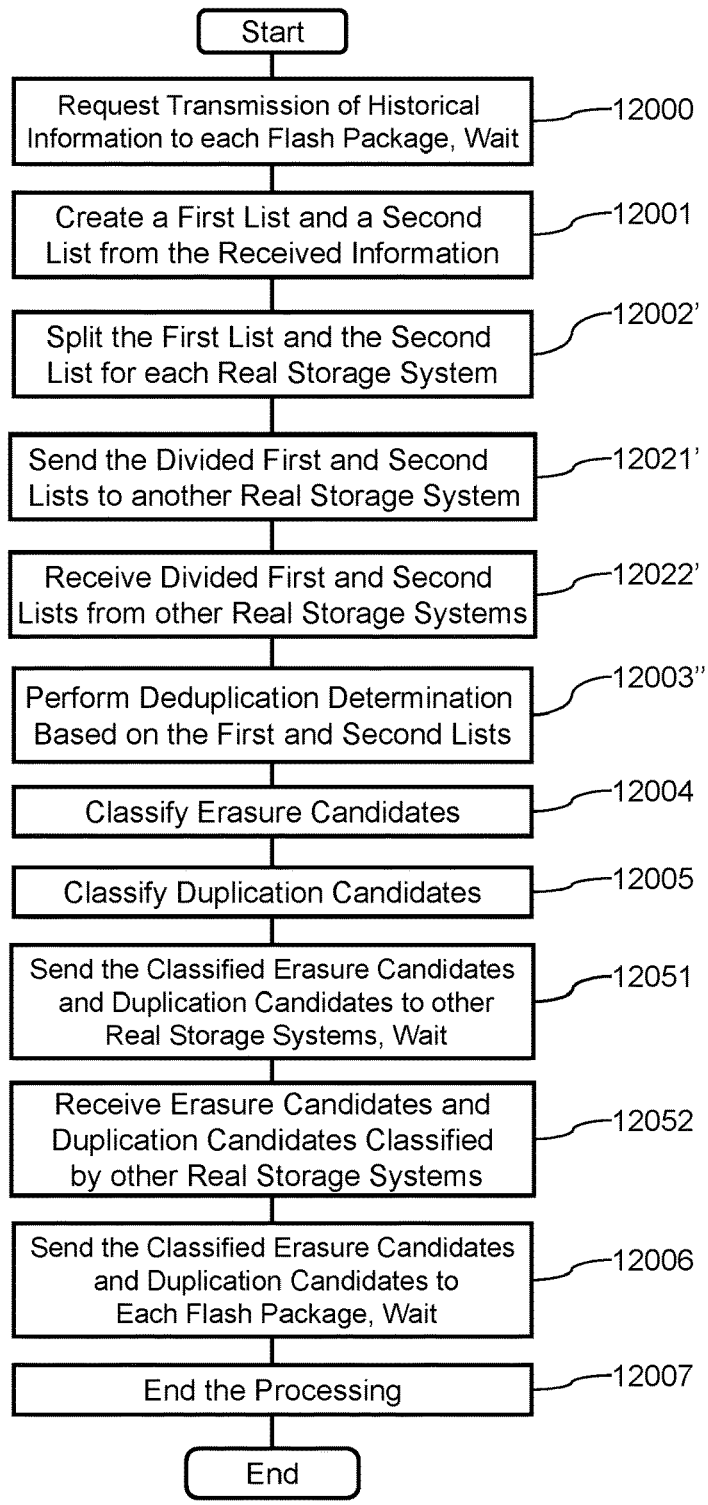
FIG. 45 is a diagram illustrating a processing flow of a deduplication schedule section according to the fourth embodiment.

The processing flow of the deduplication schedule section 4300''' will be described with reference to FIG. 45. Steps 12000 and 12001 are the same as the processing from Step 12000 to Step 12001 in FIG. 26, so the description thereof will be omitted herein.

Step 12002': The deduplication schedule section 4300''' refers to the hash value storage information 2400' to divide the information in the list 1 and the information in the list 2 into information to be transmitted to each real storage system 100. An example of an information division method using hash value storage information 2400' will be described below. For example, consider that there is an extent 2410' in which the real storage system ID 2402' is "f" and the hash range 2401' is a to b in the hash value storage information 2400'. In this case, in the record of list 1, the record in which the (pre-update) hash value 3403 is included in the range of a to b is extracted and determined to be the information to be transmitted to the real storage system #f. Each record in list 2 is also divided in the same way. In the following description, among the records in the list 1, the set of records determined to be transmitted to the real storage system #f in step 12002' is denoted as "list 1-f". Likewise, the set of records determined to be transmitted to the real storage system #f among the records in the list 2 will be referred to as "list 2-f".

Step 12021': The deduplication schedule section 4300''' sends the items that should be sent to another real storage system 100 from among the list 1 and the list 2 divided in the Step 12002' to another real storage system 100. This process is the same as the process described in the third embodiment (Step 12021). Note that, as in the third embodiment, if there is no divided list 1 (or list 2) to be transmitted to another real storage system 100, the deduplication schedule unit 4300''' creates a record in which an invalid value (NULL) is stored, and transmits it to another real storage system 100.

Step 12022': Deduplication schedule section 4300''' receives the divided list 1 and divided list 2 from the other real storage system 100. Upon receiving the divided list 1 and the divided list 2 from all the real storage systems 100 in the virtual storage system, the deduplication scheduling unit 4300''' then executes Step 12003''.

Step 12003'': The processing performed in this step is the same processing as that of Step 12003' described in the second embodiment. In step 12003'', the deduplication scheduling unit 4300''' uses the list 1 and list 2 it created as well as the list 1 and list 2 received from other real storage systems 100 to perform the deduplication possibility determination. At this time, the deduplication scheduling unit 4300''' calls the deduplication determination unit 12300' to perform the deduplication possibility determination. As the content of the processing performed by the deduplication determination unit 12300' is the same as that described in the second embodiment, the description thereof is omitted herein.

As Steps 12004 to 12005 are the same as the processing described in the first embodiment (Steps 12004 to 12005 in FIG. 26), the description thereof will be omitted herein.

Step 12051, Step 12052: As this processing is the same as Step 12051 and Step 12052 described in the third embodiment, the description thereof will be omitted herein.

After step 12052, the deduplication scheduling unit 4300''' executes Step 12006 and Step 12007, and ends the process. As Steps 12006 and 12007 are the same as those described in the first embodiment and the like, the description thereof will be omitted herein. The above is the processing flow of the deduplication scheduling unit 4300'''.

Although the embodiments of the present invention have been described above, these are examples for explaining the present invention, and the scope of the present invention is not limited to these examples. That is, the present invention can be implemented in a variety of other forms. For example, in the above-described embodiments, although an example was described in which the flash package has a function for performing deduplication processing or the like, a configuration in which an HDD is provided in the storage system instead of the flash package, and the HDD may perform each process that was performed by the flash package in the above embodiments.

Also, in the above-described embodiments, an example was described in which the hash value assigned to a certain flash package is stored only in the flash package (hash index information). However, as another embodiment, in order to increase availability, a copy of the hash index information created in a certain flash package may be stored in another flash package. For example, each time a flash package A updates its own hash index information, it may transmit the update information to a flash package B, and a copy of the hash index information managed by the flash package A may be stored in the flash package B.

In addition, in the above-described embodiment, explanation was performed on the premise that all the data was included as deduplication targets. However, for data with low probability of deduplication such as RAID redundant data, it is preferable not to perform deduplication determination, and so the processing of the above-described embodiments may be modified as such. For example, when the storage controller 200 writes redundant data to the flash package 230, it may attach information to the write request indicating that deduplication is not required (hereinafter simply referred to as a "flag"). For the virtual package, the flash package 230 may prepare an area for storing the fact that the flag is received for each virtual segment in the virtual block group information 3200. In response to receiving the flag at the time of receiving the write request, the flash package 230 may record the flag in the virtual segment management information in the virtual block group information 3200, and need not calculate the hash value of the data at the time of executing Step 14001. Then, the deduplication determination unit 12300 and the deduplication execution unit 12400 need not perform the deduplication determination or the like on the virtual segment in which the flag is stored.

REFERENCE SIGNS LIST

100: storage system, 110: host, 120: storage area network (SAN), 200: storage controller, 210: cache memory, 220: shared memory, 230: flash package, 250: connecting device, 260: processor, 270: memory, 280: flash package group, 300: flash chip, 310: package processor, 320: package memory, 330: buffer, 340: package bus, 350: package bus transfer device, 370: hash circuit, 2000: logical volume information, 2100: real page information, 2300: flash package group information, 2400: hash value storage information, 2500: flash package 3000: package information, 3100: chip information, 3200: virtual block group information, 3300: real block information, 3400: historical information, 3500: hash index information, 3600: free real block information pointer, 4000: read processing execution unit, 4100: write request receiving unit, 4200: write-after processing execution unit, 4300: deduplication scheduling unit, 12100: data write processing execution unit, 12200: historical information transmission unit, 12300: deduplication determination unit, 12400: deduplication execution unit, 12500: hash specification read execution unit, 12600: data read processing execution unit.

The invention claimed is:

1. A storage system comprising:
a plurality of flash packages each having a plurality of nonvolatile storage media; and
a storage controller configured to execute read/write processing between a host and the plurality of flash packages,
wherein:
the storage system is configured to store, when data identical to data written in a second address of a second flash package of the plurality of flash packages is written to a first address of a first flash package of the plurality of flash packages, the second address in the first package in association with the first address; and
the first flash package is configured to return, when the second address is stored in association with the first address, the second address to the storage controller in response to receiving a read request for the first address from the storage controller;
the storage controller is configured to issue, in response to receiving the second address from the first flash package, a read request to the second flash package and receive target read data from the second flash package.

2. The storage system of claim 1, wherein:
the storage controller is configured to receive, from the plurality of flash packages, historical information of write requests accepted by the flash packages; and
the storage system is configured to detect, based on the historical information, that identical data is written in a plurality of areas of the plurality of flash packages.

3. The storage system of claim 2, wherein:
the historical information includes addresses of the flash packages for which write requests have been issued by the storage controller and a characteristic amount of the write data designated by the write requests; and
the storage system is configured to determine, in a case that the characteristic amount included in the historical information created by the first flash package and the characteristic amount of data stored in the second flash package are identical, that data identical to the first flash package is written in the second flash package.

4. The storage system of claim 3, wherein:
in response to receiving, from the storage controller, a write request for the write data, the flash package is configured to:
calculate a characteristic amount of the write data, and
create the historical information including an address of the flash package included in the write request, a characteristic amount of the write data, and a characteristic amount of pre-update data of the write data.

5. The storage system of claim 4, wherein the storage system is configured to:
determine whether data having an identical characteristic amount to the characteristic amount of the pre-update data included in the historical information is stored in any of the plurality of flash packages; and
transmit, to the flash package that created the historical information, in a case that data having the same characteristic amount as the characteristic amount of the pre-update data is not stored in the plurality of flash packages, information indicating that the pre-update data may be deleted.

6. The storage system of claim 3, wherein:
each of the plurality of flash packages is configured to manage information related to characteristic amounts of a predetermined range and addresses of the flash packages in which data having the characteristic amount are stored,
in response to receiving the write request and the write data, the flash package is configured to:
calculate a characteristic amount of the received write data,
create the historical information including a write destination address of the write data and the characteristic amount, and
transmit, to the storage controller, the historical information,
the storage controller that received the historical information is configured to:
identify, from among the plurality of flash packages, the flash package that manages the characteristic amount included in the historical information, and
transmit, to the identified flash package, the historical information,
the flash package that has received the historical information is configured to determine whether data having an identical characteristic amount as the characteristic amount of the write data included in the historical information is stored in any of the plurality of flash packages,
the second flash package is configured to transmit, in a case that it is determined that data having an identical characteristic amount as the characteristic amount of the write data is stored in the second address, the second address to the first flash package via the storage controller, and
the first flash package is configured to store the second address in association with the first address.

7. The storage system of claim 6, wherein:
the first flash package and the second flash package belong to a same RAID group;
in a case that the address of the first flash package in which the write data is written and the address of the second flash package in which data having an identical characteristic amount as the characteristic amount of the write data are identical, the flash package that received the historical information is configured not to transmit, to the first flash package, an address within the second flash package in which identical data is stored.

8. The storage system of claim 3, wherein:
the storage system further includes a plurality of real storage systems having a storage controller and a plurality of flash packages connected to the storage controller,
the first flash package is connected to a first storage controller in the plurality of real storage systems and the second flash package is connected to a second storage controller in the plurality of real storage systems,
the first flash package is configured to return, when the second address is stored in association with the first address, the second address to the first storage controller in response to receiving a read request for the first address from the first storage controller,
the first storage controller is configured to issue, in response to receiving the second address from the first flash package, a request to the second storage controller to read data from the second flash package, and
the second storage controller is configured to read target read data from the second flash package and return it to the first storage controller.

9. The storage system of claim 8, wherein:
each of a plurality of storage controllers is configured to manage information related to characteristic amounts of a predetermined range and addresses of the flash packages in which data having the characteristic amount are stored,
in response to receiving the write request and the write data, the first flash package is configured to:
    calculate a characteristic amount of the received write data,
    create the historical information including a write destination address of the write data and the characteristic amount, and
    transmit, to the first storage controller, the historical information,
in a case that the storage controller that manages the characteristic amount included in the historical information is the second storage controller, the first storage controller is configured to transmit the historical information to the second storage controller, and
the second storage controller that has received the historical information is configured to determine whether data having an identical characteristic amount as the characteristic amount of the write data included in the historical information is stored in any of the plurality of flash packages.

10. The storage system of claim 8, wherein:
each of the plurality of flash packages is configured to manage information related to characteristic amounts of a predetermined range and addresses of the flash packages in which data having the characteristic amount are stored,
in response to receiving the write request and the write data, the first flash package is configured to:
    calculate a characteristic amount of the received write data,
    create the historical information including a write destination address of the write data and the characteristic amount, and
    transmit, to the first storage controller, the historical information,
in a case that the flash package that manages the characteristic amount included in the historical information is connected to the second storage controller, the first storage controller is configured to transmit the historical information to the second storage controller, and
the second storage controller that has received the historical information is configured to transmit the historical information to the flash package that manages the characteristic amount included in the historical information.

11. A flash package connected to a storage controller that processes a data access request from a host, wherein the flash package is configured to:
manage information related to characteristic amounts of a predetermined range and addresses of the flash packages in which data having the characteristic amount are stored,
in response to receiving a write request and write data from the storage controller,
    calculate a characteristic amount of the received write data,
    create historical information including a write destination address of the write data and the characteristic amount, and
    transmit, to the storage controller, the historical information, and
in response to receiving, from the storage controller, the historical information having a characteristic amount included in the range managed by the flash package,
    determine, based on the historical information, whether or not a flash package having data identical to the write data written in the first flash package exists among the plurality of flash packages connected to the storage controller, and
    transmit, to the first flash package, in a case that it is determined that the second flash package of the plurality of flash packages has data identical to the write data, an address within the second flash package in which identical data is stored.

12. The flash package of claim 11, wherein the flash package is configured to:
provide a volume to the storage controller, and
return, to the storage controller, the address of the flash package having the data identical to the data written in the address in the volume in response to receiving a read request for an address in the volume after receiving an address within the flash package having data identical to the data written in the address in the volume.

13. The flash package of claim 11, wherein the flash package is configured to:
determine, in a case that the characteristic amount included in the historical information and the characteristic amount of the data stored in the second flash package are identical, that the second flash package has identical data to the write data in response to receiving the historical information from the storage controller.

14. A flash package of claim 11, wherein the flash package is configured to:
calculate, in response to receiving the write request and the write data from the storage controller, a characteristic amount of the write data from the write data, and
create the historical information including an address of the flash package included in the write request, a characteristic amount of the write data, and a characteristic amount of pre-update data of the write data.

\* \* \* \* \*